US011899667B2

(12) United States Patent
Bauer

(10) Patent No.: US 11,899,667 B2
(45) Date of Patent: Feb. 13, 2024

(54) EFFICIENT USE OF TRIE DATA STRUCTURE IN DATABASES

(71) Applicant: CENSHARE GMBH, Munich (DE)

(72) Inventor: Walter Bauer, Munich (DE)

(73) Assignee: CENSHARE GMBH, Munich (DE)

(*) Notice: Subject to any disclaimer, the term of this patent is extended or adjusted under 35 U.S.C. 154(b) by 60 days.

(21) Appl. No.: 16/981,245

(22) PCT Filed: Sep. 19, 2018

(86) PCT No.: PCT/EP2018/075389
§ 371 (c)(1),
(2) Date: Sep. 15, 2020

(87) PCT Pub. No.: WO2019/174761
PCT Pub. Date: Sep. 19, 2019

(65) Prior Publication Data
US 2021/0049141 A1   Feb. 18, 2021

(30) Foreign Application Priority Data
Mar. 15, 2018   (WO) .................. PCT/EP2018/056592

(51) Int. Cl.
G06F 16/2455    (2019.01)
G06F 16/2453    (2019.01)
(Continued)

(52) U.S. Cl.
CPC .... G06F 16/24558 (2019.01); G06F 9/30029 (2013.01); G06F 16/2237 (2019.01);
(Continued)

(58) Field of Classification Search
CPC ........... G06F 16/24558; G06F 16/2237; G06F 16/2246; G06F 16/2453; G06F 16/24561; G06F 9/30029; G06F 17/11
See application file for complete search history.

(56) References Cited

U.S. PATENT DOCUMENTS 656,010 A    8/1900  Bowling
6,175,835 B1  1/2001  Shadmon
(Continued)

FOREIGN PATENT DOCUMENTS

CN    101277252 A    10/2008
JP    2006521623 A    9/2006
(Continued)

OTHER PUBLICATIONS

Jekovec, Matevž, and Andrej Brodnik. "Parallel query in the suffix tree." (2015) arXiv preprint arXiv:1509.06167. (Year: 2015).*
(Continued)

Primary Examiner — Tamara T Kyle
Assistant Examiner — Lana Alagic
(74) Attorney, Agent, or Firm — Perkins Coie LLP

(57) ABSTRACT

The invention provides a time-efficient way of performing a query in a database or information retrieval system comprising operations such as intersection, union, difference and exclusive disjunction on two or more sets of keys stored in a database or information retrieval system. In a novel execution model, all data sources and operators are tries, and in input trie for a higher-order set operation can be the output of a lower-order set operation which is evaluated on demand. Two or more input tries are combined in accordance with the respective set operation, to obtain the set of keys associated with the nodes of a respective resulting trie. The physical algebra of the implementation of tries based on bitmaps corresponds directly to the logical algebra for the set operations and allows for efficient implementation by means of bitwise Boolean operations.

14 Claims, 49 Drawing Sheets

(51) Int. Cl.
  *G06F 9/30* (2018.01)
  *G06F 17/11* (2006.01)
  *G06F 16/22* (2019.01)
(52) U.S. Cl.
  CPC ...... *G06F 16/2246* (2019.01); *G06F 16/2453* (2019.01); *G06F 16/24561* (2019.01); *G06F 17/11* (2013.01)

(56) References Cited

U.S. PATENT DOCUMENTS

| | | | |
|---|---|---|---|
| 7,249,149 B1* | 7/2007 | Eatherton | H04L 12/56 707/999.102 |
| 7,565,380 B1 | 7/2009 | Venkatachary | |
| 8,612,402 B1* | 12/2013 | Givargis | G06F 16/217 707/693 |
| 2002/0052869 A1 | 5/2002 | O'Keeffe et al. | |
| 2002/0147721 A1 | 10/2002 | Gupta et al. | |
| 2003/0195873 A1 | 10/2003 | Lewak et al. | |
| 2003/0204513 A1 | 10/2003 | Bumbulis | |
| 2004/0111440 A1 | 6/2004 | Richardson et al. | |
| 2006/0015526 A1 | 1/2006 | Sattler et al. | |
| 2010/0250674 A1 | 9/2010 | Terao et al. | |
| 2010/0316051 A1* | 12/2010 | Song | H04L 45/00 370/392 |
| 2013/0268770 A1 | 10/2013 | Hunt et al. | |
| 2013/0294450 A1* | 11/2013 | Wang | H04L 45/748 370/392 |
| 2014/0344287 A1 | 11/2014 | Carvalho et al. | |
| 2015/0248449 A1 | 9/2015 | Tsirkin | |
| 2015/0278273 A1* | 10/2015 | Wigington | G06F 16/904 707/797 |
| 2016/0092466 A1 | 3/2016 | Raja et al. | |
| 2016/0196303 A1 | 7/2016 | Okajima et al. | |
| 2016/0239528 A1 | 8/2016 | Pemberton et al. | |
| 2017/0032013 A1* | 2/2017 | Zheng | G06F 16/24575 |

FOREIGN PATENT DOCUMENTS

| | | |
|---|---|---|
| JP | 2007148751 A | 6/2007 |
| JP | 2013218490 A | 10/2013 |
| JP | 2014225260 A | 12/2014 |
| WO | 2006054506 A1 | 5/2006 |
| WO | 2012049883 A1 | 4/2012 |
| WO | 2015025467 A1 | 2/2015 |

OTHER PUBLICATIONS

Giegerich, Robert, Stefan Kurtz, and Jens Stoye. "Efficient implementation of lazy suffix trees." (2003) Software: Practice and Experience 33.11: 1035-1049. (Year: 2003).*
First Examination Report for the Indian Patent Application No. 201947041188, dated Dec. 31, 2021, 4 pages.
Office Action for the Japanese Patent Application No. JP2020549557, dated Dec. 22, 2021, 20 pages.
Zhao Xiaoyan., Trie Methods for Structured Data on Secondary Storage, McGill University, Oct. 2000, retrieved from https://dl.acm.org/doi/book/10.5555/936152, Dec. 15, 2021, 11 pages.
Alam M., et al., "Performance of Point and Range Queries for In-memory Databases using Radix Trees on GPUs," 2016 IEEE 18th International Conference on High-Performance Computing and Communications, IEEE 14th International Conference on Smart City, 2016, pp. 1493-1500.
Boehm M., et al., "Efficient In-Memory Indexing with Generalized Prefix-Trees," BTW. LNI, 2011, vol. 180, pp. 227-246.
Clement J., et al., "The Analusis of Hybrid Trie Structures," Proceedings of the Ninth Annual ACM-SIAM Symposium on Discrete Algorithms, Jan. 1, 1998, pp. 1-09.
Datta A., et al., "Range Queries in Trie-Structured Overlays," Proceedings of the Fifth IEEE International Conference on Peer-to-Peer Computing, 2005, pp. 1-10.

Extended European Search Report issued in European Application No. 17161140.3, dated Aug. 21, 2017, 10 pages.
International Preliminary Report issued in International Application No. PCT/EP2018/056592, dated Sep. 17, 2019, 33 pages.
International Preliminary Report issued in International Application No. PCT/EP2018/075389, dated Sep. 15, 2020, 8 pages.
International Search report and Written Opinion issued in International Application No. PCT/EP2018/056592, dated Aug. 6, 2018, 41 pages.
Notice of Reasons for Rejection received for Japanese Application No. 2019-547991, dated Sep. 8, 2021, 7 pages.
Office Action for Indian Patent Application No. 202047044892, dated Dec. 3, 2021, 7 pages.
Office Action for the Japanese Application No. JP20190204696, dated Oct. 11, 2021, 11 pages.
International Search Report and Written Opinion dated Oct. 24, 2018 for PCT/EP2018/075389.
Baeza-Yates, Ricardo, "Efficient text searching [Microform]", XP055495434, Retrieved from the Internet: URL:https://www.researchgate.net/profile/Ricardo_Baeza-Yates/publication/35081173_Efficient_text_searching_microform/links/09e4150cb6402c56fd000000/Efficient-text-searching-microform.pdf [retrieved on Jul. 26, 2018] Part 2 of 3, 20-21.
Baeza-Yates, Ricardo, "Efficient text searching [Microform]", XP055495434, Retrieved from the Internet: URL:https://www.researchgate.net/profile/Ricardo_Baeza-Yates/publication/35081173_Efficient_text_searching_microform/links/09e4150cb6402c56fd000000/Efficient-text-searching-microform.pdf [retrieved on Jul. 26, 2018] Part 3 of 3, 20-21.
Baeza—Yates, Ricardo, "Efficient text searching [Microform]", XP055495434, Retrieved from the Internet: URL:https://www.researchgate.net/profile/Ricardo_Baeza-Yates/publication/35081173_Efficient_text_searching_microform/links/09e4150cb6402c56fd000000/Efficient-text-searching-microform.pdf [retrieved on Jul. 26, 2018] Part 1 of 3, 20-21.
Eppstein, David, "Breadth-first search", XP055494071, Retrieved from the Internet: URL:https://en.wikipedia.org/w/index.php?title=Breadth-first_search&oldid=769835791 [retrieved on Jul. 20, 2018], 93-99.
Theoreticalcomputerscientist, "Deterministic finite automaton", Mathematical Notes of the Academy of Sciences of the USSR, Mar. 12, 2017 (Mar. 12, 2017), XP055494247, Retrieved from the Internet: URL:https://en.wikipedia.org/w/index.php?title=Deterministic_finite_automaton&oldid=769928341 [retrieved on Jul. 20, 2018], Mar. 12, 2017, 1.
Zhao, Xiaaoyan, "Part 1 of 4—Trie Methods for Structured Data on Secondary Storage", XP055416926, Retrieved from the Internet: ULR:https://dl.acm.org/citation.cfm?id=936152&preflayout=flat [retrieved on Oct. 18, 2017], 98-104.
Zhao, Xiaaoyan, "Part 2 of 4—Trie Methods for Structured Data on Secondary Storage", XP055416926, Retrieved from the Internet: ULR:https://dl.acm.org/citation.cfm?id=936152&preflayout=flat [retrieved on Oct. 18, 2017], 98-104.
Zhao, Xiaaoyan, "Part 3 of 4—Trie Methods for Structured Data on Secondary Storage", XP055416926, Retrieved from the Internet: ULR:https://dl.acm.org/citation.cfm?id=936152&preflayout=flat [retrieved on Oct. 18, 2017], 98-104.
Zhao, Xiaaoyan, "Part 4 of 4—Trie Methods for Structured Data on Secondary Storage", XP055416926, Retrieved from the Internet: ULR:https://dl.acm.org/citation.cfm?id=936152&preflayout=flat [retrieved on Oct. 18, 2017], 98-104.
Zhao, Xiaoyan, "Trie Methods for Structured Data on Secondary Storage", Retrieved from Internet: URL: https://dl.acm.org/citation.cfm? id+936 152&preflayoug=flat, pp. 98-102.
Zobel, Justin, et al., "Finding Approximate Matches in Large Lexicons", Software Practice & Experience, Wiley & Sons, Bognor Regis, GB, vol. 25. No 3, Mar. 1, 1995 (Mar. 1, 1995), pp. 331-345, XP000579815, ISSN: 0038-0644, DOI: 10.1002/SPE.4380250307, p. 334.
Decision of Rejection for JP Patent Application No. 2020-549557, dated Aug. 17, 2022, 16 pages.

(56) References Cited

OTHER PUBLICATIONS

First Office Action for Chinese Patent Application No. 201880093497.2 dated Apr. 25, 2023, 34 pages.

\* cited by examiner

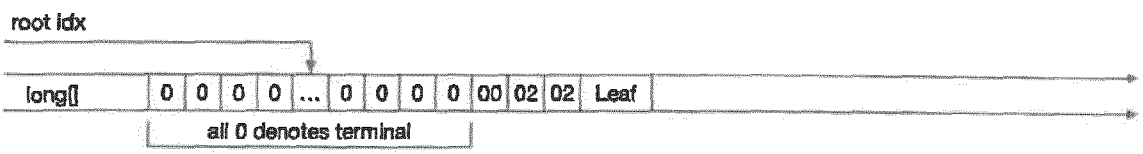
Fig 14A
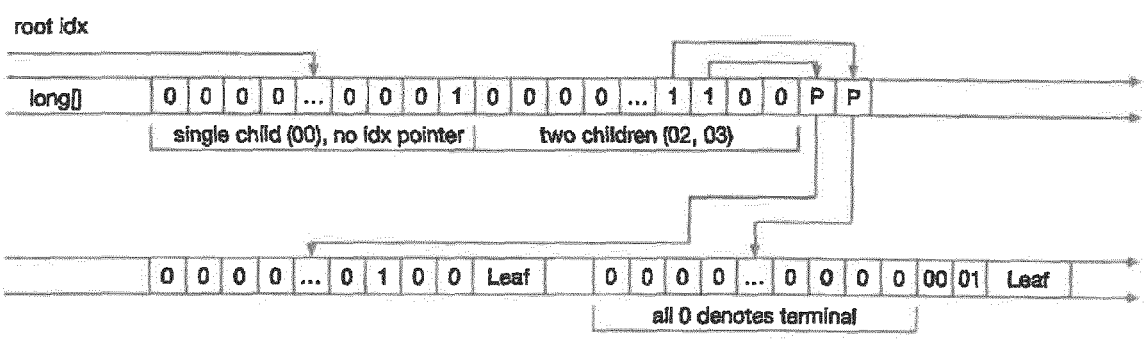
Fig 14B
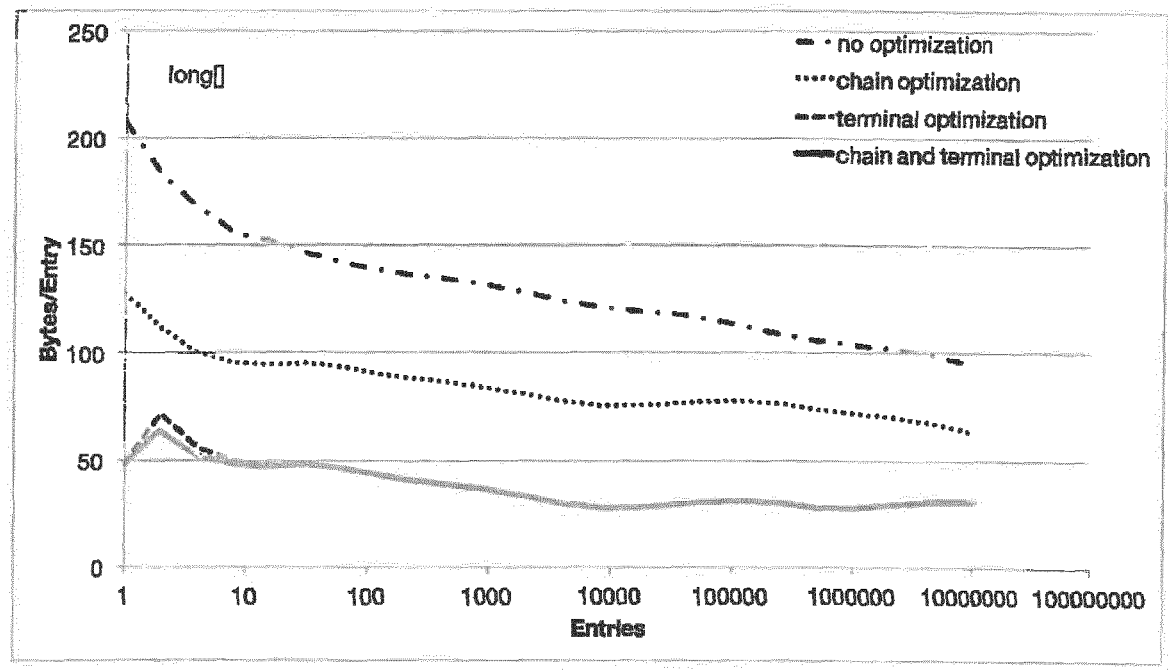
Fig 14C
Fig. 15

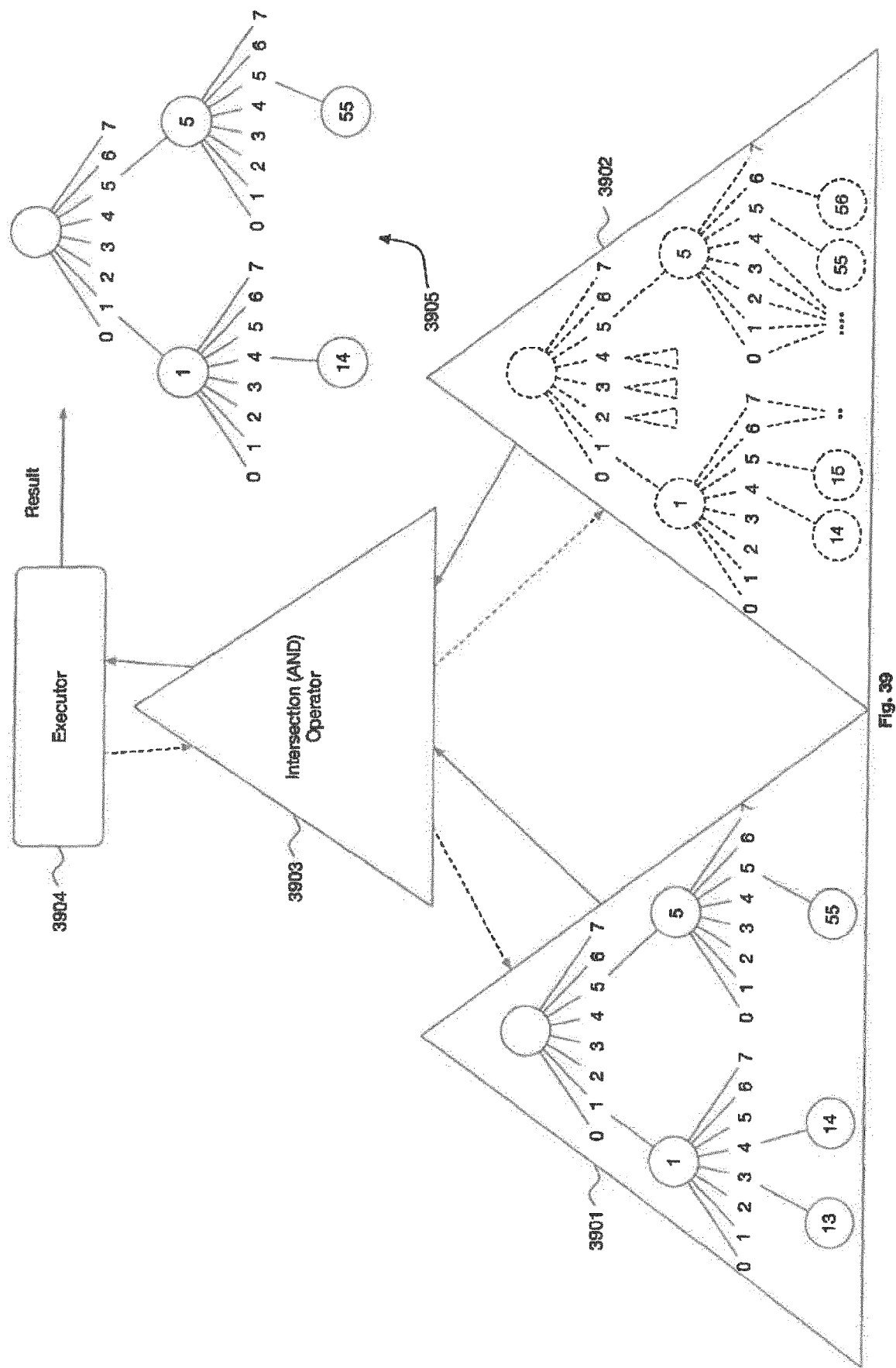

- - Lucene
— -Two indexes, (latitude, id) non-interleaved, (longitude, id) non-interleaved
——Two indexes, (latitude, id) var. precision, (longitude, id) var. precision, only 12 Mio points loaded
- · -Two indexes, (latitude, id) interleaved, (longitude, id) interleaved
······One index, (latitude, longitude, id), all interleaved
----One index, (latitude, longitude, id), (latitude, longitude) interleaved

EFFICIENT USE OF TRIE DATA STRUCTURE IN DATABASES

CROSS-REFERENCE TO RELATED APPLICATIONS

This application is a 35 USC § 371 application of International Application No. PCT/EP2018/075389 filed Sep. 19, 2018, which claims priority to PCT/EP2018/056592 filed Mar. 15, 2018, both of which are hereby incorporated by reference in their entirety.

TECHNICAL FIELD OF THE INVENTION

The present invention relates generally to the efficient use of trie data structures in databases and information retrieval systems, and to querying such a system with high performance.

BACKGROUND OF THE INVENTION

Databases and information retrieval systems are used for processing structured and unstructured information. Generally, structured data is the domain of databases (e.g. relational databases), whereas unstructured information is the domain of information retrieval systems (e.g. full text search). A database engine is the part of a database management system (or other applications) that stores and retrieves data. For information retrieval systems, this function is performed by search engines.

Indexing is used to improve database or information retrieval system performance. Without an index (also referred to as a lookup or access by "key") for a query, the whole database or information base would have to be scanned to deliver a result, which would be too slow to be useful.

A database index is comparable to the index offered by a book: To find a specific keyword, the user does not have to read the whole book, but instead he can look up a certain keyword in the index, which contains a reference to the pages which are related to that keyword. This is also the basic principle behind search engines: For any given search term, they quickly find the documents which contain the search term by consulting an appropriate index. An example query of an information retrieval system is a full text search, for which terms (words) are stored as keys, and document IDs are also stored as keys (c.f. description of FIG. 70 below). For instance, if the term "apple" can be found in documents with IDs 10 and 33, two composite keys ("apple", 10) and ("apple", 33) are stored in an index. The terms are stored as keys so that a search can be made, e.g., for "apple" and "pear".

The classic approach to indexing has been to use a so-called B-Tree index. Invented in the year 1972 by R. Bayer and E. McCreight, B-Trees are still the predominant data structure used for this purpose. However, B-Tree indexes have major drawbacks. For example, the time to access data increases logarithmically with the amount of data. An increase of the data size by one order of magnitude roughly doubles the access time, an increase of data size by two orders of magnitude triples the access time, etc. Furthermore, B-Tree indexes do not help to improve the query performance for criteria of so-called low cardinality. E.g., creating an index on an attribute "gender" with the values "male", "female" and "unknown" does not improve the performance compared to scanning and filtering all records. Finally, multidimensional queries, i.e. queries which involve multiple criteria/attributes, are difficult to handle efficiently because B-Tree indexes cannot be joined (combined) efficiently.

M. Boehm et al., "*Efficient In-Memory Indexing with Generalized Prefix-Trees*", in: T. Härder et al. (eds.), BTW. LNI, vol. 180, pp. 227-246, Kaiserslautern, Germany (2011), suggest to store and process data base indexes by using a "trie" or a trie data structure. A trie is a tree data structure, and is sometimes referred to as "radix tree" or "prefix tree". The term trie originates from the word "reTRIEval". Instead of storing keys inside the nodes, the path to a node of the trie defines the key with which it is associated, wherein the root denotes an empty key. More particularly, each node is associated with a key portion, whose value (sometimes referred to herein as the "value of the node") may be indicated by a pointer from the parent node. The value is selected from a predefined alphabet of possible values. The path from the root node to another node in the trie, for example to a leaf node, defines a key (or a "key prefix", in the case of an inner node, i.e. a node which is not a leaf node) with which the node is associated, the key being a concatenation of the key portions associated with the nodes on the path. The time complexity of a trie does not depend on the amount of keys present in the trie but on the key length.

Space-Efficient Trie Data Structures

One way to implement a trie data structure is to store the nodes separately in memory, with each node comprising a node type information indicating whether or not the node is a leaf node, an array of pointers to its child nodes (at least in case the node is not a leaf node), and possibly a payload in case of leaf node, e.g. a value associated with the key. Using this approach, traversing from node to node is a constant time operation, since the respective child pointer corresponds to the array entry representing the respective key portion. However, memory usage can be very inefficient for nodes having only few child nodes, since the corresponding arrays comprise and store many empty entries. This is particularly true when larger alphabets are used, as they require large amounts of child-pointers to be stored.

For a more efficient use of memory space, implementations of trie data structures which avoid storing empty pointers have been developed. Such a solution may consist in storing lists of non-empty pointers only, with their respective key portion values, instead of arrays containing all possible pointers. The drawback of this approach is that for traversals from node to node, a list in the respective parent node has to be scanned or—if the list is ordered by the value of the key portion—a binary search has to be performed. In addition, since it is required to identify a specific pointer for a specific value of a key portion, the associated value of the key portion also has to be stored, which reduces memory space efficiency.

Other ways to store trie data structures in a compact format have been developed. For instance, Ph. Bagwell, "*Fast And Space Efficient Trie Searches*", Technical Report, EPFL, Switzerland (2000) discloses a trie data structure based on bitmaps. Such trie data structure uses bitmaps to mark all non-empty pointers of a parent node. In particular, a set bit in a bitmap marks a valid (non-empty) branch. Each parent node also comprises one or more pointers, wherein each pointer is associated with a bit set in the bitmap and points to a child node of the parent node. The value of the key portion of a child node is determined by the value of a bit (set) in the bitmap comprised by the parent node with which bit the pointer pointing to the child node is associated.

The pointers have a predetermined length or size and can be stored in the same or inverse order as the bits are set in the bitmap. The memory address of a pointer associated with a bit which is set in the bitmap can easily be calculated based on the number of least significant bits set in the bitmap. This determination of a respective pointer and thus a next child node is fast because the amount of least significant bits which are set can be calculated efficiently, using simple bit operations and a CTPOP (count population) operation that determines the number of set bits. For example, such count population method is available in the Java programming language and is called "Long.bitCount( )". COOP itself can be implemented quite efficiently using a "bit-hack", and many modern CPUs even provide CTPOP as an intrinsic instruction.

Since the bitmap indicates the alphabet values which are associated with a valid branch, only existing (non-empty) pointers need to be stored. Thus, memory usage can be reduced. On the other hand, the address of a specific pointer can easily be determined in constant time based on the rank of its associated bit among the set bits in the bitmap Finally, the value of the bit associated with the pointer to the child node represents the key portion value of the child node in an efficient manner. Thus, a trie data structure based on bitmaps provides a more efficient approach to handle memory allocation and to process the trie compared to a trie data structure based on lists as shown in FIG. 4.

However, the inventor found that in many application scenarios, use of memory space is inefficient. This is particularly true when the trie is sparsely populated and/or degenerates to a chain of nodes each having single child pointers wasting space. It is therefore desirable to further reduce the memory space required to store tries used by database applications or information retrieval systems, and in particular to reduce the amount of memory required for storing pointers and/or bitmaps used for implementing the trie, without significantly increasing the speed required to traverse the trie.

Key Encoding

Typically, the cardinality of the alphabets of tries used in the prior art is relatively large, e.g. 256, in order to be able accommodate characters from a large alphabet like Unicode. With 256 different values, 8 bits ($2^8$=256) or one byte can be encoded. However, where a trie uses bitmaps as described above, the width of the bitmap increases with the cardinality of the alphabet. For example, an alphabet of a cardinality of 256 requires a bitmap size of 256 bits. Such a large bitmap can be space inefficient in particular where the trie is sparsely populated, because 256 bits need to be allocated for every node although only a fraction of them may be used. Furthermore, since the bit width of the registers of modern computers is typically only 64 bits, large bitmaps having e.g. 256 bits cannot be processed in time-efficient manner. If a trie was to accommodate characters of an even larger alphabet, the efficiency problems would increase further. Thus, the cardinality of the alphabets whose characters can be stored in a prior art trie in a space- and time-efficient manner is limited.

Furthermore, tries are used in the prior art only for storing predefined data types, wherein the data types are typically limited to primitive data types like numbers or characters. Such a use puts constraints on the keys which can be stored in a trie, and makes trie data structures less suitable for storing database or information retrieval system indexes.

It is therefore a further object of the invention to provide tries which can be used in a flexible manner, and/or methods for using tries in a flexible manner. In fact, it is an object of the invention to provide trie data structures which can be used as a universal database or information retrieval system index, and methods of using trie data structures as a universal database or information retrieval system index. Furthermore, it is an object of the invention to provide tries which store the keys of a database index in such a way that database queries involving more than one data item can be processed in a time-efficient manner.

Query Execution

Queries executed in a database are generally expressed in a logical algebra (e.g. SQL). For their execution, the queries have to be converted into physical algebra: a physical query execution plan (QEP). The query is rewritten, optimized, and a QEP is prepared so that a query execution engine (QEE) executes the QEP generated by the preceding steps on the database.

For the processing, a QEP generally comprises a set of related operators aiming at producing query results. Most databases represent a QEP by a tree where the nodes are operators, the leaves are the data sources, and the edges are the relationship between operators in the producer-consumer form.

Many database engines follow an iterator-based execution model in the QEE, in which the operators implement the following methods: Open (prepare the operator to produce data), Next (produces a new unit of data under the demand of the operators consumer), Close (finalizes the execution and frees resources). Calling one of these operations, starting at the root operator, will propagate it to its operator children and so on, until reaching the data sources (and leaves). In this way, the control flows down from consumer to producer, and data flows up from producer to consumer within the query execution plan operator tree. Such an approach provides a clean design and encapsulation since each operator does not require a global knowledge.

However, such an execution model has serious drawbacks. To start with, because each operator has no global knowledge, it cannot apply optimizations that would be beneficial from a global perspective. In addition, since the query plan is static, applying adaptive optimization during the query execution can prove difficult. As a result, there is a strong dependency on the query optimizer to create a good QEP involving complex algorithms. And finally, the iterator approach delivers only one unit of data, e.g. record per operator invocation. This approach is inefficient for operators combining large sub result sets that themselves return a small result set.

As an example of one of these drawbacks, if the query to be performed on the database is an expression such as "A intersect (B union C)" with A returning a short list of record IDs, e.g. (1, 2, . . . 10) but B and C returning long lists, e.g. (1, 2, . . . 10,000) and (20,000, . . . 50,000). The query is quite inefficient if the query optimizer has no prediction capability and does not rewrite the query into (A intersect B) union (A intersect C) prior to its execution.

Therefore, it is desirable to have a more time-efficient method of performing a database or information retrieval system query comprising operations such as intersection (AND), union (OR), and difference (AND NOT) on two or more sets of keys stored in a database or information retrieval system, or sets of input or result keys of a database or information retrieval system.

Furthermore, range query performance of prior art databases decreases with the size of an index (the number of records comprised by the database and indexed by the index). Therefore, it is desirable to have a more time-efficient method of performing range queries, which scales well with increasing index size.

SUMMARY OF THE INVENTION

One or more of these objects are achieved by the subject matter of the independent claims. Preferred embodiments are subject of the dependent claims.

The invention provides an indexing solution for database applications, where B-trees and derivatives are still the predominant strategy, and an indexing solution for information-retrieval applications, where typically inverted indexes are used. An inverted index is an index where a term lists the documents that contain it. The invention can take advantage of the hierarchical trie structures to allow for lazy evaluation, as the tries are processed level by level. Therefore, the invention can use the trie on a first level as an associative array to implement the inverted index, where terms are the keys stored in the trie. On a second level (i.e. as leaf nodes of the associative array), we the invention can use the trie as a set to implement the list of documents (i.e. set of IDs). The invention thus allows replacing B-Trees and inverted indexes with one universal solution, which can therefore be named a "confluence index".

The index data structure and query processing model of the invention is based on bitwise tries and has the potential to replace prior art index structures: the data structure can be updated frequently, works for keys with low- and high-cardinality and is space efficient without compression/de-compression (the data structure is compact or in some cases even succinct). In addition, since it is based on a trie, it inherits the O(|M|) constant time complexity for insert, update, delete and query by key operations (with |M| being the key length). It is better than the usual O(log n) complexity for tree based approaches (with n being the number of keys in the index). It can then offer a query time that is independent of the filling of the database. In preferred embodiment, the results of set operators in the query processing "appear" as tries. This allows for functional composition and lazy evaluation. As a side effect, the physical algebra corresponds directly to the logical algebra, simplifying the task of creating a suitable physical execution plan for a given query as typically done in a query optimizer. A first embodiment of the invention is a trie for use in an electronic database application or information retrieval system, the trie comprising one or more nodes, wherein a parent node comprised by the trie, preferably each parent node which has more than one child node, comprises a bitmap and one or more pointers, wherein each pointer is associated with a bit set in the bitmap and points to a child node of the parent node. The trie is characterized in that a parent node comprised by the trie, preferably each parent node which has only one child node, does not comprise a pointer to the child node, and/or the child node is stored in a predefined position in memory relative to the parent node.

According to a second embodiment, in the first embodiment, the child node of the parent node has only one child node is stored in a position in memory directly behind the parent node.

According to a $3^{rd}$ embodiment, in the first or second embodiment, a node, preferably each child node is associated with a key portion and the path from the root node to another node in the trie, in particular to a leaf node, defines a key, the key being a concatenation of the key portions associated with the nodes in the path.

Terminal Optimization

A $4^{th}$ embodiment of the invention is a trie for use in an electronic database application or information retrieval system, the trie comprising one or more nodes, wherein a parent node comprised by the trie, preferably at least each parent node which has more than one child node, comprises a bitmap; a node, preferably each child node is associated with a key portion; and the value of the key portion of a child node, preferably of at least each child node whose parent has more than one child nodes, is determined by the value of a bit (set) in a bitmap comprised by the parent node with which bit the child node is associated. The trie is characterized in that a node, preferably each node which has only one child node and all whose descendant nodes have at most one child node is marked as a terminal-branch node, and the value of the key portion associated with a descendant node, preferably each descendant node, of a terminal-branch node, preferably of each terminal-branch node, is not determined by the value of a bit (set) in a bitmap comprised by the parent node of the descendant node.

According to a $5^{th}$ embodiment, in the $4^{th}$ embodiment, the terminal-branch node has more than one descendant node.

According to a $6^{th}$ embodiment, in the $4^{th}$ or the $5^{th}$ embodiments, the parent of the terminal-branch node has more than one child node.

According to a $7^{th}$ embodiment, in the $4^{th}$ to $6^{th}$ embodiments, the marking as a terminal-branch node is a bitmap with no bits set.

According to an $8^{th}$ embodiment, in the $7^{th}$ embodiment, the bitmap of the terminal-branch node has the same length or format as a bitmap comprised by a parent node which has more than one child node.

According to a $9^{th}$ embodiment, in any one of the $4^{th}$ to the $8^{th}$ embodiments, a terminal branch node, preferably each terminal branch node comprised by the trie and/or a descendant node, preferably each descendant node, of the terminal-branch node, does not comprise a pointer to its child node, and/or the child node is stored in a predefined position in memory relative to the parent node, preferably in a position in memory directly behind the parent node.

According to a $10^{th}$ embodiment, in any one of the $4^{th}$ to $9^{th}$ embodiments, the value of the key portion associated with a descendant node, preferably each descendant node, of a terminal-branch node, preferably of each terminal-branch node, is comprised by the parent node of the descendant node.

According to a $11^{th}$ embodiment, in any one of the $4^{th}$ to $10^{th}$ embodiments, the values of the key portions associated with the descendant nodes, preferably all descendant nodes, of a terminal-branch node, preferably of each terminal-branch node, are stored consecutively after the terminal-branch node.

According to a $12^{th}$ embodiment, in any one of the $4^{th}$ to the $11^{th}$ embodiments, the encoding of the value of the key portion associated with a descendant node, preferably each descendant node, of a terminal-branch node, preferably of each terminal-branch node requires less memory space than a bitmap comprised by a parent node which has more than one child node.

According to a $13^{th}$ embodiment, in any one of the $4^{th}$ to $12^{th}$ embodiments, the value of the key portion associated with a descendant node, preferably each of the descendant nodes, of a terminal-branch node, preferably of each terminal-branch node, is encoded as a binary number.

According to a $14^{th}$ embodiment, in any one of the $4^{th}$ to $13^{th}$ embodiments, the bitmap comprised by a parent node, preferably each parent node which has more than one child node, has 32, 64, 128 or 256 bits, and the key portion associated with a descendant node, preferably each of the descendant nodes, of a terminal-branch node, preferably of each terminal-branch node is encoded by 5, 6, 7, or 8 bits, respectively.

According to a 15$^{th}$ embodiment, in any one of the 4$^{th}$ to 14$^{th}$ embodiments, the value of the key portion associated with a descendant node, preferably each of the descendant nodes, of a terminal-branch node, preferably of each of the terminal-branch nodes, is encoded as an integer value.

According to a 16$^{th}$ embodiment, in any one of the 4$^{th}$ to 14$^{th}$ embodiments, a descendant node of the terminal-branch node which is a parent node, preferably each descendant node which is a parent node, does not comprise a bitmap in which a set bit determines the value of the key portion associated with its child node.

According to a 17$^{th}$ embodiment, in any one of the 4$^{th}$ to 16$^{th}$ embodiments, a parent node comprised by the trie, preferably at least each parent node which has more than one child node, comprises one or more pointers, wherein each pointer is associated with a bit set in the bitmap comprised by the parent node and points to a child node of the parent node.

According to an 18$^{th}$ embodiment, in any one of the 4$^{th}$ to 17$^{th}$ embodiments, the trie is a trie according to any one of the 1$^{st}$ or 2$^{nd}$ embodiments.

Bitmap Compression

A 19$^{th}$ embodiment of the invention is a trie for use in an electronic database application or information retrieval system, the trie comprising one or more nodes, wherein a node, preferably at least each parent node which has more than one child node, comprises a bitmap in the form of a logical bitmap and a number of pointers, wherein each pointer is associated with a bit set in the logical bitmap and points to a child node of the node. The trie is characterized in that the logical bitmap is divided into a plurality of sections and encoded by a header bitmap and a number of content bitmaps; wherein each section is associated with a bit in the header bitmap; and wherein for each section of the logical bitmap in which one or more bits are set, the bit associated with the section in the header bitmap is set and the section is stored as a content bitmap.

According to a loth embodiment, in the 19$^{th}$ embodiment, for each section of the logical bitmap in which no bit is set, the bit associated with the section in the header bitmap is not set and the section is not stored as a content bitmap.

According to a 21$^{st}$ embodiment, in any one of the 19$^{th}$ or 20 embodiments, each of the sections is coherent.

According to a 22$^{nd}$ embodiment, in any one the 19$^{th}$ to 21$^{st}$ embodiments, all sections have the same size.

According to a 23$^{rd}$ embodiment, in the 22$^{nd}$ embodiment, the size of the sections is one byte.

According to a 24$^{th}$ embodiment, in any one of the 19$^{th}$ to 23$^{rd}$ embodiments, the amount of sections stored as a content bitmap is equal to the number of bits set in the header bitmap.

According to a 25$^{th}$ embodiment, in any one of the 19$^{th}$ to 24$^{th}$ embodiments, the size of the header bitmap is one byte.

According to a 26$^{th}$ embodiment, in any one of the 19$^{th}$ to 25$^{th}$ embodiments, the content bitmaps are stored in a predefined position in memory relative to the header bitmap.

According to a 27$^{th}$ embodiment, in any one of the 19$^{th}$ to 26$^{th}$ embodiments, the content bitmaps of the logical bitmap are stored in an array, in a list, or in consecutive physical or virtual memory locations.

According to a 28$^{th}$ embodiment, in any one of the 19$^{th}$ to 27$^{th}$ embodiments, the content bitmaps are stored in the same or inverse order in which the set bits associated with their sections are arranged in the header bitmap.

According to a 29$^{th}$ embodiment, in any one of the 19$^{th}$ to 28$^{th}$ embodiments, the rank of a content bitmap within all content bitmaps of the logical bitmap corresponds to the rank of the set bit associated with the section of the content bitmap, within all set bits in the header bitmap.

According to a 30$^{th}$ embodiment, in any one of the 19$^{th}$ to 29$^{th}$ embodiments, a pointer comprised by a node, preferably each pointer of a node and/or of each node which is not a leaf node, is encoded in the way of the encoding that is defined for logical bitmaps in any one of the 19$^{th}$ to 29$^{th}$ embodiments.

According to a 31$^{st}$ embodiment, in any one of the 19$^{th}$ to 30$^{th}$ embodiments, the trie is a trie in any one of the 1$^{st}$ to 18$^{th}$ embodiments.

According to a 32$^{nd}$ embodiment, in any one of the 19$^{th}$ to 31$^{st}$ embodiments, a node, preferably each child node is associated with a key portion and the path from the root node to another node in the trie, in particular to a leaf node, defines a key, the key being a concatenation of the key portions associated with the nodes in the path.

Keys Comprising Control Information

A 33$^{rd}$ embodiment of the invention is a trie for use in an electronic database application or information retrieval system, the trie comprising one or more nodes, wherein a node, preferably each child node, is associated with a key portion, and the path from the root node to another node in the trie, in particular to a leaf node, defines a key with which the node is associated, the key being a concatenation of the key portions associated with the nodes on the path. The trie is characterized in that the key comprises control information and content information.

According to a 34$^{th}$ embodiment, in the 33$^{rd}$ embodiment, the key comprises one or more key parts comprising content information, and for each of the key parts, the control information comprises a data type information element specifying the data type of the content information comprised by the key part.

According to a 35$^{th}$ embodiment, in the 34$^{th}$ embodiment, a key part, preferably each key part, comprises the data type information element which specifies the data type of the content information comprised by the key part.

According to a 36$^{th}$ embodiment, in the 35$^{th}$ embodiment, the data type information element is located by the content information element, preferably before the content information element.

According to a 37$^{th}$ embodiment, in the 34$^{th}$ embodiment, the data type information elements are located together, and preferably arranged in the same or inverse order as the content information elements whose data types they specify.

According to a 38$^{th}$ embodiment, in the 37$^{th}$ embodiment, the control information is located before the content information in the key.

According to a 39$^{th}$ embodiment, in any one of the 34$^{th}$ to 38$^{th}$ embodiments, the key comprises two or more key parts comprising content information of different data types.

According to a 40$^{th}$ embodiment, in any one of the 34$^{th}$ to 39$^{th}$ embodiments, at least one of the data types is a data type of fixed size.

According to a 41$^{st}$ embodiment, in the 40$^{th}$ embodiment, the data type of fixed size is an integer, long integer, or a double precision floating point or a time/date primitive.

According to a 42$^{nd}$ embodiment, in any one of the 34$^{th}$ to 41$^{st}$ embodiments, at least one of the data types is a data type of variable size.

According to a 43rd embodiment, in the 42nd embodiment, the data type of variable size is a character string, preferably a Unicode character string, or a variable precision integer.

According to a 44th embodiment, in any one of the 34th to 43rd embodiments, the information of a key part is contained by two or more key portions.

According to a 45th embodiment, in any one of the 34th to 44th embodiments, the data type of the content information comprised by a key part is a data type of variable size and the end of the content information element is marked by a specific symbol or by a specific bit in a specific one of the key portions containing the key part.

According to a 46th embodiment, in any one of the 34th to 45th embodiments, the control information comprises information identifying the last key part.

According to a 47th embodiment, in any one of the 33rd to 46th embodiments, the control information comprises information on whether the trie is used to store a dynamic set or an associative array.

According to a 48th embodiment, in any one of the 33rd to 47th embodiments, the trie is a trie according to any one of 1st to 32nd embodiments.

According to a 49th embodiment, in any one of the 33rd to 48th embodiments, a node, preferably at least each parent node which has more than one child node, comprises a bitmap and a number of pointers, wherein each pointer is associated with a bit set in the bitmap and points to a child node of the node.

Interleaved Multi-Item Keys

A 50th embodiment of the invention is a trie for use in an electronic database application or information retrieval system, the trie comprising one or more nodes, wherein a node, preferably each child node, is associated with a key portion; the path from the root node to another node in the trie, in particular to a leaf node, defines a key with which the node is associated, the key being a concatenation of the key portions associated with the nodes on the path. The trie is characterized in that two or more data items are coded in a key, at last one or two, preferably each of the data items consisting of two or more components; and the key contains two or more consecutive sections, at least one or two, preferably each of the sections comprising components of two or more of the data items coded in the key.

According to a 51st embodiment, in the 50th embodiment, a section, preferably each of the sections of a key contains at least and/or at most one component from each of the data items coded in the key.

According to a 52nd embodiment, in any one of the 50th or 51st embodiments, for two or more, preferably for all sections of a key, the components belonging to the different data items are ordered in the same sequence within the section.

According to a 53rd embodiment, in any one of the 50th to 52nd embodiments, the order of the sections comprising the components of a data item corresponds to an order of the components within the data item.

According to a 54th embodiment, in any one of the 50th to 53rd embodiments, the key portion associated with a child node, preferably with each of the child nodes corresponds to a part of a component of a data item.

According to a 55th embodiment, in any one of the 50th to 53rd embodiments, the key portion associated with a child node, preferably with each of the child nodes corresponds to one component of a data item and/or a component, preferably each component, of a data item, preferably each data item, corresponds to the key portion associated with one child node of the trie.

According to a 56th embodiment, in any one of the 50th to 53rd embodiments, the key portion associated with a child node, preferably with each of the child nodes corresponds to more than one component of a data item.

According to a 57th embodiment, in any one of the 50th to 56th embodiments, two or more, preferably all of the data items of a key have the same number of components.

Types of Data Items and Components Thereof

According to a 58th embodiment, in any one of the 50th to 57th embodiments, two or more data items represent geolocation data.

According to a 59th embodiment, in any one of the 50th to 58th embodiments, a data item represents a longitude, or latitude, or index, or a string of characters or a combination of two or more of these.

According to a 60th embodiment, in any one of the 50th to 59th embodiments, the components of a data item are bit groups of the binary encoding of the data item According to a 61st embodiment, in the 60th embodiment, a bit group comprises 6 bits.

According to a 62nd embodiment, in any one of the 50th to 61st embodiments, a data item is a number.

According to a 63rd embodiment, in the 62nd embodiment, the data item is an integer, a long integer, or a double long integer.

According to a 64th embodiment, in any one of the 62nd or 63rd embodiments, the data item is a 64-bit integer.

According to a 65th embodiment, in any one of the 62nd to 64th embodiments, the components of the data item are digits.

According to a 66th embodiment, in the 65th embodiment, the digits have a predefined radix, preferably of 64.

According to a 67th embodiment, in any one of the 50th to 66th embodiments, a data item is a string of characters.

According to a 68th embodiment, in the 67th embodiment, the components of the data item are single characters.

According to a 69th embodiment, in any one of the 50th to 68th embodiments, a data item is an array of bytes.

According to a 70th embodiment, in any one of the 50th to 69th embodiments, the trie is a trie according to any one of the 1st to 49th embodiments.

According to a 71st embodiment, in the 70th embodiment, when dependent from the 34th embodiment, a data item corresponds to a key part or to the content information comprised by a key part.

According to a 72nd embodiment, in any one of the 33rd to 71st embodiments, a node, preferably at least each parent node which has more than one child node, comprises a bitmap and a number of pointers, wherein each pointer is associated with a bit set in the bitmap and points to a child node of the node.

General Trie Features

Bitmaps and Memory Details

According to a 73rd embodiment, in any one of the 1st to 32nd, or 49th or 72nd embodiments, the bitmap is stored in memory as an integer of predefined size.

According to a 74th embodiment, in any one of the 1st to 32nd, or 49th or 72nd or 73rd embodiments, the size of the bitmap is 32, 64, 128 or 256 bits.

According to a 75th embodiment, in any one of the 1st to 32nd, or 49th or 72nd to 74th embodiments, the trie is suitable for being stored and processed on a target computer system, and the size of the bitmap is equal to the bit width of the registers of the CPU, the system bus, data bus and/or address bus of the target computer system.

According to a 76th embodiment, in any one of the 1st to 32nd, or 49th or 72nd to 75th embodiments, the bitmap and/or the pointers and/or the nodes of the trie are stored in an array, preferably in and array of long integers or of bytes, in a list, or in consecutive physical or virtual memory locations.

According to a $77^{th}$ embodiment, in any one of the $1^{st}$ to $16^{th}$, or $26^{th}$ to $27^{th}$, or $76^{th}$ embodiments, the memory is or comprises physical or virtual memory, preferably continuous memory.

Pointers

According to a $78^{th}$ embodiment, in any one of the $1^{st}$ to $32^{nd}$, or $49^{th}$ or $72^{nd}$ to $77^{th}$ embodiments, the amount of pointers comprised by a parent node, preferably at least of each parent node having more than one child node, is equal to the amount of bits set in a bitmap comprised by said parent node.

According to a $79^{th}$ embodiment, in any one of the $1^{st}$ to $32^{nd}$, or $49^{th}$ or $72^{nd}$ to $78^{th}$ embodiments, the rank of a pointer within all pointers of a parent node corresponds to the rank of the pointer's associated set bit within all set bits in the bitmap of the parent node.

According to an Both embodiment, in any one of the $1^{st}$ to $32^{nd}$, or $49^{th}$ or $72^{nd}$ to $79^{th}$ embodiments, the pointers are stored in the same or inverse order as the bits are set in the bitmap.

According to an $81^{st}$ embodiment, in any one of the $1^{st}$ to $33^{rd}$, or $49^{th}$ or $72^{nd}$ to $80^{th}$ embodiments, a pointer comprised by a parent node points to a bitmap comprised by the child node.

According to an $82^{nd}$ embodiment, in any one of the $1^{st}$ to $33^{rd}$, or $49^{th}$ or $72^{nd}$ to $81^{st}$ embodiments, the number of pointers comprised by a leaf node, preferably of each leaf node of the trie, is zero.

Key Portions

According to an $83^{rd}$ embodiment, in any one of the $3^{rd}$ or $33^{rd}$ to $82^{nd}$ embodiments, the value of the key portion of a child node, preferably of at least each child node a parent of which has more than one child nodes, is determined by the value of a bit (set) in the bitmap comprised by the parent node with which bit the child node is associated.

According to an $84^{th}$ embodiment, in any one of the $4^{th}$ to $18^{th}$, or $83^{rd}$ embodiments, the maximum amount of different values available for the key portion is defined by the size of the bitmap.

According to an $85^{th}$ embodiment, in any one of the $4^{th}$ to $18^{th}$, or $83^{rd}$ or $84^{th}$ embodiments, the size of the bitmap defines the possible alphabet for the key portion.

According to an $86^{th}$ embodiment, in any one of the $3^{rd}$ or $32^{nd}$ to $85^{th}$, each key portion in the trie is capable of storing a value of a same predefined size.

According to an $87^{th}$ embodiment, in the $86^{th}$ embodiment, the predefined size corresponds to a 5-bit, 6-bit, 7-bit or 8-bit value.

Key Coding for Efficient Range Queries

According to an $88^{th}$ embodiment, in any of the preceding embodiments, the coding of a value of a data item, preferably the values of all data items, is obtained by converting the data type of a data item into an offset binary representation consisting in an unsigned integer.

According to an $89^{th}$ embodiment, in the $88^{th}$ embodiment, the integer is a long integer.

According to a $90^{th}$ embodiment, in any one of the $88^{th}$ or $89^{th}$ embodiments, if the data type of the data item is a floating point number, the coding is obtained by converting the data type of the data item into an offset binary representation.

According to a gist embodiment, in any one of the $88^{th}$ to $90^{th}$ embodiments, if the data type of the data item is a two's complement signed integer, the coding is obtained by converting the data type of the data item into an offset binary representation.

Other

According to a $92^{nd}$ embodiment, in any one of the preceding embodiments, the trie stores a dynamic set or an associative array.

Boole Operations on Tries

A $93^{rd}$ embodiment of the invention is a method of retrieving data from an electronic database or information retrieval system, comprising the steps of: obtaining representations of two or more input tries; evaluating at least parts of a resulting trie, the resulting trie being a combination, using a logical operation, of the input tries; and providing as an output a representation of the resulting trie, the set or a subset of the keys and/or other data items associated with the nodes of the resulting trie, or a set of keys or values derived from keys associated with nodes of the resulting trie.

According to a $94^{th}$ embodiment, in the $93^{rd}$ embodiment the keys and/or other data items associated with the leaves of the resulting trie are provided as an output.

According to a $95^{th}$ embodiment, in the 93 or 94 embodiment, wherein the set of keys provided as an output is provided in a trie.

According to a $96^{th}$ embodiment, in any one of 93 or 94 embodiments, wherein the set of keys provided as an output is provided by a cursor or iterator.

According to a $97^{th}$ embodiment, in one of 93 to 96 embodiment, wherein the parts of a trie are nodes and/or branches of the trie.

According to a $98^{th}$ embodiment, in any one of 93 to 97, wherein a representation of a trie is a handle to a physical trie data structure or to a trie operator capable of evaluating the trie.

According to a $99^{th}$ embodiment, in any one of embodiments 93 to 98, wherein a representation of a trie represents the root node of a trie and implements a trie node interface, wherein a trie node interface represents a trie node and provides methods or functions for querying of and/or traversing to the child nodes of the trie node it represents.

According to a $100^{th}$ embodiment, in any one of embodiments 93 to 99, wherein evaluating a trie or parts of a trie comprises traversing the trie or the parts of the trie.

According to a $101^{st}$ embodiment, in 100, wherein evaluating a trie or parts of a trie comprises providing the information that the traversed nodes are present in the trie.

According to a $102^{nd}$ embodiment, in any one of embodiments 100 or 101, wherein at any given moment during the evaluation of a the or parts of a trie, at least those parts of the physical data structure of the trie or of the parts of the trie are realized which need to be realized in that moment for the traversing the trie or the parts of the trie.

According to a $103^{th}$ embodiment, in any one of embodiments 100 to 102, wherein at any given moment, less than the entire physical data structure of the trie or of the parts of the trie are realized, and preferably only those parts of the physical data structure of the trie or of the parts of the trie are realized which need to be realized in that moment for the traversing the trie or the parts of the trie.

According to a $104^{th}$ embodiment, in any one of embodiments 93 to 102, wherein evaluating a trie or parts of a trie comprises realizing the physical data structure of the trie or of the parts of the trie as a whole.

According to a $105^{th}$ embodiment, in any one of embodiments 93 to 104, wherein at least one of the input tries is a virtual trie at least parts of which are evaluated during the step of evaluating at least parts of the resulting trie.

According to a 106th embodiment, in embodiment 105, wherein at least at the moment of obtaining the representation of the virtual trie, the physical data structure of the virtual trie as a whole does not exist.

According to a 107th embodiment, in any one of embodiments 105 or 106, wherein the physical data structure of the virtual trie or of the parts of the virtual trie as a whole is not realized.

According to a 108th embodiment, in any one of embodiments 105 to 107, wherein at least those parts of the virtual trie are evaluated which are required for the evaluating at least parts of the resulting trie.

According to a 109th embodiment, in any one of embodiments 105 to 108, wherein at least some of the parts of the virtual trie which are not required for the evaluating at least parts of the resulting trie are not evaluated, and preferably only those parts of the virtual trie are evaluated which are required for the evaluating at least parts of the resulting trie.

According to a 110th embodiment, in any one of embodiments 105 to 109, wherein at least parts of the virtual trie are evaluated after at least parts of the resulting trie have been evaluated.

According to a 111th embodiment, in any one of embodiments 105 to 110, wherein parts of the resulting trie and parts of the virtual trie are evaluated in an interleaved manner.

According to a 112th embodiment, in any one of embodiments 105 to 111, wherein the two or more input tries are higher-order input tries and the resulting trie is a higher-order resulting trie; and the representation of the at least one virtual trie is provided as an output of a lower-order combination operator performing the steps of: obtaining representations of two or more lower-order input tries; at least partially evaluating a lower-order resulting trie, the lower-order resulting trie being a combination, using a lower-order logical operation, of the lower-order input tries; and providing as an output the representation of the lower-order resulting trie.

According to a 113th embodiment, in embodiment 112, wherein the step of providing as an output the representation of the lower-order resulting trie is performed before the step of at least partially evaluating the lower-order resulting trie has been completed.

According to a 114th embodiment, in any one of embodiments 112 or 113, wherein the lower-order logical operation is the same logical operation as the higher-order logical operation.

According to a 115th embodiment, in any one of embodiments 112 or 113, wherein the lower-order logical operation is a logical operation which is different from the higher-order logical operation.

According to a 116th embodiment, in any one of embodiments 112 to 115, wherein at least one of the lower-order input tries is a virtual trie as defined in any one of embodiments 105 to 111, mutatis mutandis, whose representation is provided as an output of an even lower-order combination operator.

According to a 117th embodiment, in any one of embodiments 93 to 116, wherein an input trie stores a set of keys stored in the electronic database or information retrieval system or of a set of result keys derived from one or more sets of keys stored in the electronic database or information retrieval system.

According to a 118th embodiment, in any one of embodiments 93 to 117, wherein a trie comprises one or more nodes, each child node is associated with a key portion, and the path from the root node to another node in the trie defines a key with which the node is associated, the key being a concatenation of the key portions associated with the nodes on the path.

According to a 119th embodiment, in any one of embodiments 93 to 118, wherein a combination, using a logical operation, of two or more input tries is a trie which stores the set of keys obtained when the respective sets of keys stored by the respective input tries are combined, using the logical operation.

According to a 120th embodiment, in any one of embodiments 93 to 119, wherein if a logical operation is a difference, the parent nodes of the resulting trie are the parent nodes of the first input trie, and the leaves of a parent node of the resulting trie are the combination, using the logical operation, of the set of child nodes of the corresponding parent node in the first input trie and the sets of child nodes of any corresponding parent nodes in the other input tries, and if a logical operation is not a difference, the set of child nodes of each node in the resulting trie is the combination, using the logical operation, of the sets of child nodes of the corresponding nodes in the input tries; and two or more nodes of different tries correspond to each other if the keys associated with the nodes of the different tries are identical.

According to a 121st embodiment, in any one of embodiments 93 to 120, wherein the set of child nodes of a node of the resulting trie is determined by combining the sets of child nodes of the nodes of the input tries which correspond to the node of the resulting trie, using the logical operation.

Combining Step

According to a 122nd embodiment, in any one of embodiments 93 to 121, wherein a step of evaluating a resulting trie or parts of a resulting trie comprises performing a combination function for the root node of the resulting trie; wherein performing the combination function for an input node of the resulting trie comprises determining the set of child nodes for the input node of the resulting trie by combining the sets of child nodes of the nodes of the input tries which correspond to the input node of the resulting trie, using the logical operation; and performing the combination function for each of the child nodes determined for the input node of the resulting trie.

According to a 123rd embodiment, in any one of embodiments 93 to 122, wherein a step of evaluating a resulting trie or parts of a resulting trie is performed using a depth first traversal, a breadth first traversal, or a combination thereof.

According to a 124th embodiment, in embodiment 123, wherein performing a step of evaluating a resulting trie or parts of a resulting trie in depth first traversal comprises performing the combination function for one of the child nodes of the input node and traversing the sub-trie formed by that child node before the combination function is performed for the next sibling node of that child node.

According to a 125th embodiment, in any one of embodiments 123 or 124, wherein performing a step of evaluating a resulting trie or parts of a resulting trie in breadth first traversal comprises performing the combination function for each of the child nodes determined for the input node of the resulting trie and determining a set of child nodes for each of the child nodes determined for the input node of the resulting trie before performing the combination function for any of the grandchild nodes of the input node of the resulting trie.

Bitmaps

According to a 126th embodiment, in any one of embodiments 93 to 125, wherein a node in an input trie, preferably at least all parent nodes in an input trie comprise a bitmap.

According to a 127th embodiment, in embodiment 126, wherein the value of the key portion of a child node in a trie is determined by the value of a bit (set) in the bitmap comprised by a parent node of the child node with which bit the child node is associated.

According to a 128th embodiment, in any one of embodiment 126 or 127, wherein combining the sets of child nodes of the nodes of the input tries which correspond to a node of the resulting trie, using the logical operation, comprises preferably bitwise combining the bitmaps of each of the nodes of the input tries which correspond to the node of the resulting trie, using the logical operation, thereby obtaining a combined bitmap.

According to a 129th embodiment, in embodiment 128, wherein the child nodes of the node of the resulting trie are determined and/or evaluated on the basis of the combined bitmap, preferably only on the basis of the combined bitmap.

According to a 130th embodiment, in any one of embodiments 128 or 129, wherein the step of combining the bitmaps is performed before the child nodes of the node of the resulting trie are determined and/or evaluated and/or the evaluation of the resulting trie traverses to the child nodes of the node of the resulting trie.

Logical Operations

According to a 131th embodiment, in any one of embodiments 93 to 130, wherein a logical operation is an intersection, a union, a difference, or an exclusive disjunction.

According to a 132th embodiment, in embodiment 131, wherein using a logical operation comprises combining using an D Boolean operation, an OR Boolean operation, AND NOT Boolean operation, or an XOR Boolean operation.

According to a 133th embodiment, in any one of embodiments 93 to 132, wherein using a logical operation comprises combining the bitmaps of nodes using a bitwise AND Boolean operation, a bitwise OR Boolean operation, a bitwise AND NOT Boolean operation, or a bitwise XOR Boolean operation.

Range Queries

A 134th embodiment is a method of retrieving data from an electronic database or information retrieval system by performing a range query on a set of keys stored in the electronic database or information retrieval system or a set of result keys derived from one or more sets of keys stored in the electronic database or information system, the method comprising the steps of: obtaining the definitions of one or more ranges; and
  performing the method of retrieving data from an electronic database or information retrieval system of any one of embodiments 93 to 133; wherein one input trie is an input set trie which stores the set of keys or the set of result keys to be searched for the one or more ranges; another input trie is a range trie which stores all the values included in the one or more ranges of which the definitions have been obtained; and the logical operation is an intersection.

According to a 135th embodiment, in embodiment 134, wherein a range is a set of discrete ordered values comprising all the values between a first value and a second value of a certain data type.

According to a 136th embodiment, in embodiment 135, wherein the range comprises the first and/or second values.

According to a 137th embodiment, in any one of embodiment 134 to 136, wherein in the step of performing the method of any one of embodiments 93 to 133, the method of any one of embodiments 93 to 111 is performed, wherein the at least one of the input tries which is a virtual trie is the range trie.

One-Item Input Set Tries

According to a 138th embodiment, in embodiment 137, wherein the definitions of one or more ranges comprise definitions of one or more ranges for the one data item.

Multi-Item Input Set Tries

According to a 139th embodiment, in any one of embodiments 134 to 137, wherein the keys associated with the leaves of the input set trie code two or more data items of a specific data type.

According to a 140th embodiment, in embodiment 139, wherein the definitions of one or more ranges comprise definitions of one or more ranges for one or more of the data items.

Obtaining Multi-Item Range Tries Fro Single-Item Range Tries

According to a 141th embodiment, in any one of embodiments 139 or 140, wherein the range trie is a multi-item range trie obtained by combining a single-item range trie for each of the data items coded by the keys associated with the leaves of the input set trie, which single-item range trie for a data item stores all the values included in one or more ranges of the data item.

According to a 142th embodiment, in embodiment 141, wherein the combining of the single-item range tries is performed within the function which implements the combining of the input set trie with the multi-item range trie.

According to a 143th embodiment, in embodiment 141, wherein the combining of the single-item range tries is performed by a function which provides the multi-item range trie as an input to the function which implements the combining of the input set trie with the multi-item range trie.

According to a 144th embodiment, in any one of embodiments 141 to 143, wherein a single-item range trie is a virtual trie at least parts of which are evaluated during the operation of combining the single-item range tries, preferably a virtual trie as defined in any one of embodiments 105 to 111, mutatis mutandis.

According to a 145th embodiment, in any one of embodiments 141 to 144, wherein the single-item range trie for each data item for which no definition of a range is obtained stores the entire range of possible values of the data item.

According to a 146. The method of any one of embodiments 141 to 144, wherein the multi-item range trie stores all combinations of the values of the data items stored in the single-item range tries.

Structure of the Range Tries

According to a 147th embodiment, in any one of embodiments 141 to 146, wherein a range trie has the same structure or format as the input set trie.

According to a 148th embodiment, in embodiment 147, wherein the keys associated with the leaves of a range trie code the data items of the same data type as the keys associated with the leaves of the input set trie.

According to a 149th embodiment, in any one of embodiments 147 or 148, wherein in a range trie, a data item of a certain data type or a component of such a data item is coded in nodes of the same level as the corresponding data item or component of the data item in the input set trie.

Output of the Range Query

According to a 150th embodiment, in any one of embodiments 134 to 149, wherein the method provides as an output a set of keys associated with the leaves of the input set trie.

According to a 151th embodiment, in any one of embodiment 139 to 149, wherein the method provides as an output a set of reduced-item keys coding a subset of the data items coded by the keys associated with the leaves of the input set trie.

According to a 152$^{th}$ embodiment, in embodiment 151, wherein the sets of reduced-item keys which are obtained, as a result of the combining of the input set trie with the range trie, from different branches of the input set trie which are related to data items not coded in the reduced-item keys are merged prior to providing the output.

According to a 153$^{th}$ embodiment, in any one of embodiments 151 or 152, wherein the set of reduced-item keys obtained as a result of the operation of combining the input set trie with the range trie is written into a newly created trie, thereby eliminating duplicate keys, prior to providing the output.

Fuzzy Search

A 154$^{th}$ embodiment is a method of retrieving data from an electronic database or information retrieval system by performing approximate string matching, the method comprising the steps of: obtaining a search string of characters; building a match trie which stores a set of approximate character strings comprising the search string and/or variations of the search string; evaluating at least parts of a resulting trie, the resulting trie being a combination, using an intersection operation, of the match trie with a storage trie storing a set of character strings which are stored in the electronic database or information retrieval system; providing as an output character strings and/or other data items associated with a result set of nodes of the resulting trie; wherein a trie comprises one or more nodes, each child node is associated with a key portion, and a path from the root node to another node in the trie defines a key with which the node is associated, the key being a concatenation of the key portions associated with the nodes on the path.

According to a 155$^{th}$ embodiment, in embodiment 154, wherein the character strings comprised by the set of character strings stored in the match trie are permanently stored in the electronic database or information retrieval system.

According to a 156$^{th}$ embodiment, in any one of embodiments 154 or 155, wherein the character strings comprised by the set of character strings stored in the match trie represent entries in the electronic database or information retrieval system.

According to a 157$^{th}$ embodiment, in any one of embodiments 154 to 156, wherein one or more child nodes in the match trie have more than one parent node.

According to a 158$^{th}$ embodiment, in any one of embodiments 154 to 157, wherein each child node in the storage trie and the resulting trie has only one parent node.

According to a 159$^{th}$ embodiment, in any one of embodiments 154 to 158, wherein the resulting trie is a trie which stores the set of keys obtained when the set of keys stored by the storage trie is intersected with the set of keys stored by the match trie.

According to a 160$^{th}$ embodiment, in any one of embodiments 154 to 158, wherein the set of child nodes of each node in the resulting trie is the intersection of the sets of child nodes of the corresponding nodes in the match trie and in the storage trie, wherein nodes of different tries correspond to each other if a same key is associated with the nodes of the different tries.

According to a 160$^{th}$ embodiment, in any one of embodiments 154 to 160, wherein the match trie is a virtual trie at least parts of which are evaluated or dynamically generated during the step of evaluating at least parts of the resulting trie.

According to a 161$^{th}$ embodiment, in embodiment 160, wherein the physical data structure of the virtual trie or of the parts of the virtual trie as a whole is not realized.

According to a 162$^{th}$ embodiment, in any one of embodiments 160 or 161, wherein at least those parts of the virtual trie are evaluated which are required for the evaluating at least parts of the resulting trie.

According to a 163$^{th}$ embodiment, in embodiment any one of embodiments 160 to 162, wherein at least some of the parts of the virtual trie which are not required for the evaluating at least parts of the resulting trie are not evaluated, and preferably only those parts of the virtual trie are evaluated which are required for the evaluating at least parts of the resulting trie.

According to a 164$^{th}$ embodiment, in any one of embodiments 160 to 163, wherein at least parts of the virtual trie are evaluated after at least parts of the resulting trie have been evaluated.

According to a 165$^{th}$ embodiment, in any one of embodiments 160 to 164, wherein parts of the resulting trie and parts of the virtual trie are evaluated in an interleaved manner.

According to a 166$^{th}$ embodiment, in any one of embodiments 154 to 165, wherein evaluating a trie or parts of a trie comprises traversing the trie or the parts of the trie.

According to a 167$^{th}$ embodiment, in any one of embodiments 154 to 166, wherein evaluating a trie or parts of a trie comprises providing the information that the traversed nodes are present in the trie.

According to a 168$^{th}$ embodiment, in any one of embodiments 154 to 167, wherein at any given moment during the evaluation of a trie or parts of a trie, at least those parts of the physical data structure of the trie or of the parts of the trie are realized which need to be realized in that moment for the traversing the trie or the parts of the trie.

According to a 169$^{th}$ embodiment, in any one of embodiments 154 to 168, wherein at any given moment, less than the entire physical data structure of the trie or of the parts of the trie are realized, and preferably only those parts of the physical data structure of the trie or of the parts of the trie are realized which need to be realized in that moment for the traversing the trie or the parts of the trie.

According to a 170$^{th}$ embodiment, in any one of embodiments 154 to 169, wherein evaluating a trie or parts of a trie comprises realizing the physical data structure of the trie or of the parts of the trie as a whole.

According to a 171$^{th}$ embodiment, in any one of embodiments 154 to 170, wherein a data item provided in the output represents a data unit containing a character string associated with a node of the result set of nodes of the resulting trie, preferably a document identifier.

According to a 172$^{th}$ embodiment, in any one of embodiments 154 to 171, wherein the storage trie is an index trie or physical index trie, preferably storing character strings comprised by documents and the respective document identifier as two key parts, e.g. (character string, long).

According to a 173$^{th}$ embodiment, in any one of embodiments 154 to 172, wherein the match trie comprises a set of matching nodes, each matching node being associated with one or more keys corresponding to one of the character strings from the set of approximate character strings, and the result set of nodes is the set of nodes of the resulting trie which correspond to the set of matching nodes in the match trie, wherein a node of the resulting trie corresponds to a node of the match trie if a key associated with the node of the resulting trie is identical to a key associated with the node of the match trie.

According to a 174th embodiment, in any one of embodiments 154 to 173, further comprising the step of obtaining a number N, wherein the variations of the search string consist of the set of character strings which can be obtained by at most N single-character insertions, deletions, and/or substitutions on the search string.

According to a 175th embodiment, in any one of embodiments 154 to 174, wherein the step of building the match trie comprises: building a finite automaton representing the set of approximate character strings; and deriving the match trie from the finite automaton.

According to a 176th embodiment, in the preceding embodiment, wherein a transition, preferably every transition between two states of the finite automaton, is associated with a specific character, preferably a character comprised by the search string, or a wildcard character, or an empty character string.

According to a 177th embodiment, in any one of embodiments 175 or 176, wherein the step of building the finite automaton comprises: building a non-deterministic finite automaton representing the set of approximate character strings; and deriving a deterministic finite automaton from the non-deterministic finite automaton; and wherein the match trie is derived from the deterministic finite automaton.

According to a 178th embodiment, in the preceding embodiment, wherein a transition, preferably every transition between two states of the deterministic finite automaton is associated with a specific character, preferably a character comprised by the search string, or a wildcard character.

According to a 179th embodiment, in any one of embodiments 154 to 178, wherein a node, preferably at least all parent nodes in the match trie and the storage trie comprise a bitmap, and a value of the key portion of a child node in a trie is determined by the value of a bit (set) in the bitmap comprised by a parent node of the child node with which bit the child node is associated.

According to a 180th embodiment, in the preceding embodiment, wherein determining the child nodes of a node of the resulting trie comprises intersecting the sets of child nodes of the node of the match trie and the node of the storage trie which correspond to the node of the resulting trie.

According to a 181st embodiment, in the preceding embodiment, wherein intersecting the sets of child nodes of the node of the match trie and the node of the storage trie comprises combining the bitmaps of the node of the match trie and the node of the storage trie, using a bitwise D operation, thereby obtaining a combined bitmap.

According to a 182nd embodiment, in the preceding embodiment, wherein the child nodes of the node of the resulting trie are determined and/or evaluated on the basis of the combined bitmap, preferably only on the basis of the combined bitmap.

According to a 183rd embodiment, in any one of embodiments 181 or 182, wherein the step of combining the bitmaps is performed before the child nodes of the node of the resulting trie are determined and/or evaluated and/or the evaluation of the resulting trie traverses to the child nodes of the node of the resulting trie.

According to a 184th embodiment, in embodiment 171 and any one of embodiments 179 to 183, wherein the step of deriving the match trie from the finite automaton comprises obtaining an augmented finite automaton by associating a transition, preferably every transition between two states of the finite automaton by an encoding of a specific character or of a wildcard character associated with the transition, which encoding consists of or is representative of one or more bitmaps whose length and/or format is equal to the bitmaps comprised by the parent nodes of the match trie, and wherein the match trie is derived from the augmented finite automaton.

According to a 185th embodiment, in the preceding embodiment, wherein for an encoding of a specific character, exactly one bit is set in each of the bitmaps comprised or represented by the encoding.

According to a 186th embodiment, in any one of embodiments 184 or 185, wherein for an encoding of a wildcard character, the bits of all valid character encodings are set in the bitmaps comprised or represented by the encoding, or the bits of all valid character encodings except for the encodings of the specific characters associated with the state from which the transition departs.

According to a 187th embodiment, in any one of embodiments 179 to 186, wherein a character stored in the match trie, the storage trie, or the resulting trie is encoded by a number of M>1, preferably 5>M, key portions of the respective trie.

According to a 188th embodiment, in the preceding embodiment, wherein the step of deriving the match trie from the finite automaton comprises obtaining a complete finite automaton representing the set of approximate character strings, by replacing a transition, preferably every transition, between two states of the finite automaton by, or associating a transition, preferably every transition, between two states of the finite automaton with M−1 levels of intermediate states and one or more sequences of M transitions which link the two states via M−1 of the intermediate states, wherein each of the M transitions in a sequence is associated with an intermediate encoding which consists of or is representative of a bitmap whose length and/or format is equal to the bitmaps comprised by the parent nodes of the match trie, and wherein the match trie is derived from the complete finite automaton.

According to a 189th embodiment, in embodiment 188, wherein if the transition between the two states of the finite automaton is associated with a specific character, the concatenation of the bitmaps comprised by or represented by the intermediate encodings associated with the M transitions of a sequence is an encoding of the specific character, and exactly one bit is set in each of the bitmaps.

According to a 190th embodiment, in any one of embodiments 188 or 189, wherein if the transition between the two states of the finite automaton is associated with a wildcard character, the concatenation of the bitmaps comprised by or represented by the intermediate encodings associated with the M transitions of a sequence comprises an encoding where the bits of all valid character encodings are set in the bitmaps comprised or represented by the encoding, or the bits of all valid character encodings except for the encodings of the specific characters associated with the state from which the transition departs and/or one or more encodings comprising one or more portions of an encoding of the specific character and one or more portions of an encoding where the bits of all valid character encodings are set in the bitmaps comprised or represented by the encoding, or the bits of all valid character encodings except for the encodings of the specific characters associated with the state from which the transition departs.

According to a 191st embodiment, in any one of embodiments 184 to 186, or of any one of embodiments 188 to 190, respectively, wherein the augmented finite automaton or the complete finite automaton, respectively, is represented by or stored in a data structure comprising a number of rows, each row representing one state of the augmented finite automaton or the complete finite automaton and comprising a tuple for each of the transitions departing from the state, each tuple comprising the encoding associated with the transition and a reference to the state in which the transition ends.

According to a 192$^{th}$ embodiment, in the preceding embodiment, wherein the data structure comprises, for each state in which a transition ends, information about whether this state is a matching state, preferably encoded as a bit in each reference to the state.

According to a 193$^{th}$ embodiment, in any one of embodiments 191 or 192, wherein the data structure comprises a row for each of the states of the augmented finite automaton or the complete finite automaton, respectively, from which a transition departs.

Trie Data Structure

According to a 194$^{th}$ embodiment, in any one of embodiment 93 to 193, wherein a trie is a trie according to any one of embodiment 1 to 92.

Different Categories of Inventions

A 195$^{th}$ embodiment is a computer-implemented method of using the trie of any one of embodiments 1 to 92 in an electronic database application or information retrieval system, in particular for storing keys or keys and values, for storing result keys or keys and values of a query, or for storing input keys or keys and values for a query.

A 196$^{th}$ embodiment is a computer-implemented method of generating the trie of any one of embodiments 1 to 92.

A 197$^{th}$ embodiment is a non-transitory computer readable medium having stored thereon the trie of any one of embodiments 1 to 92.

A 198$^{th}$ embodiment is a stream of electronic data which is representative of the trie of any one of embodiments 1 to 92.

A 199$^{th}$ embodiment is an electronic database or information retrieval system storing keys or keys and values, result keys or keys and values of a query, or input keys or keys and values for a query by means of the trie of any one of embodiments 1 to 92.

A 200$^{th}$ embodiment is a computer program, in particular a database application or information retrieval system program, comprising instructions for performing the method of any one of embodiments 93 to 196.

A 201$^{st}$ embodiment is a data-processing device or system comprising one or more processors and memory, the data-processing device or system being configured to perform the method of any one of embodiments 93 to 196.

A 202$^{nd}$ embodiment is a preferably non-transitory computer readable medium having stored thereon the computer program of embodiment 201.

BRIEF DESCRIPTION OF E DRAWINGS

In the following, the invention will be described in greater detail in connection with the preferred embodiments and with reference to the drawings, in which FIG. 1 shows an example of a trie data structure used in prior art databases;

Figure 8:
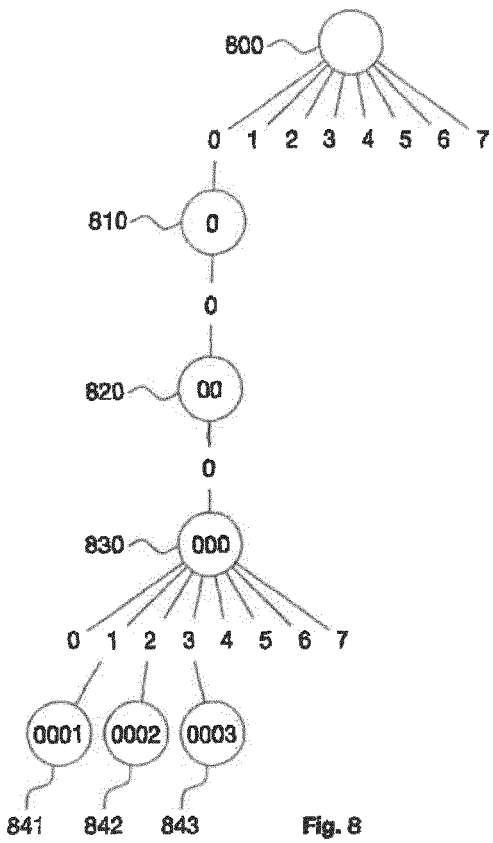
Figure 9:
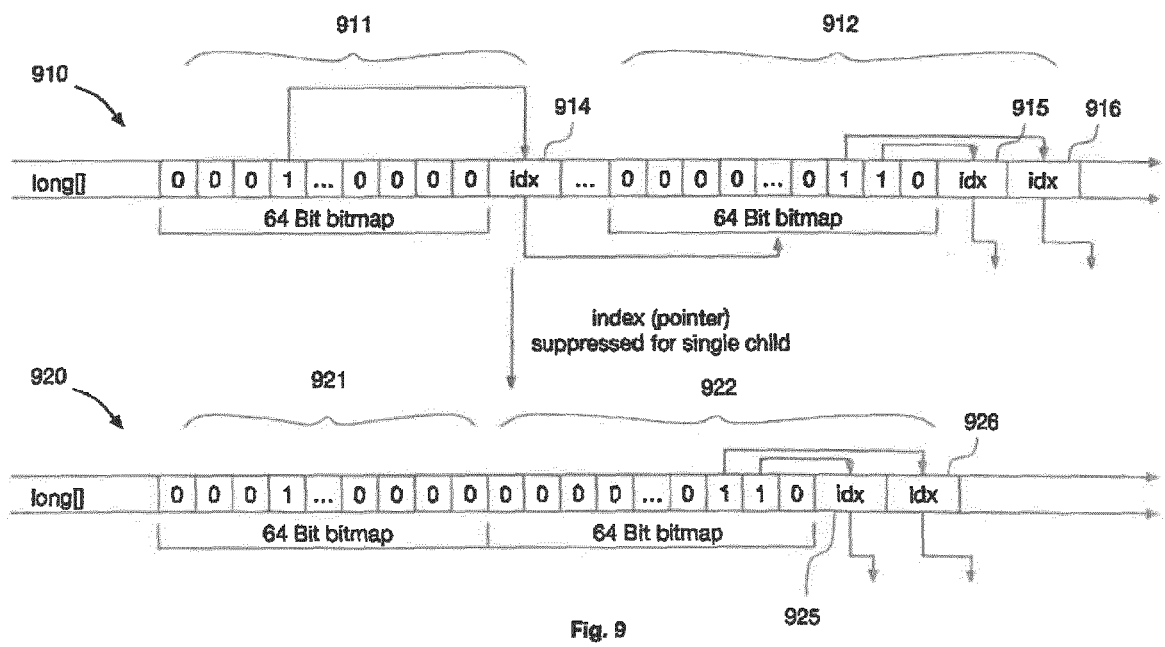
Figure 10:
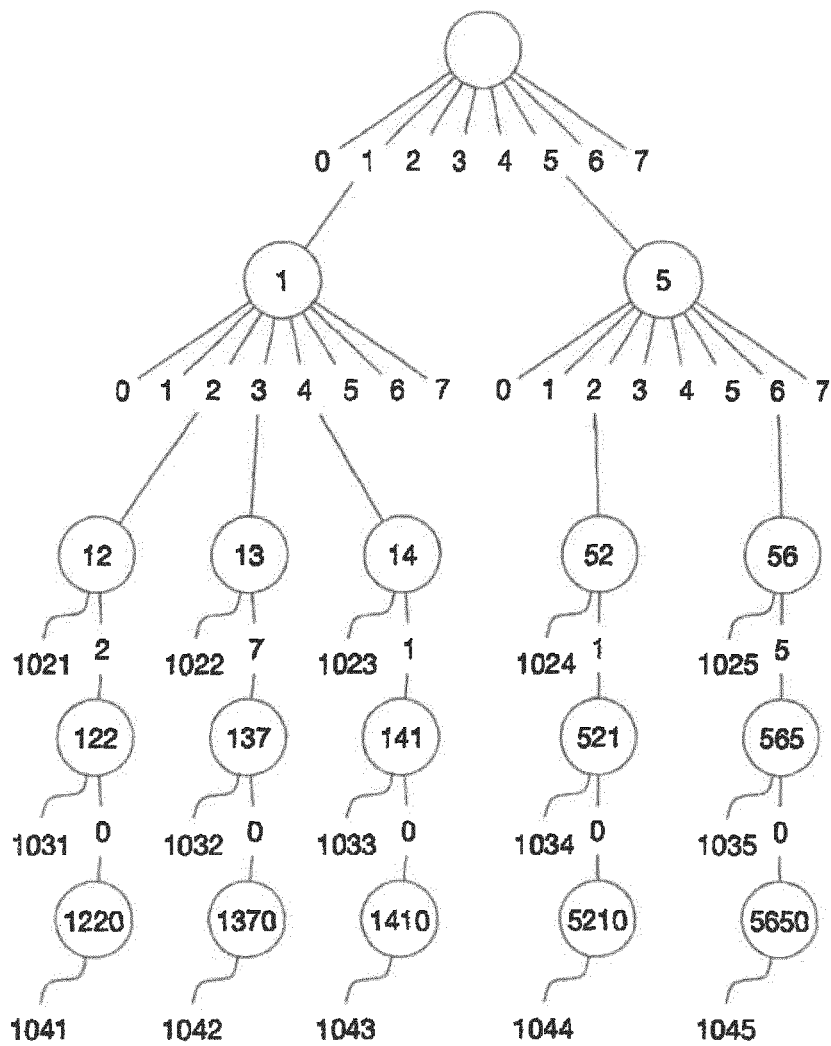
Figure 11:
Figure 12:
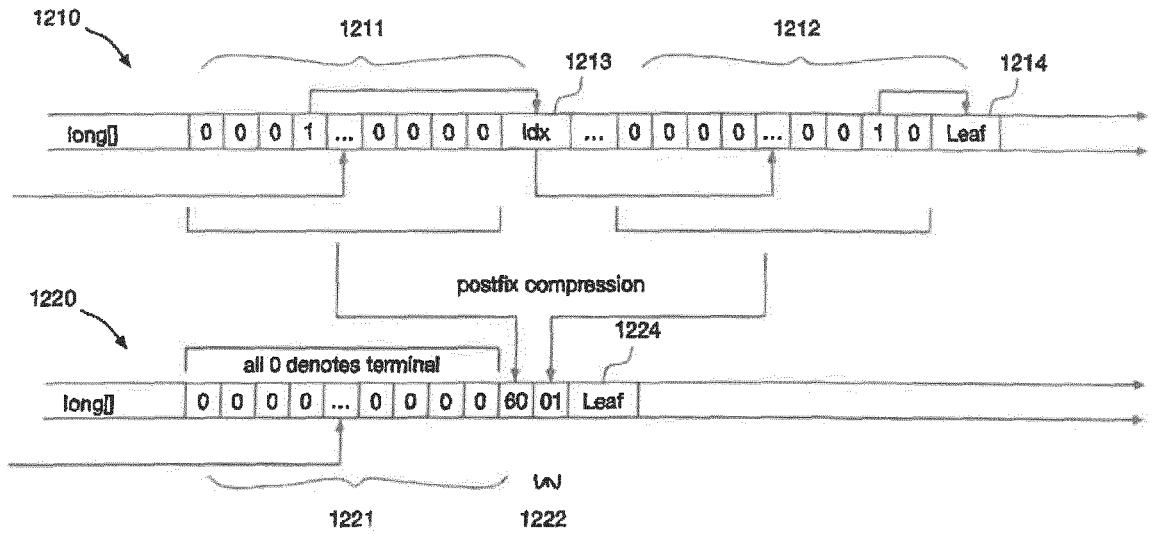
Figure 13:
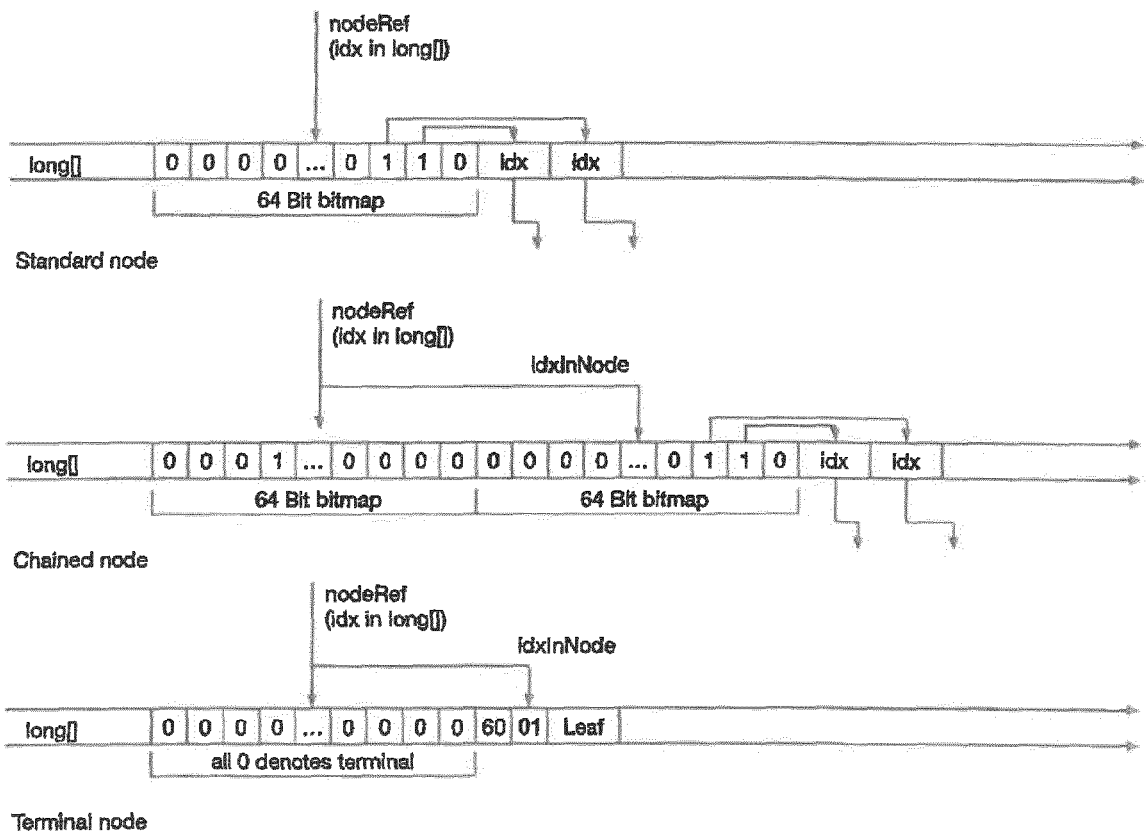
Figure 16:
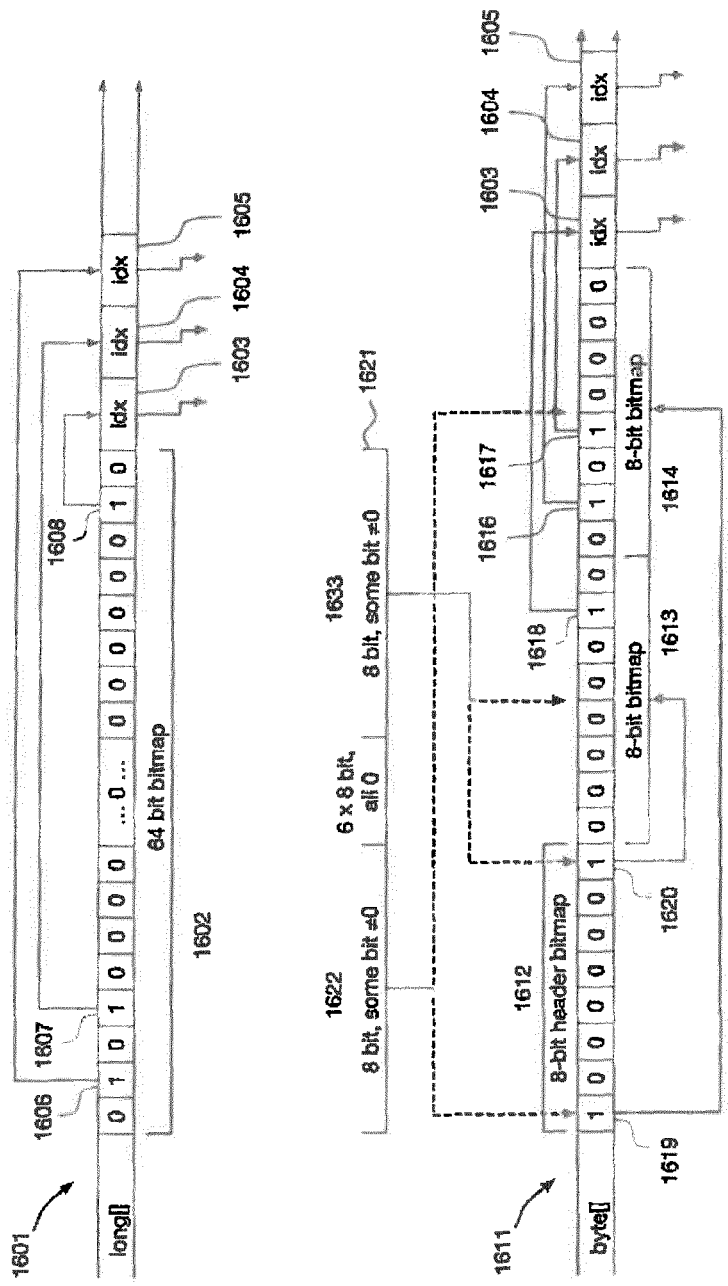
Figure 17:
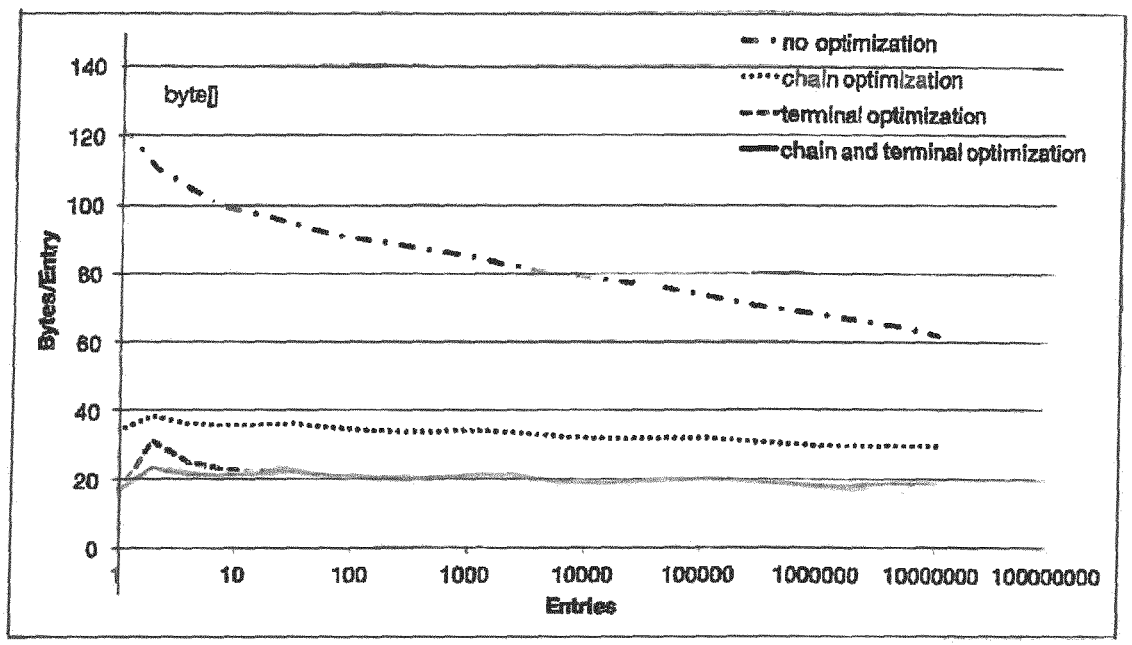
Figure 18:
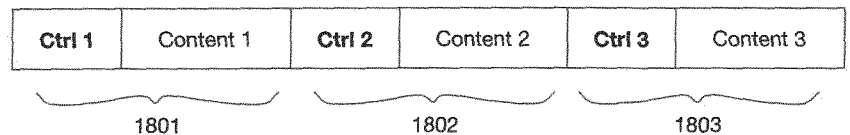
Figure 19:
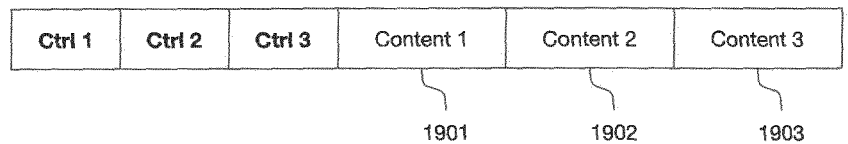
Figure 20:
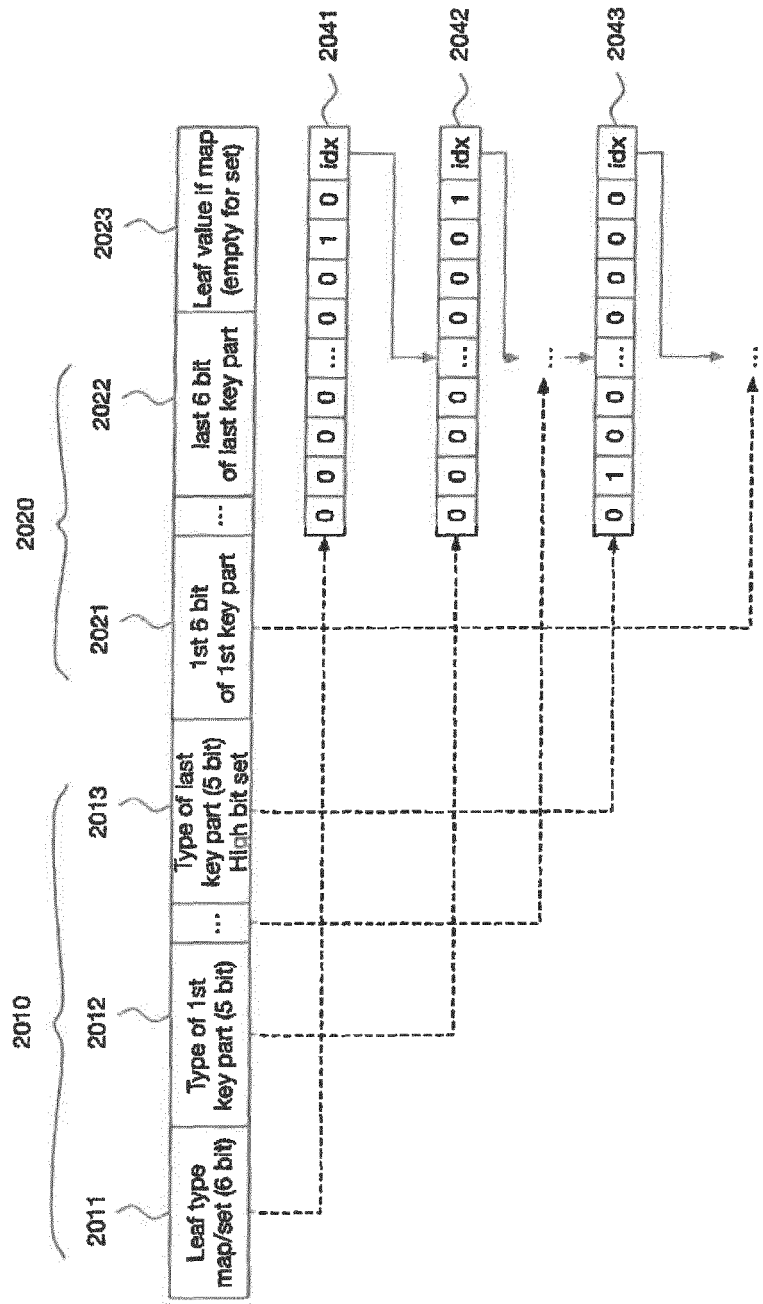
Figure 21:
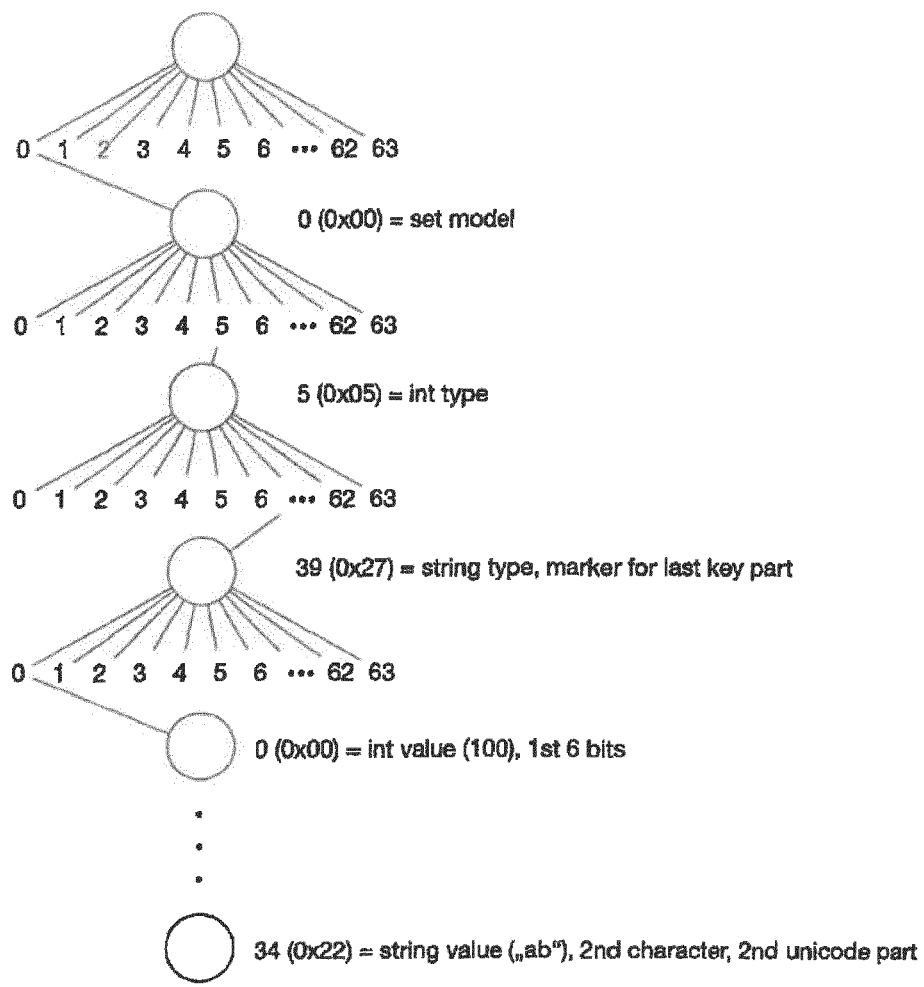
Figure 22:
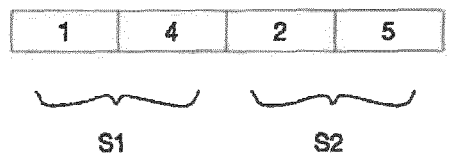
Figure 23:
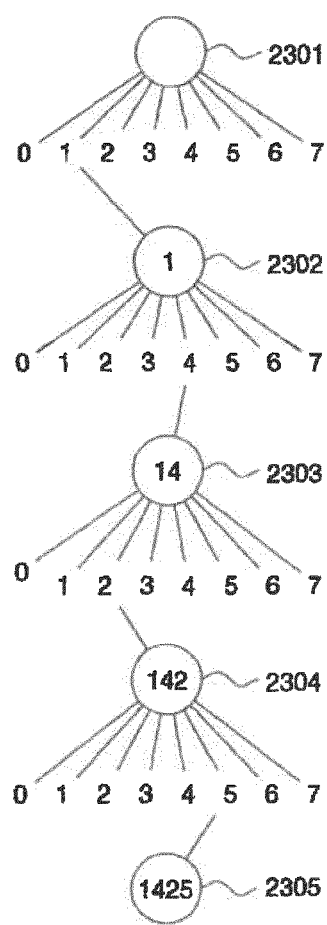
Figure 24:
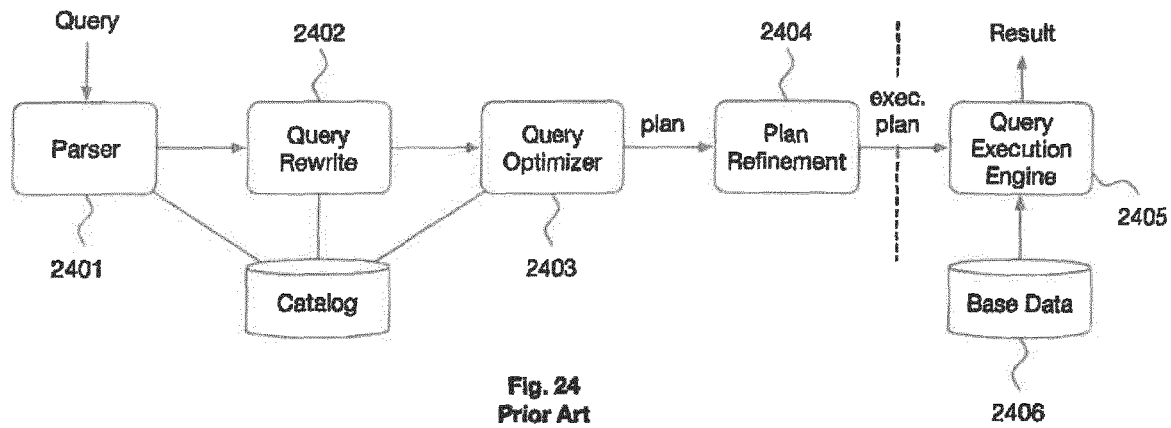
Figure 25:
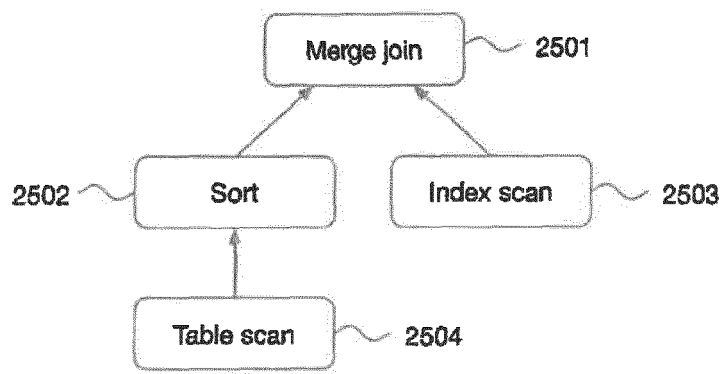
Figure 26:
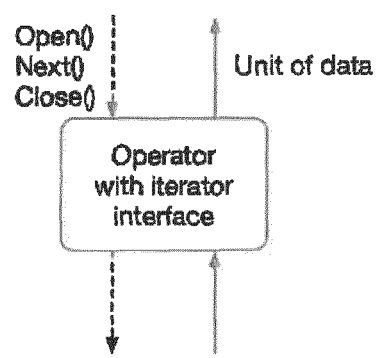
Figure 27:
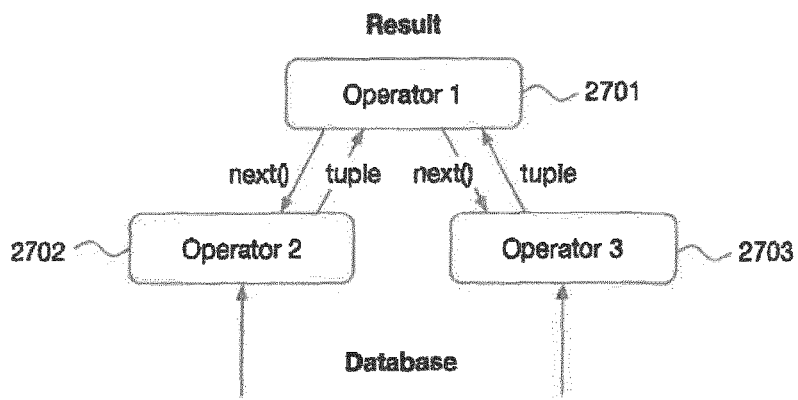
Figure 28:
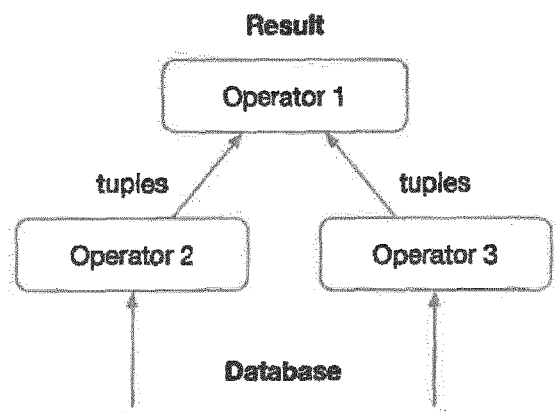
Figure 29:
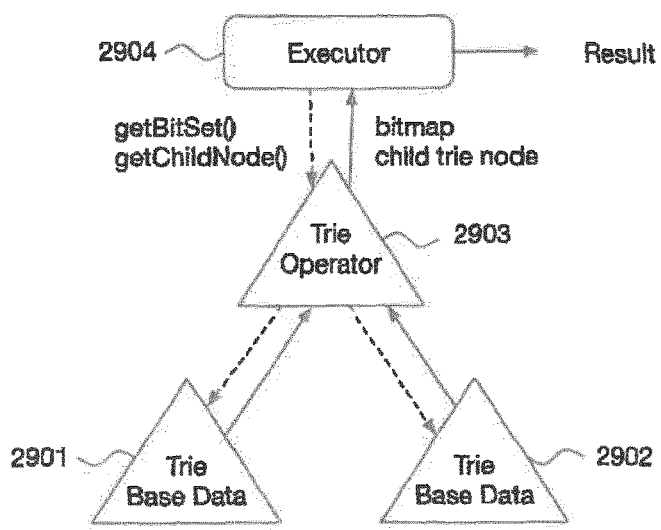
Figure 29A:
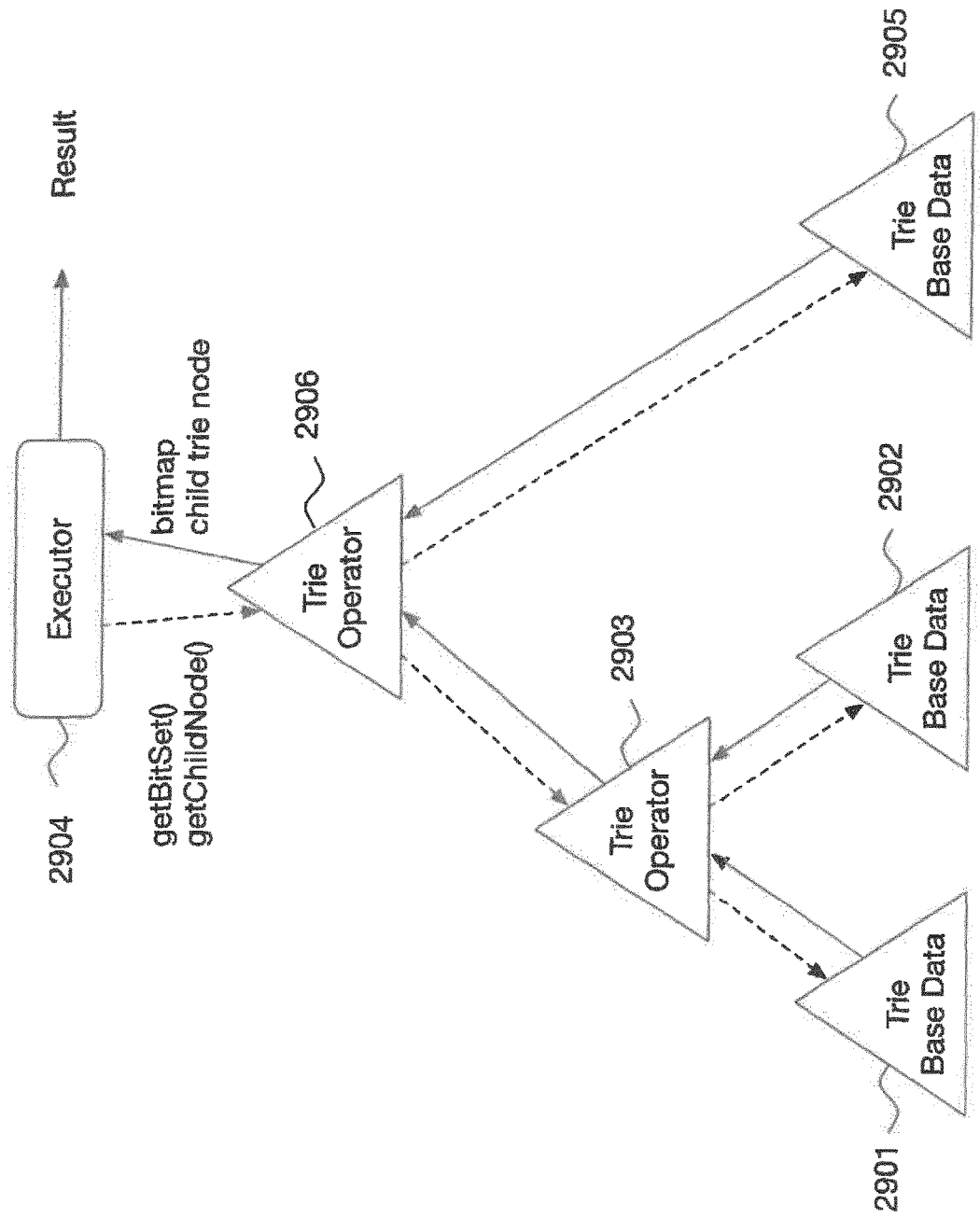
Figure 30:
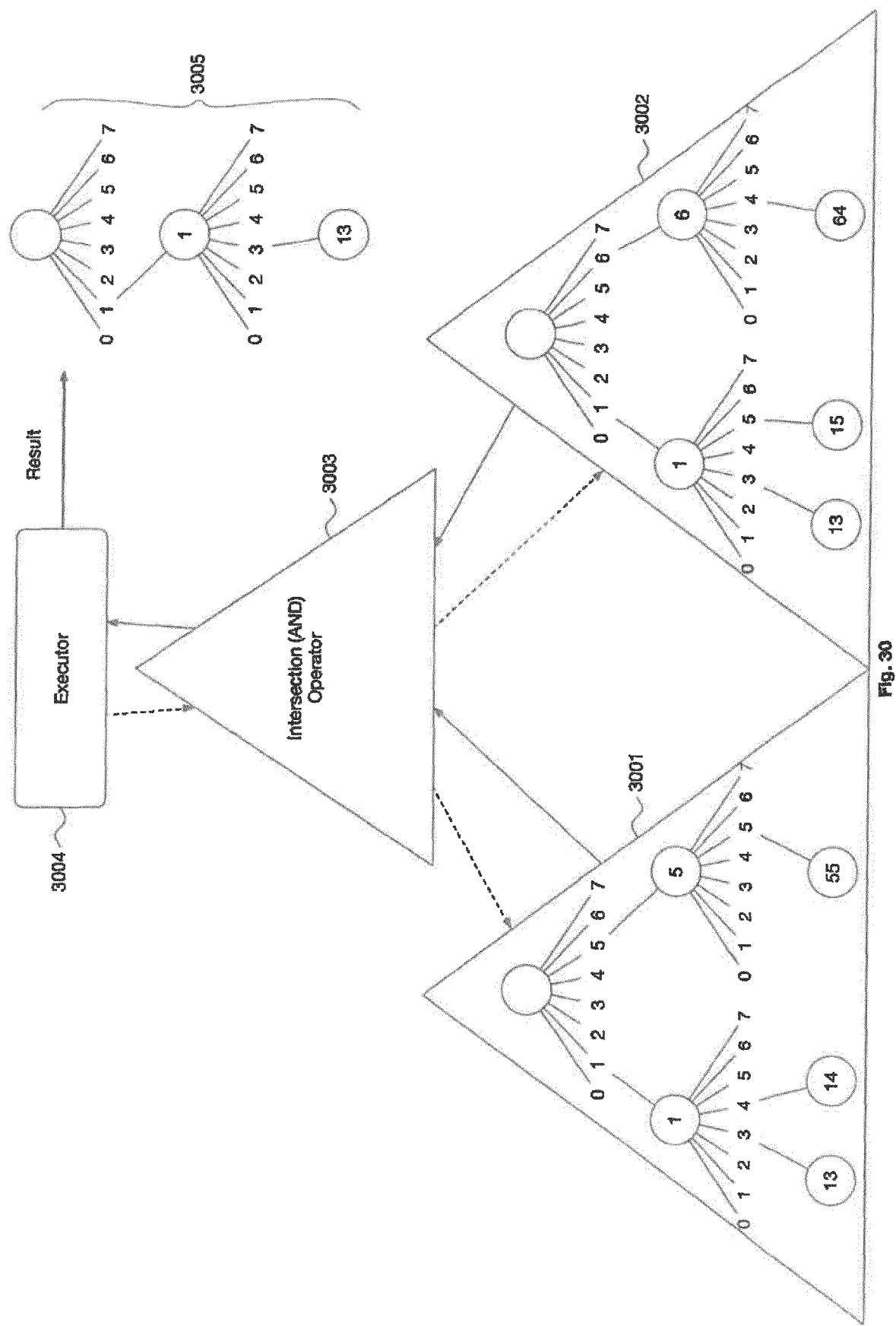
Figure 31:
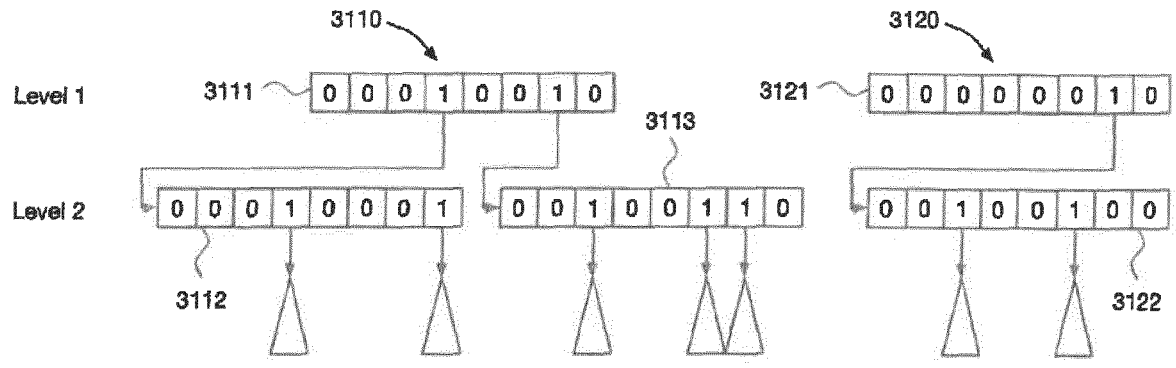
Figure 32:
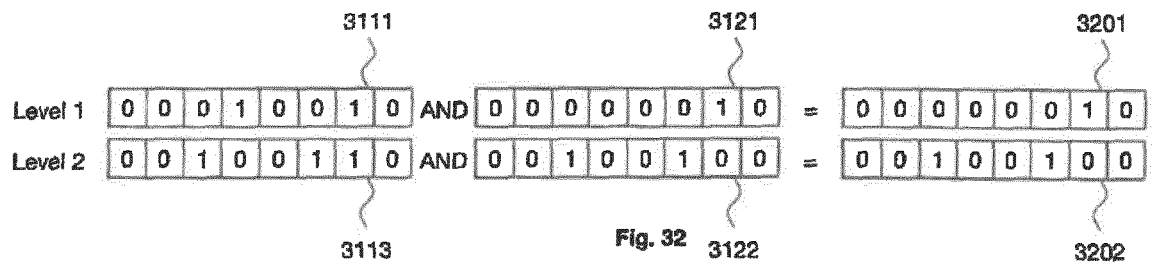
Figure 33:
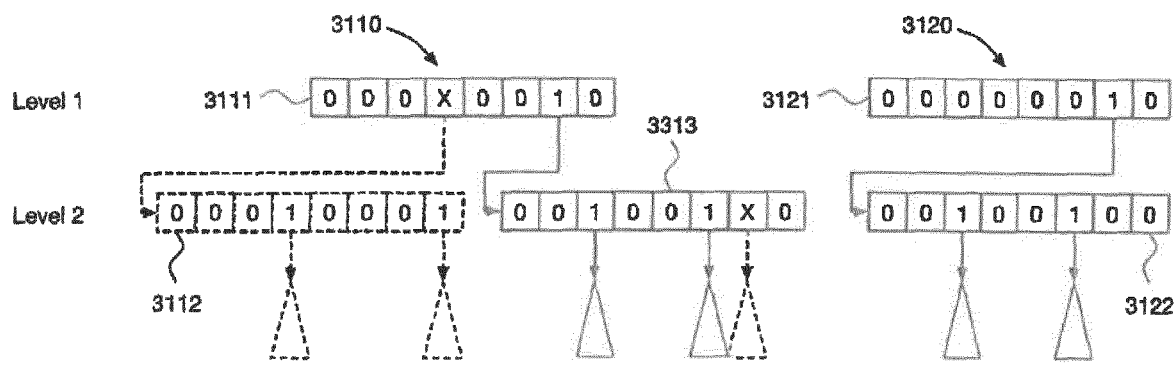
Figure 34:
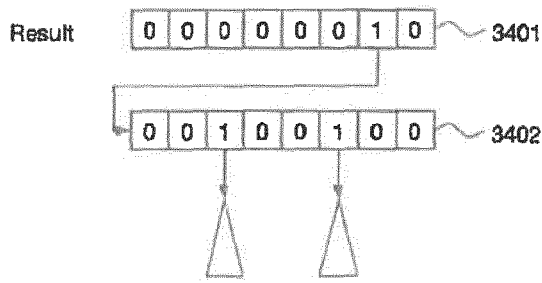
Figure 35:
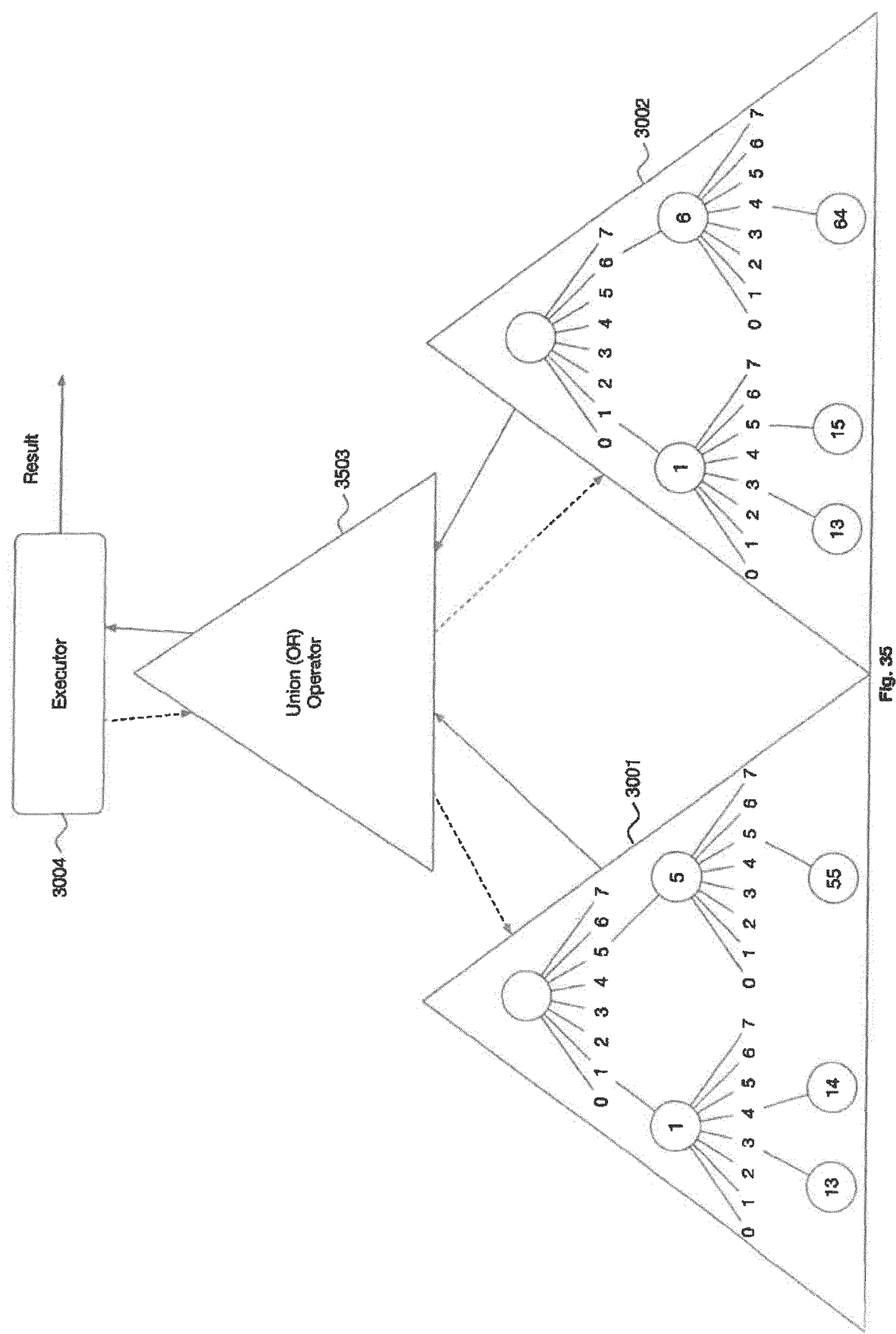
Figure 36:
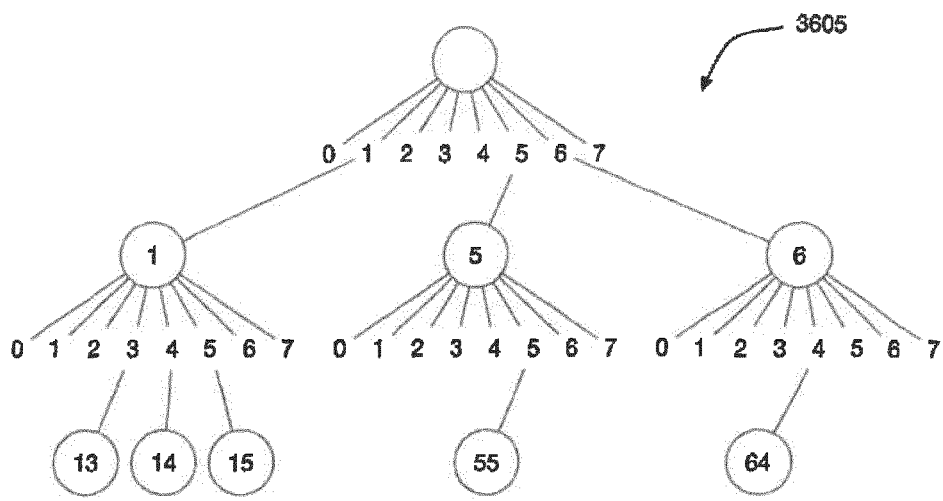
Figure 38:
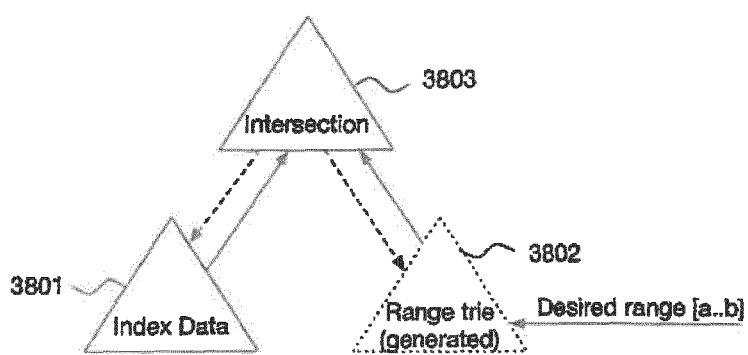
Figure 37:
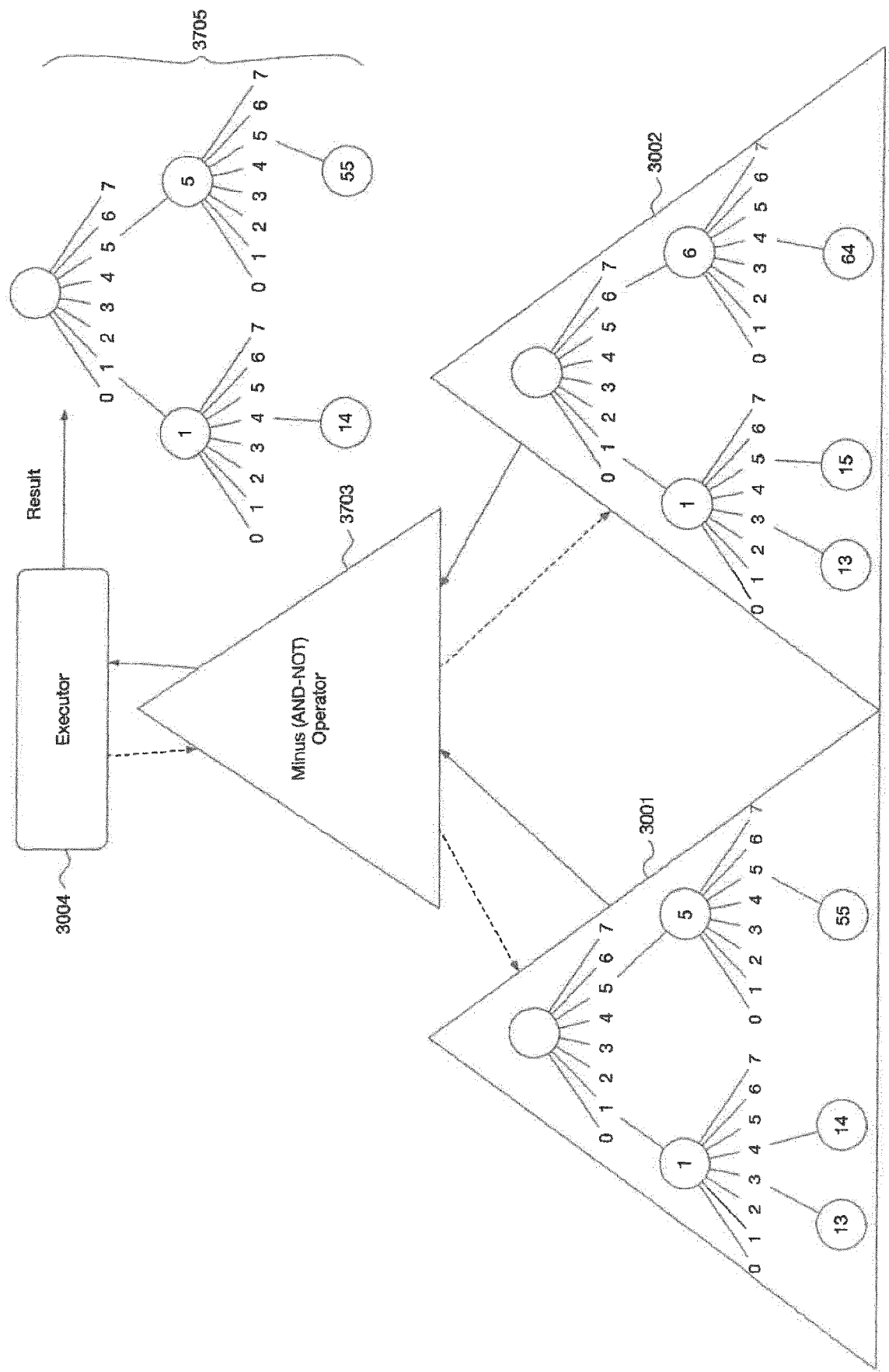
Figure 37A:
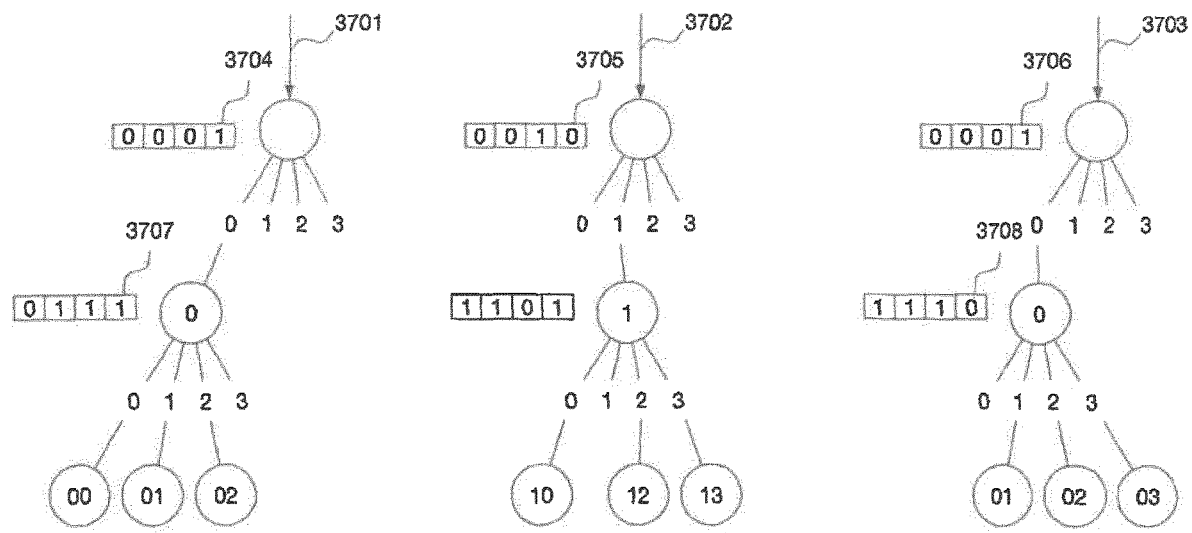
Figure 37B:
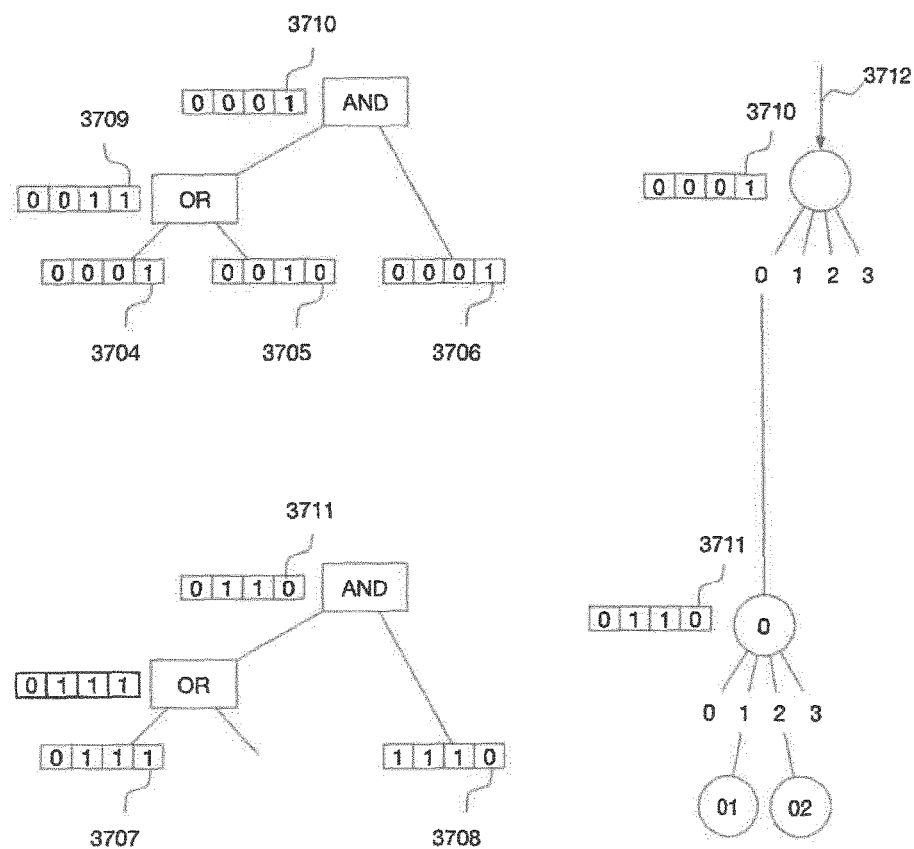
Figure 40:
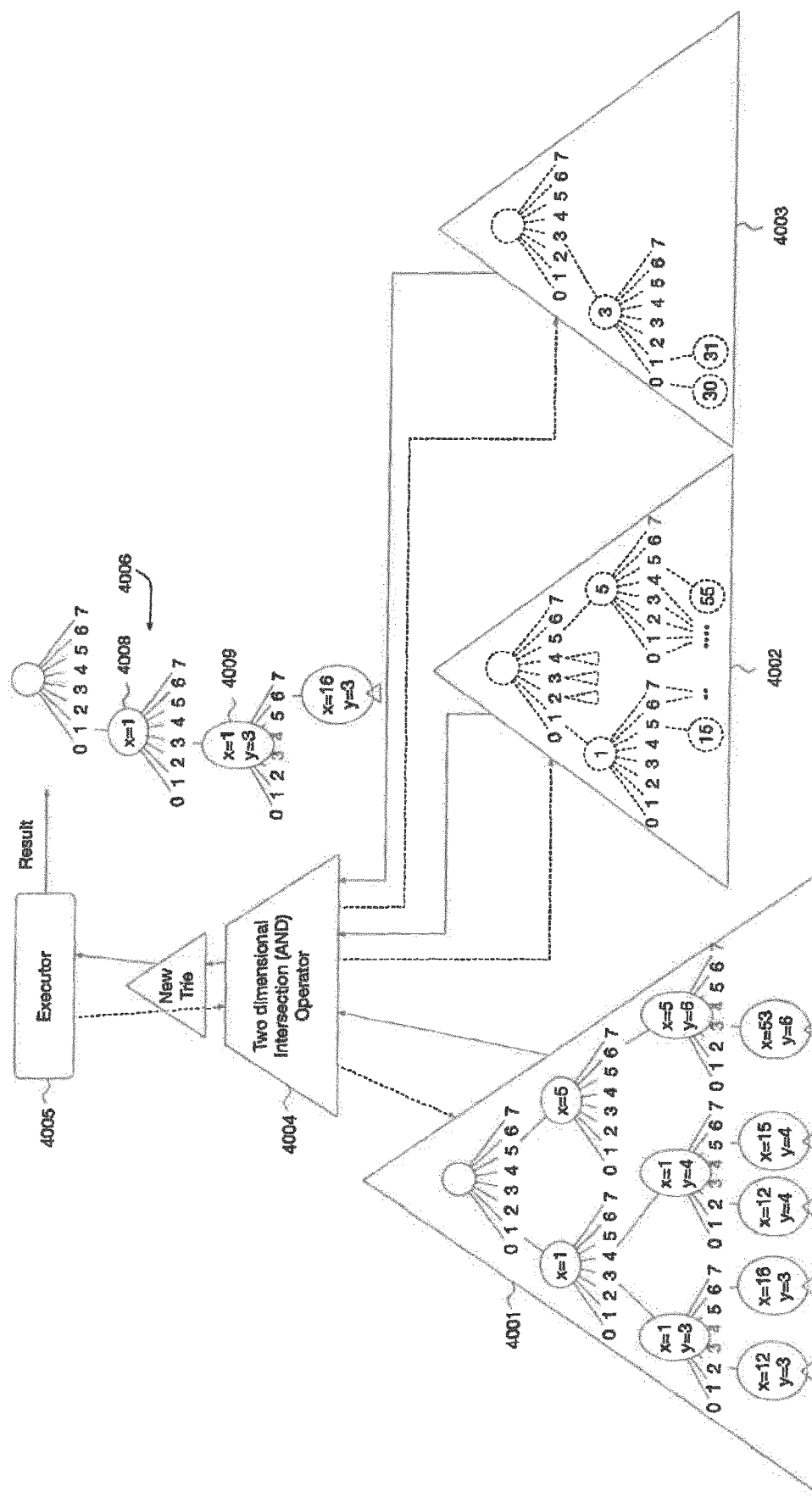
Figure 42:
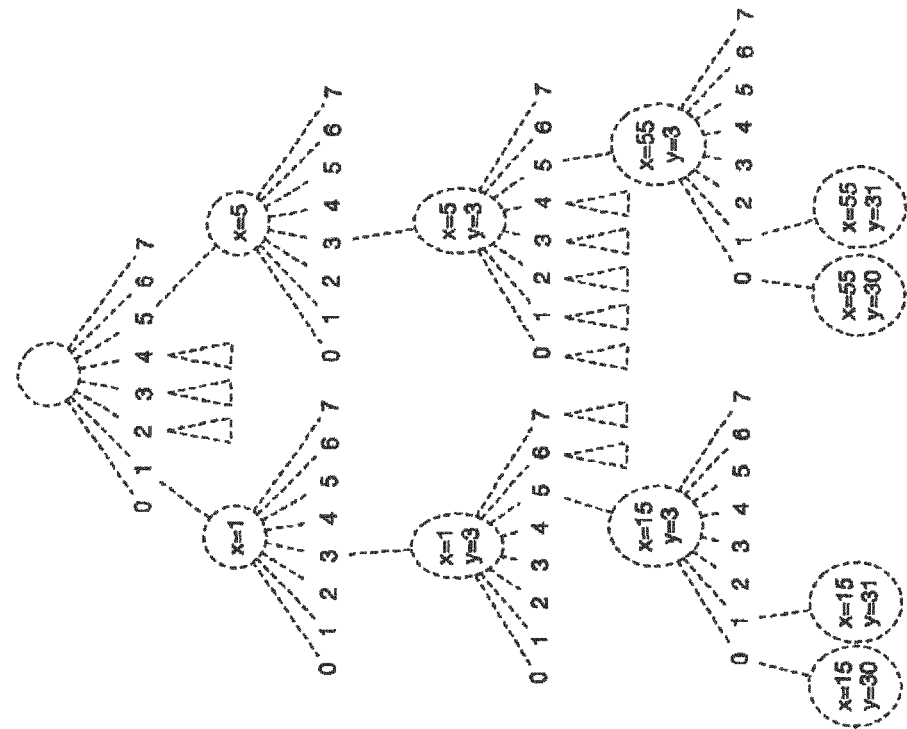
Figure 41:
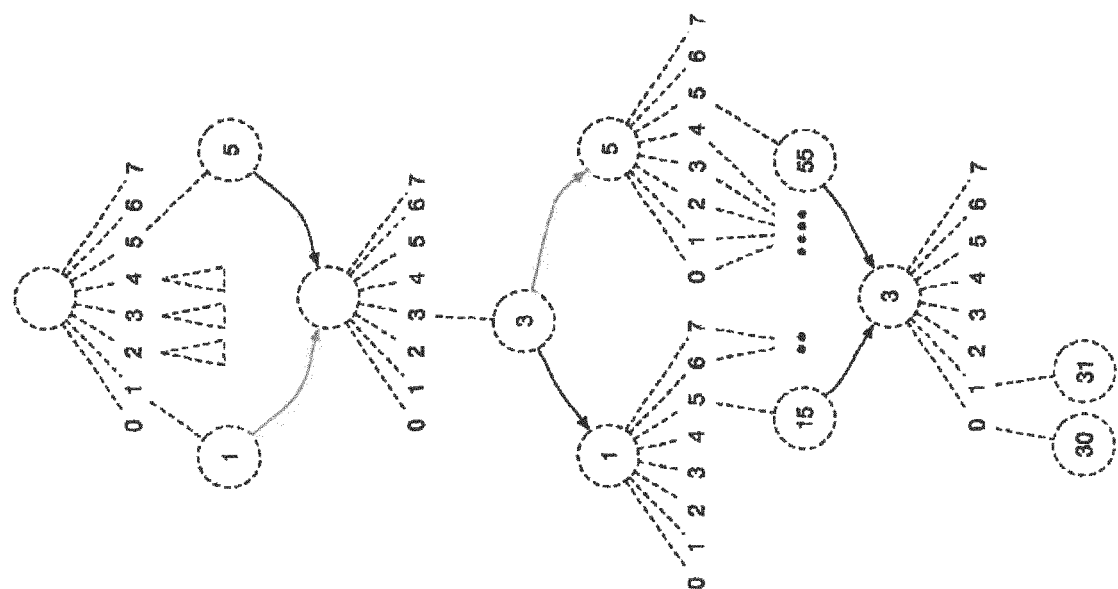
Figure 44:
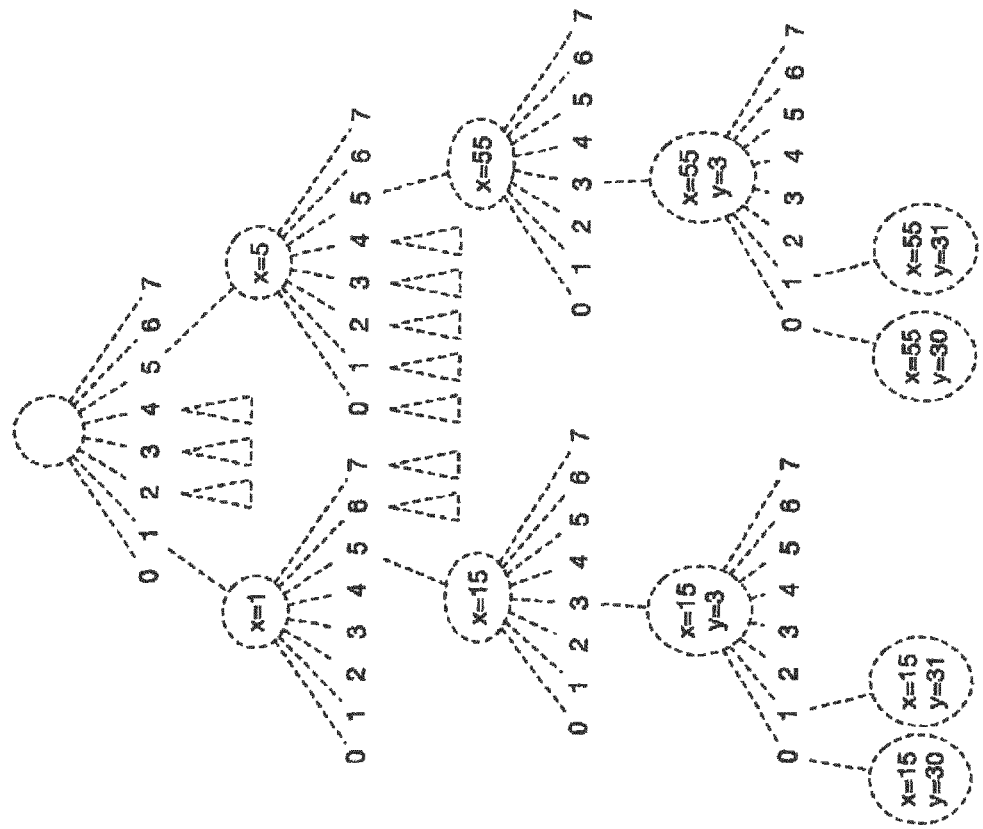
Figure 43:
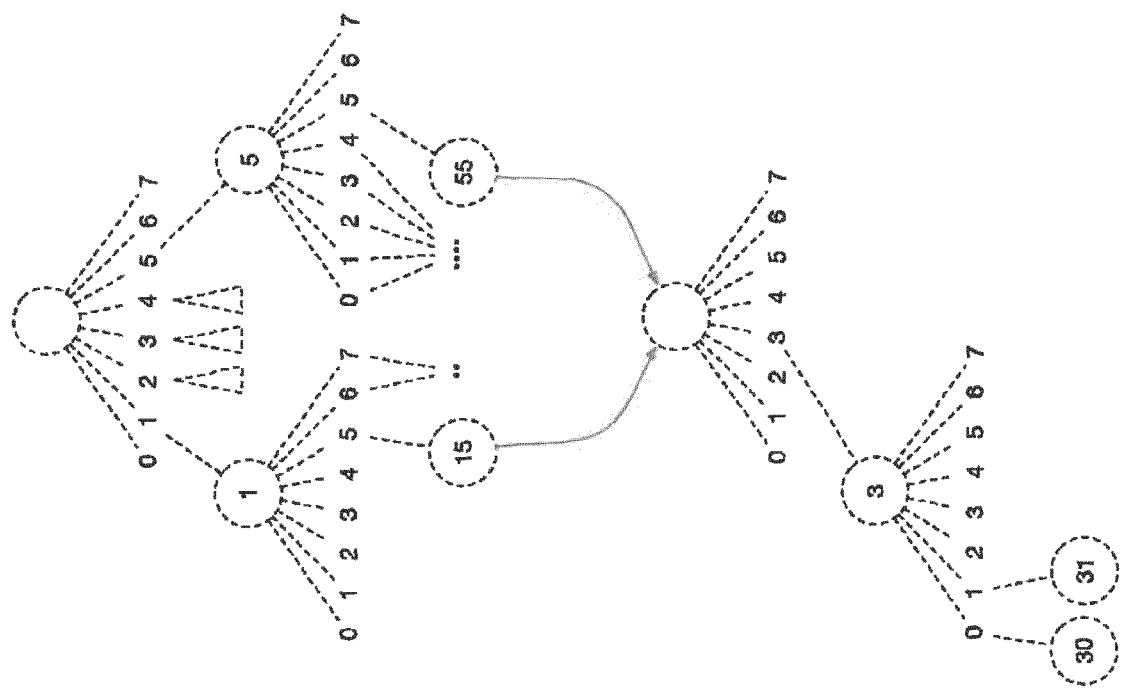
Figure 45:
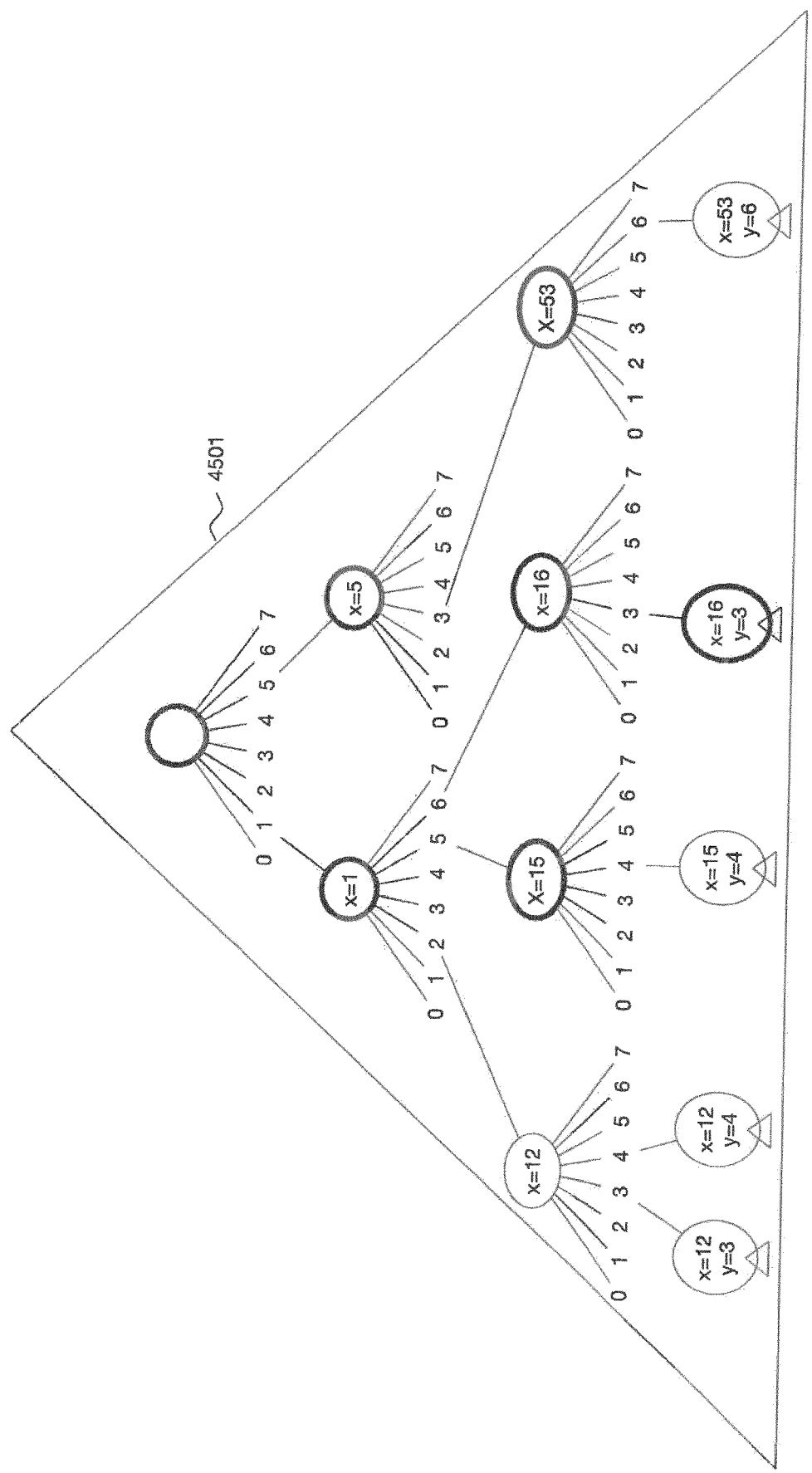
Figure 46:
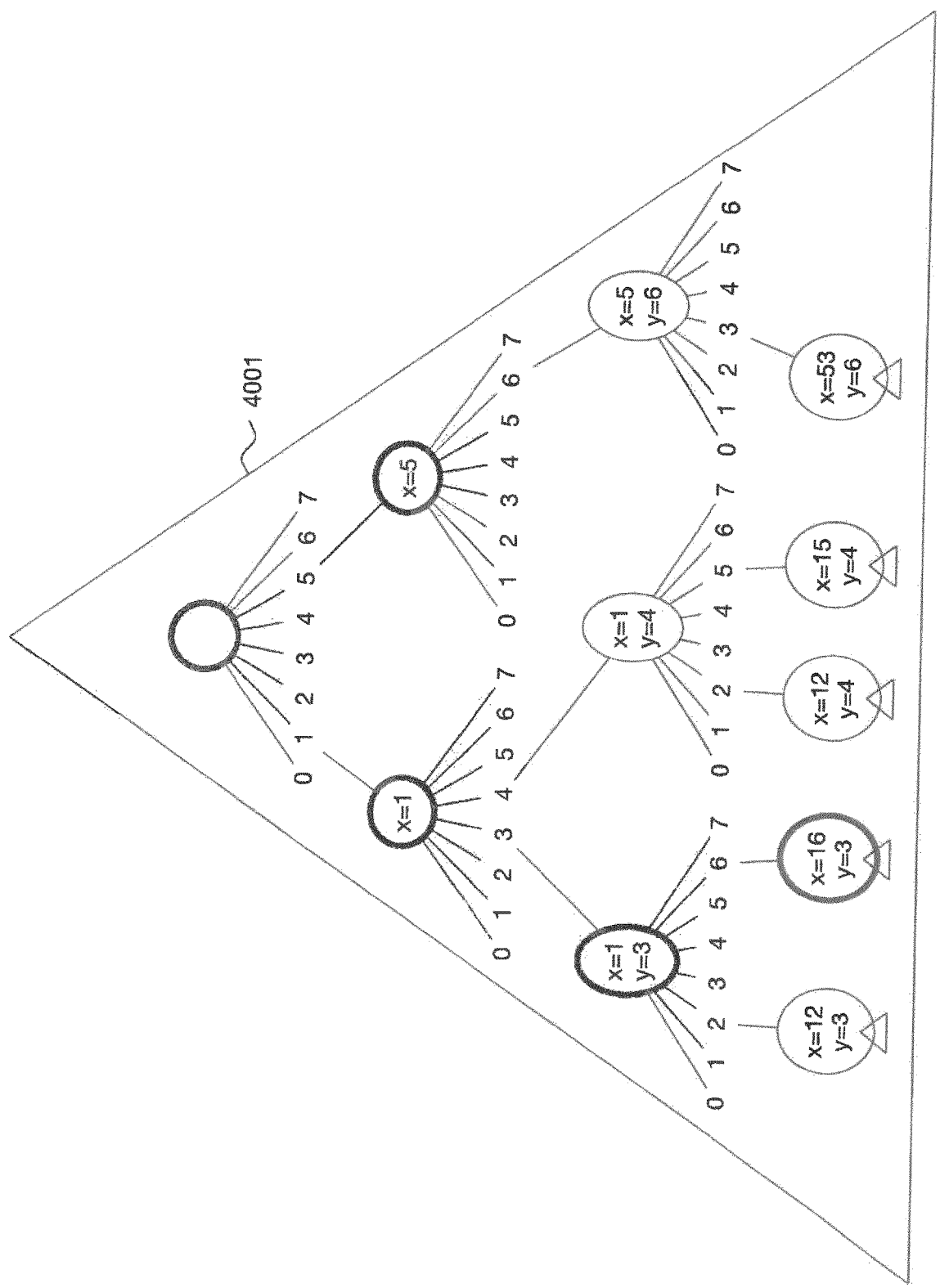
Figure 47:
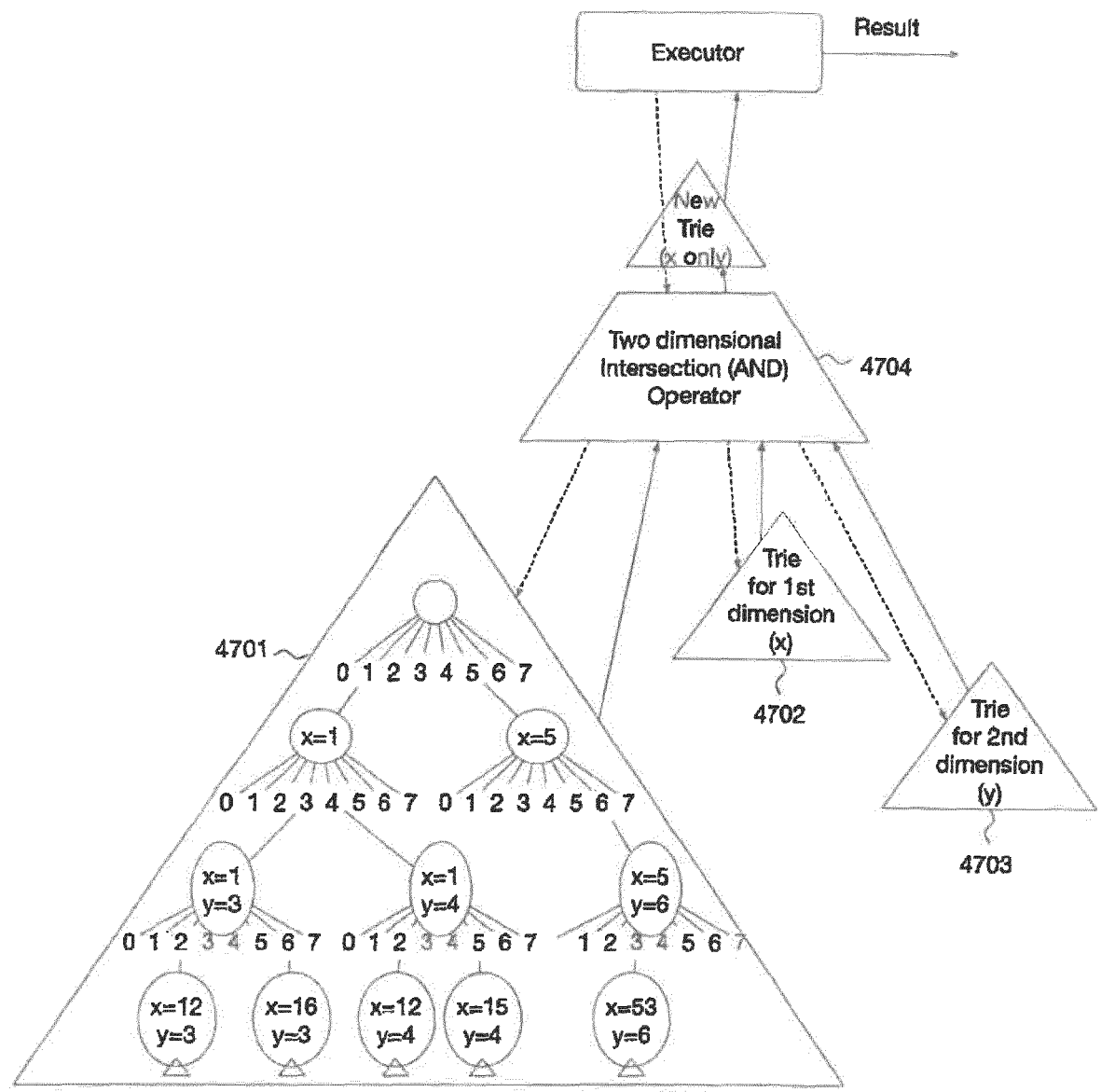
Figure 48:
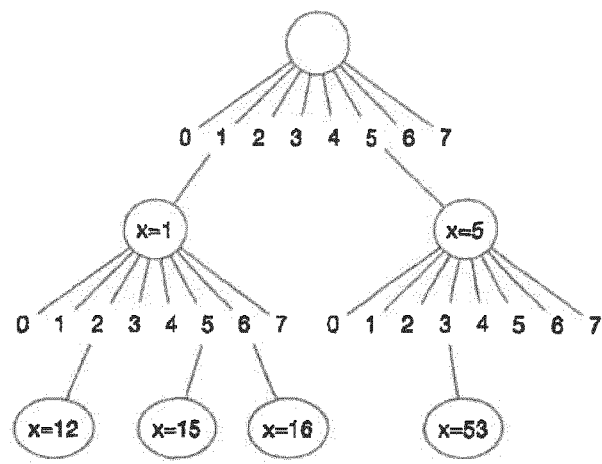
Figure 48A:
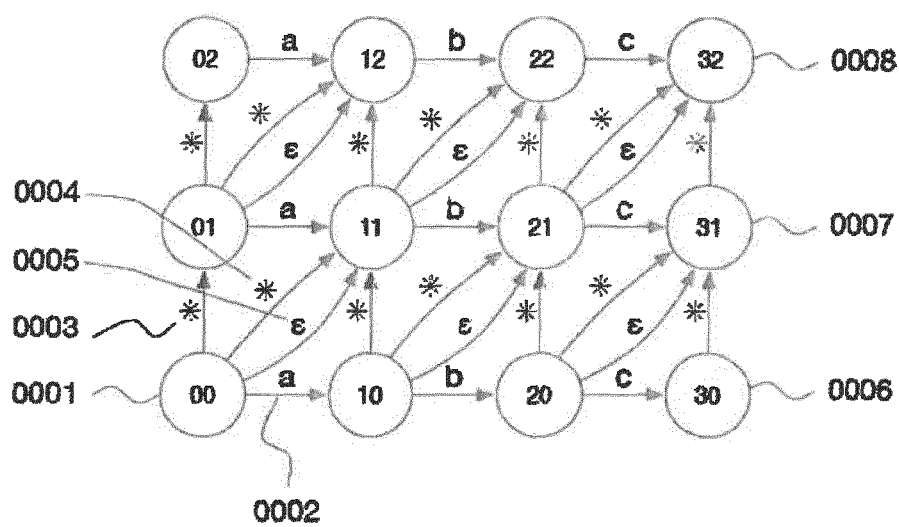
Figure 48B:
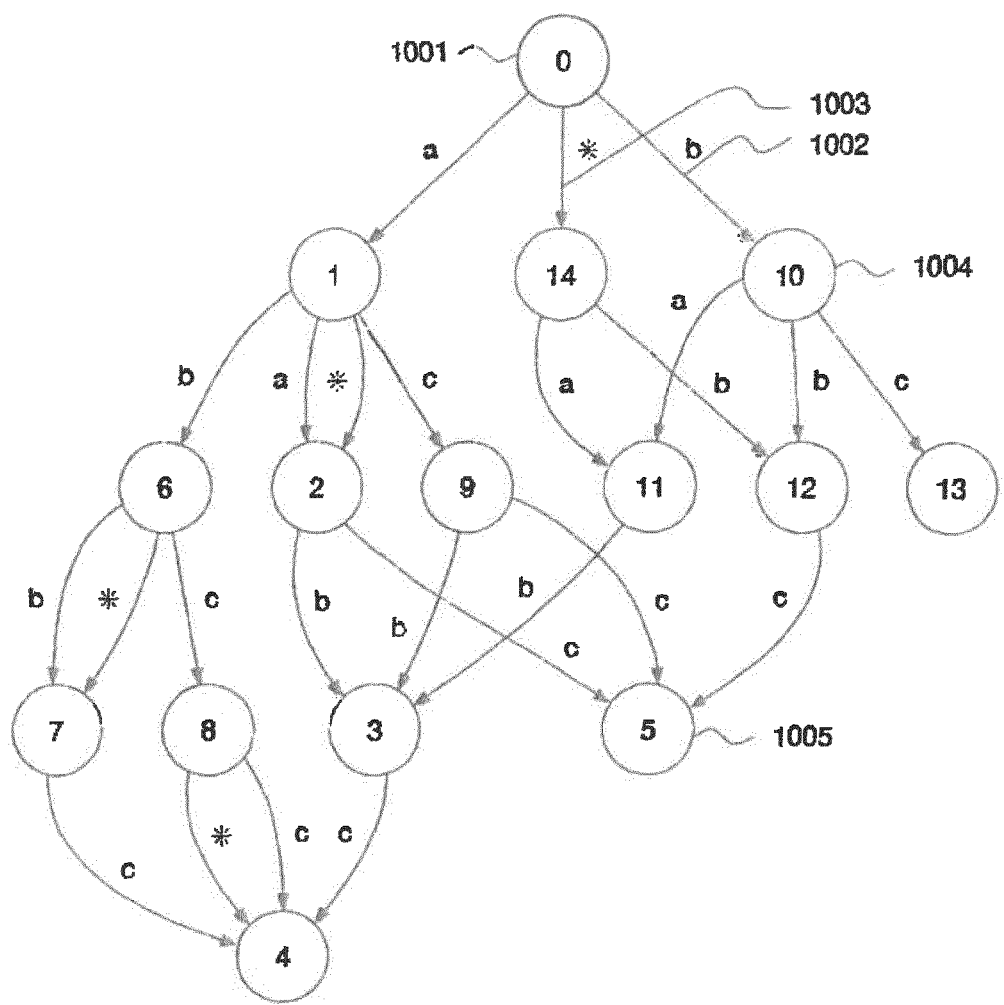
Figure 46C:
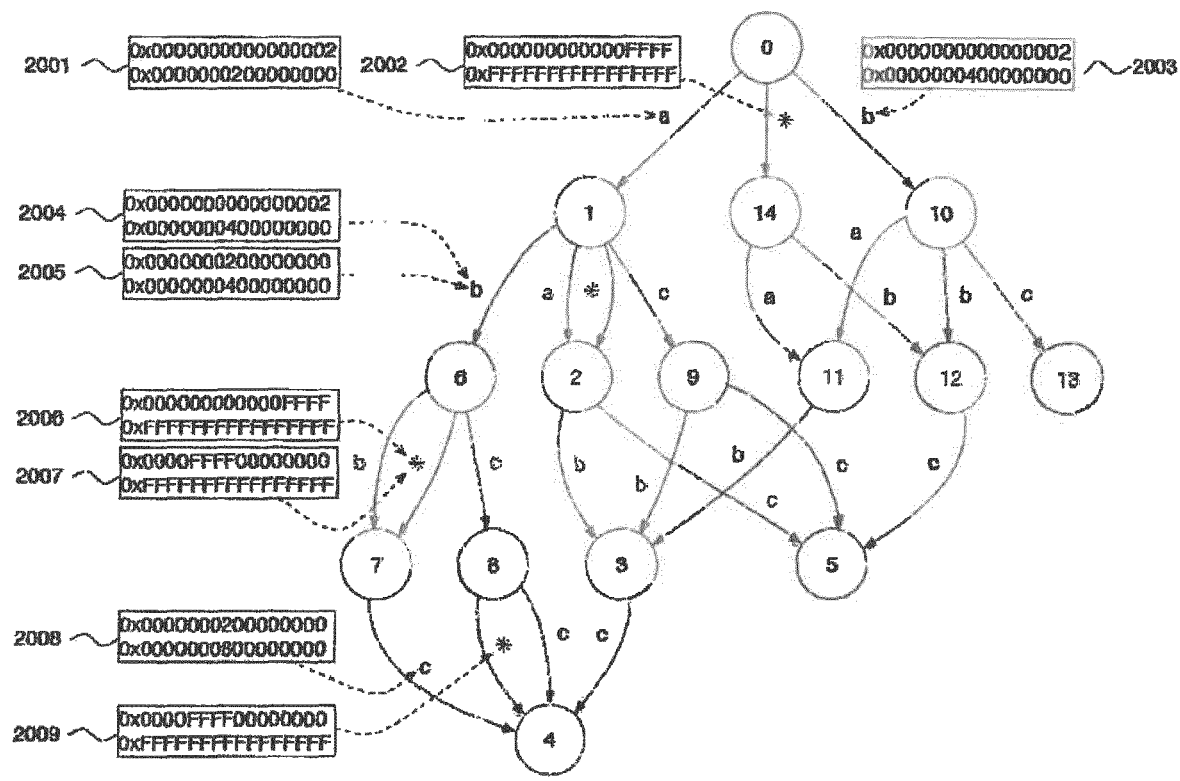
Figure 46D:
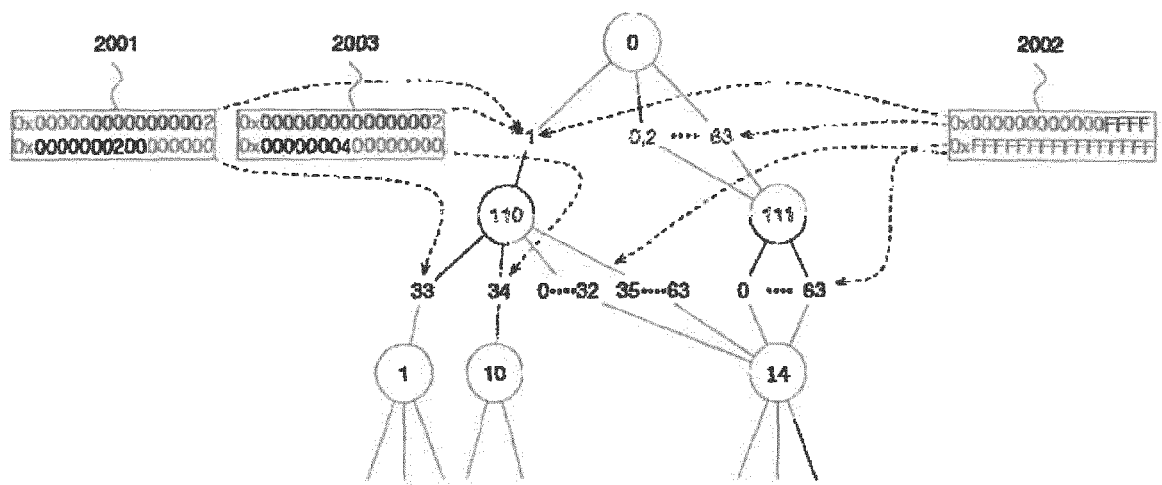
Figure 48E:
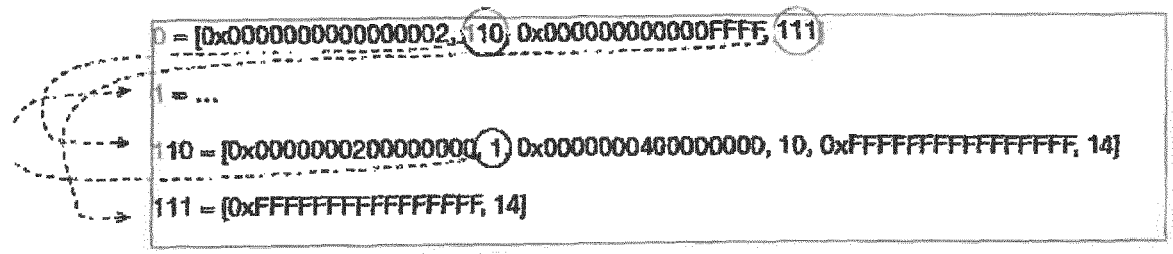
Figure 49:
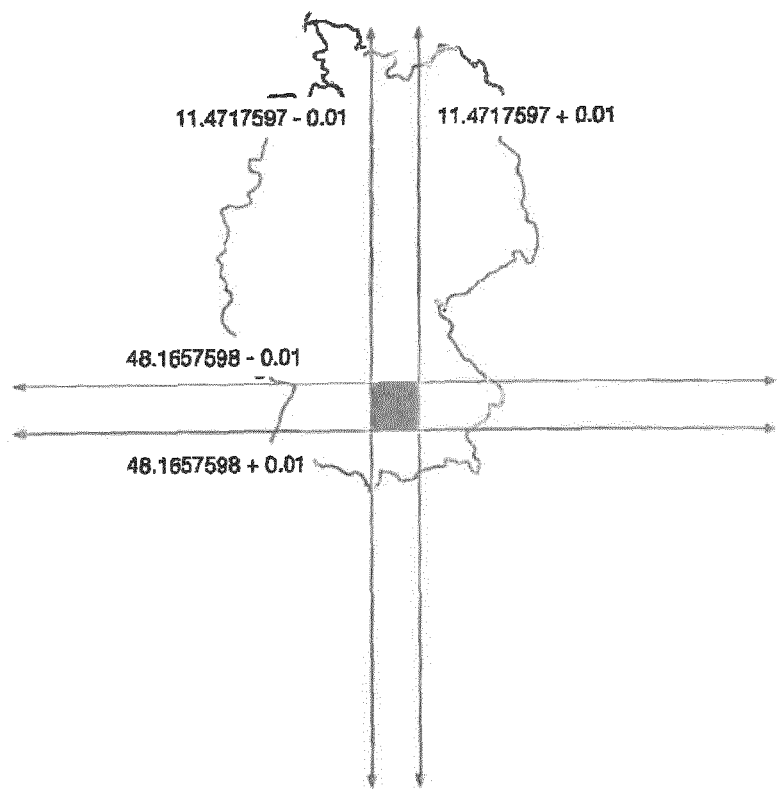
Figure 50:
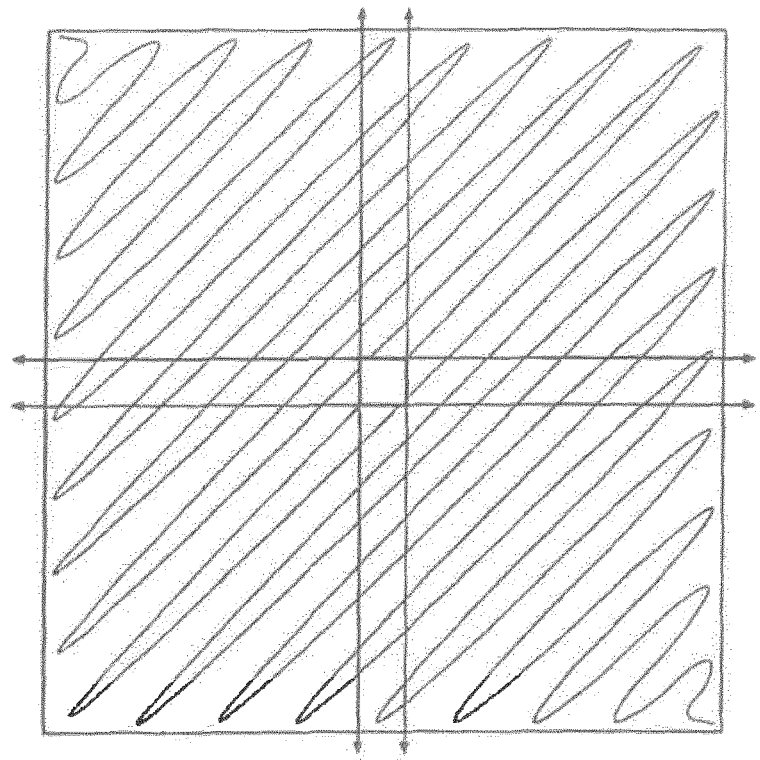
Figure 51:
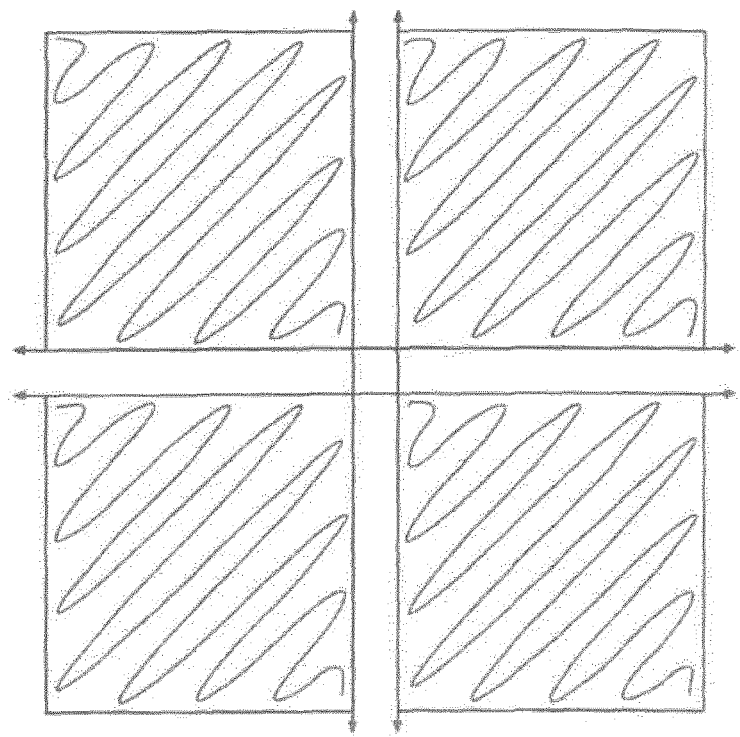
Figure 52:
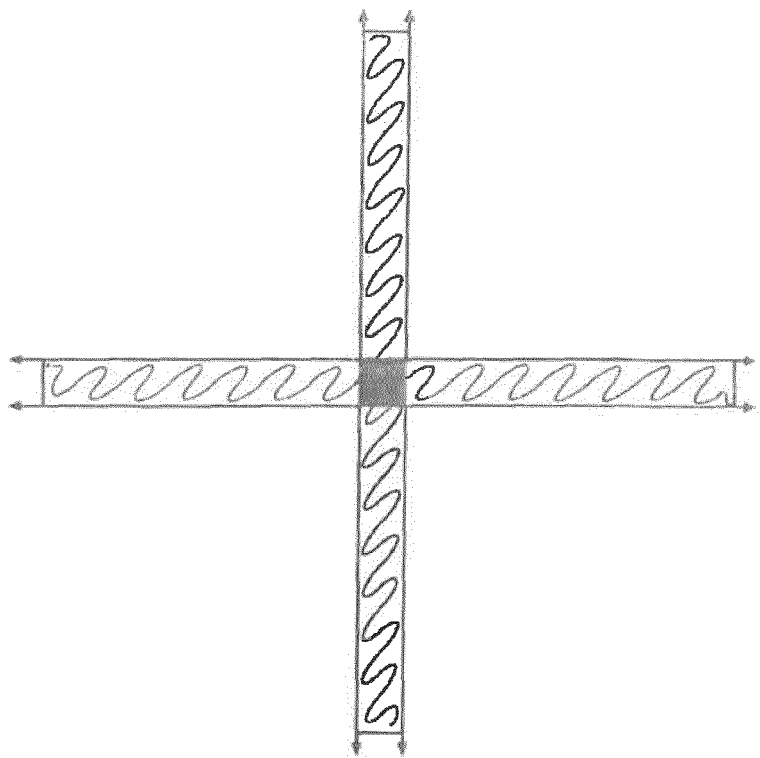
Figure 53:
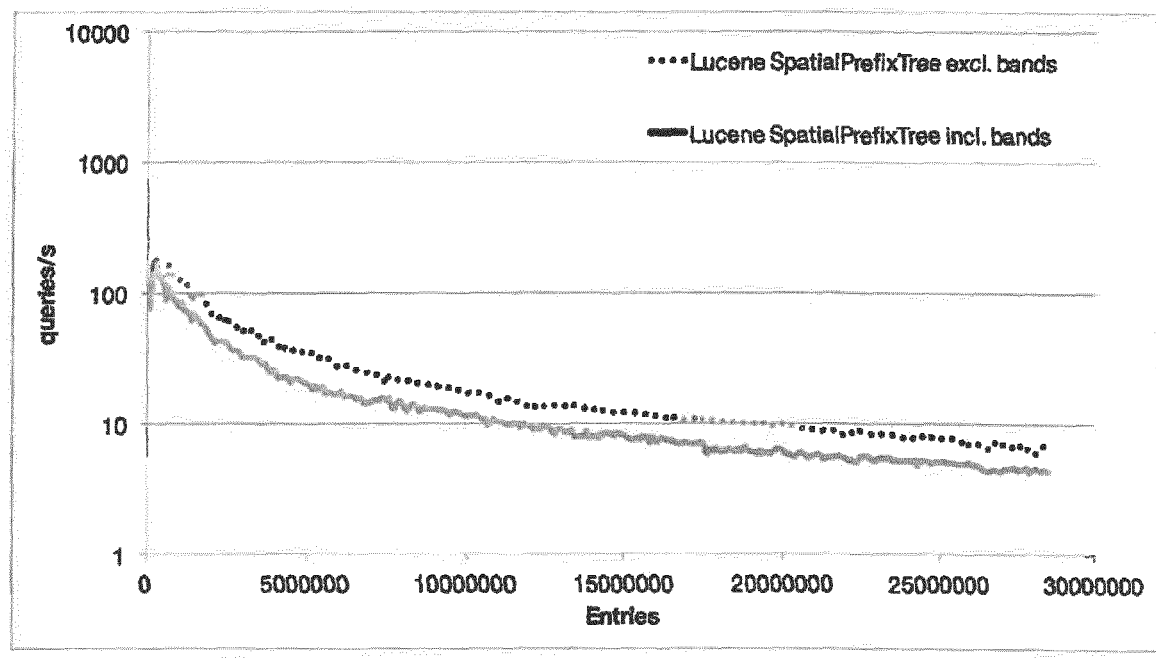
Figure 54:
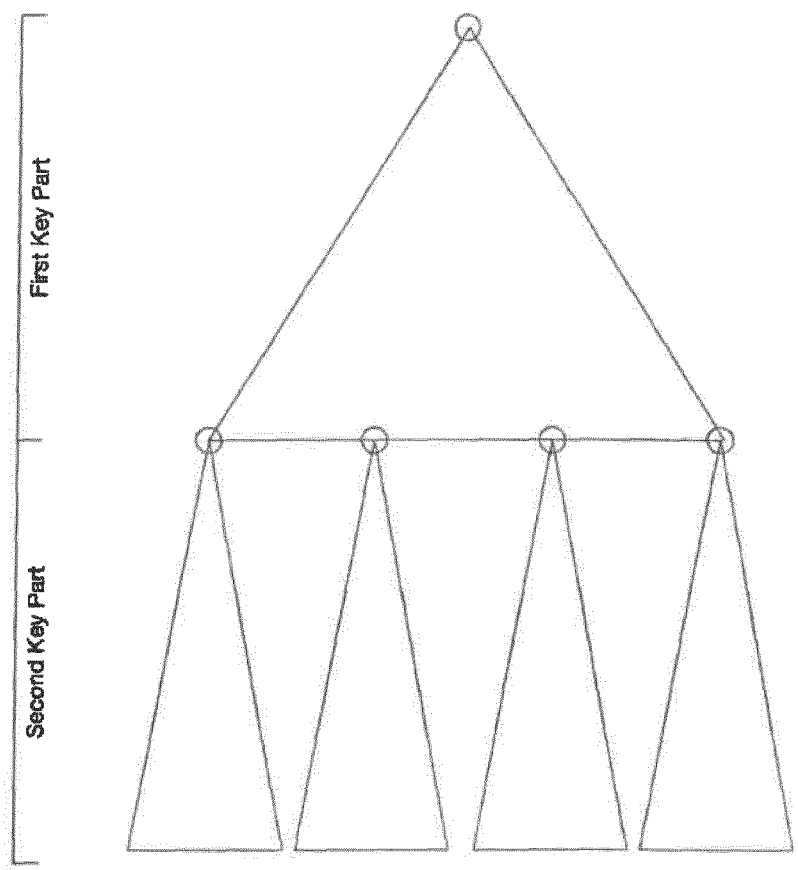
Figure 55:
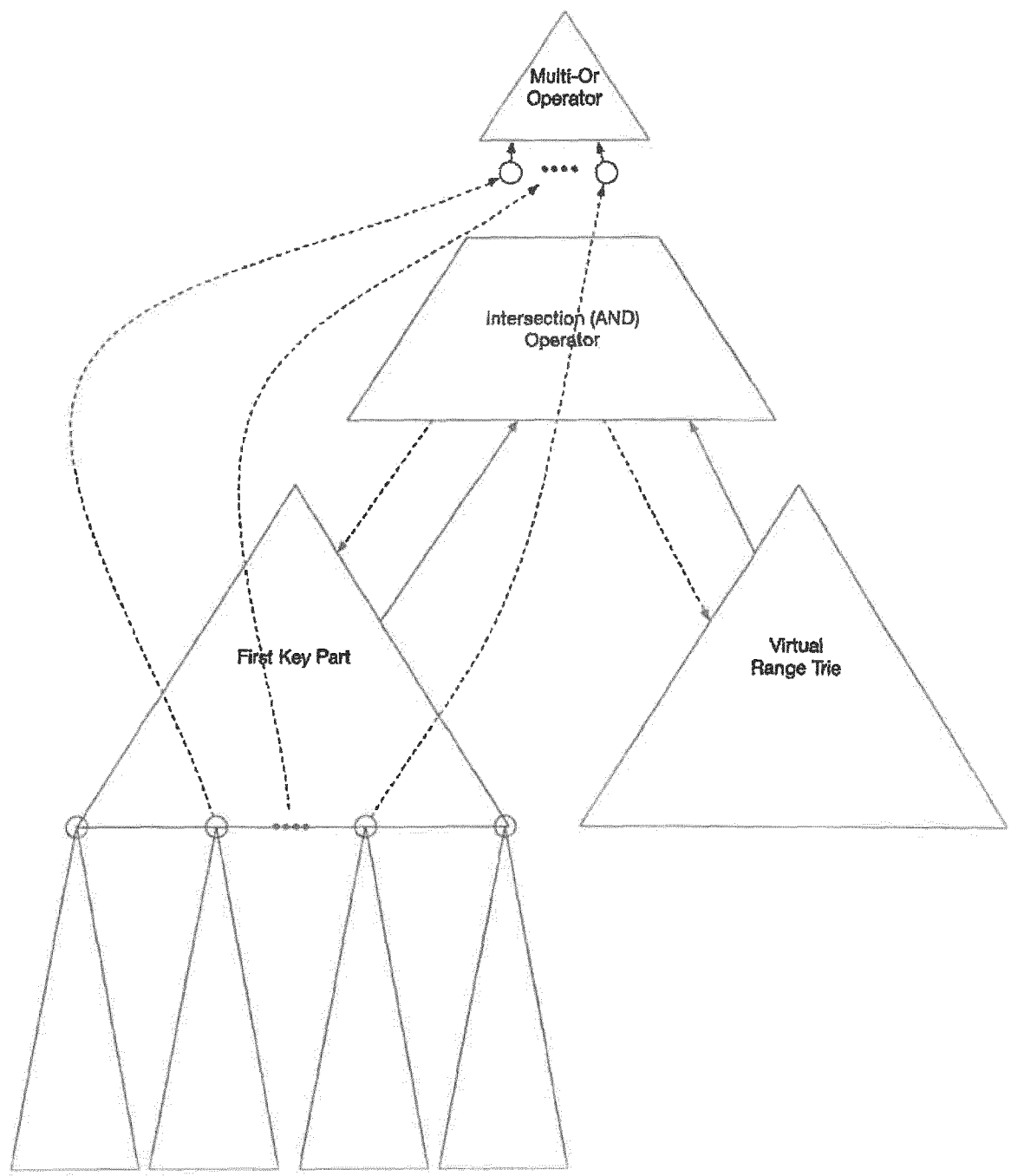
Figure 56:
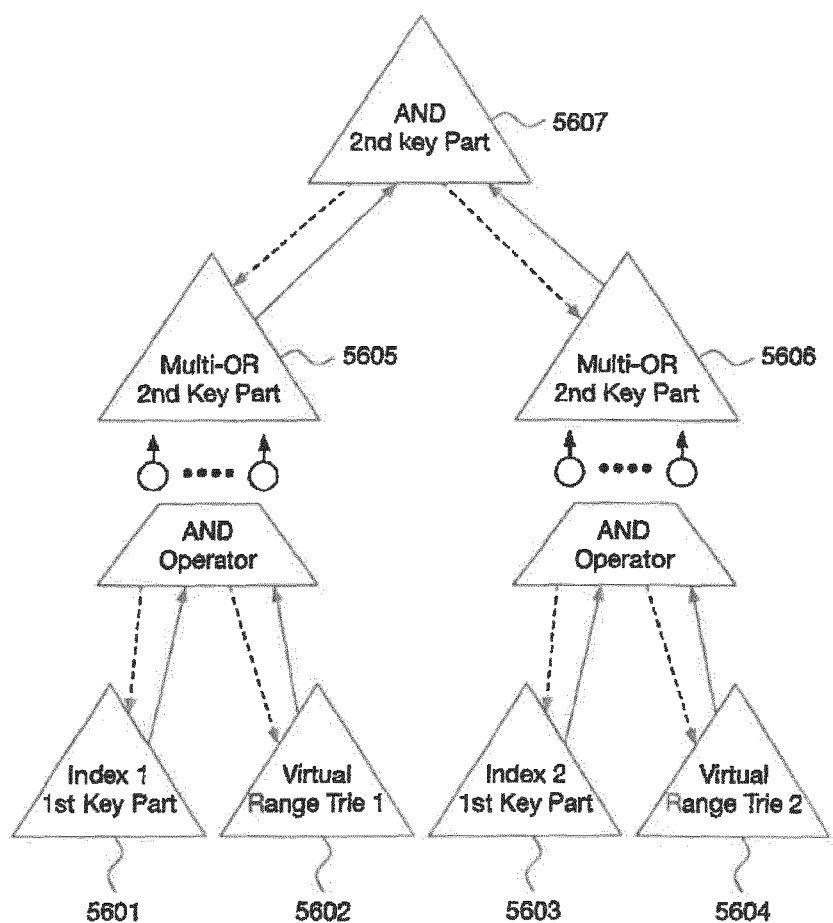
Figure 57:
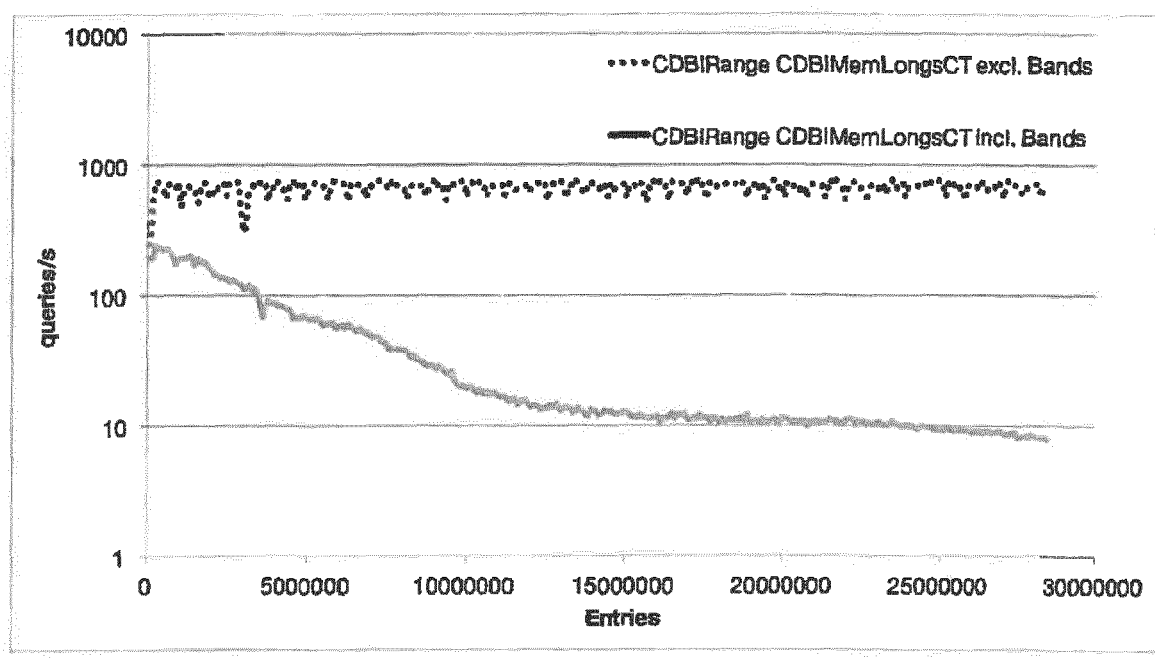
Figure 58:
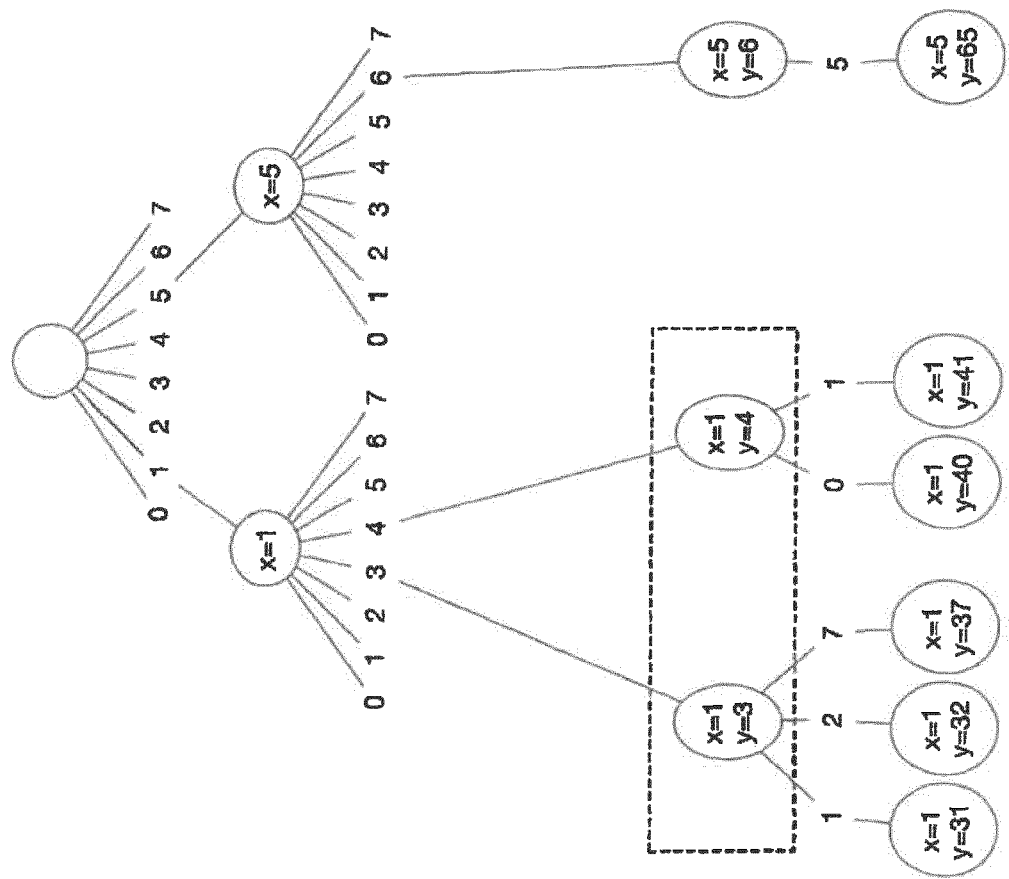
Figure 59:
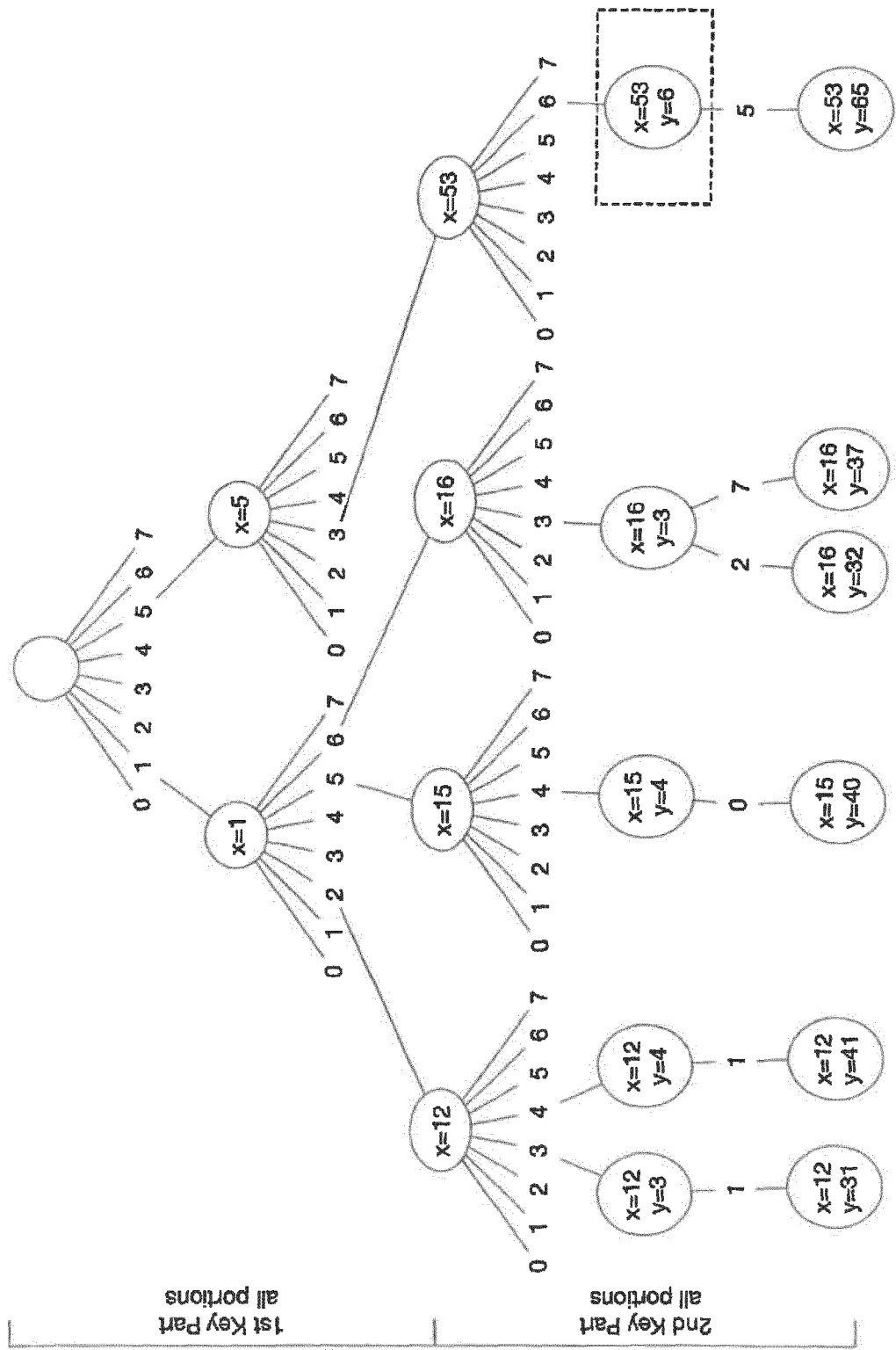
Figure 60:
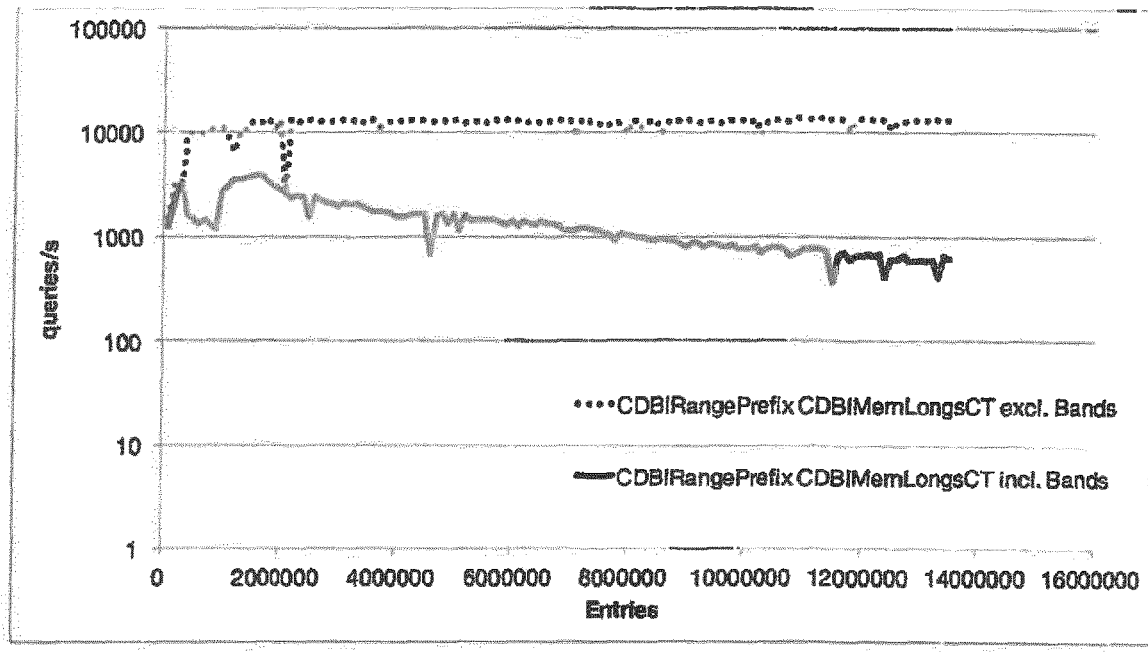
Figure 62:
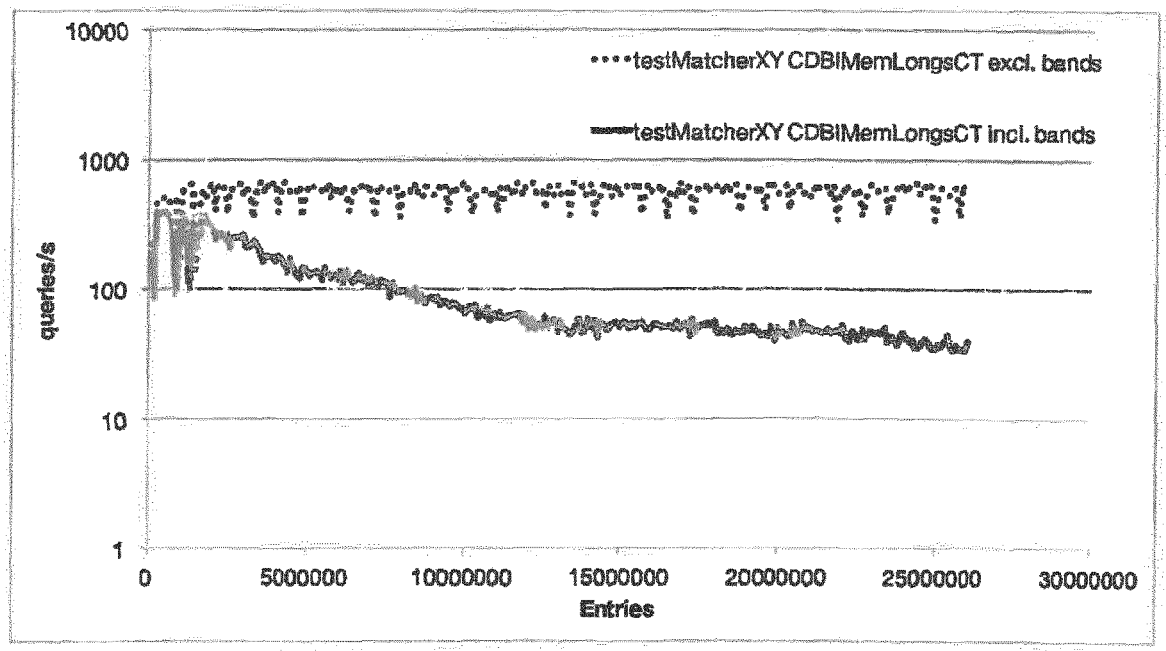
Figure 61:
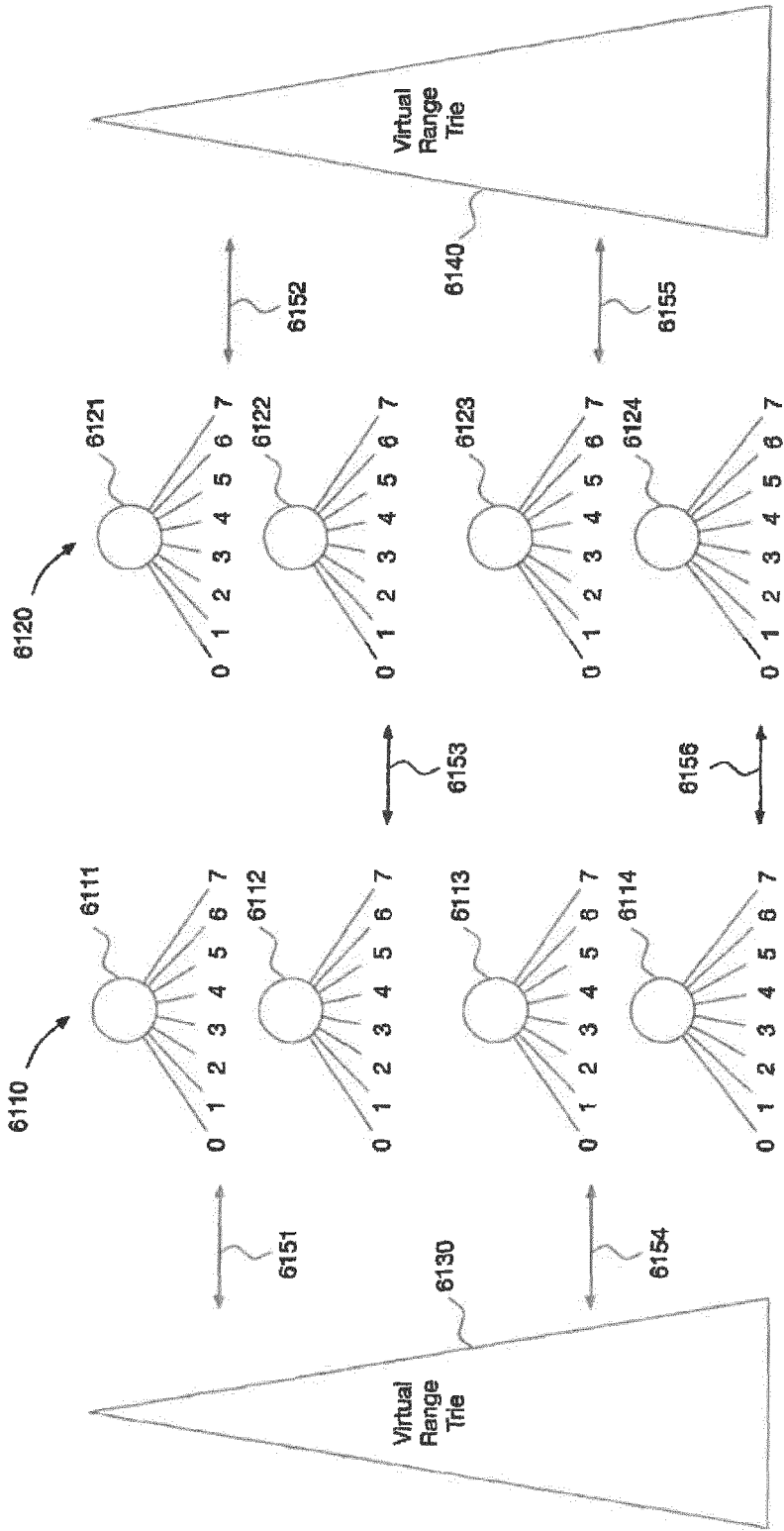
Figure 63:
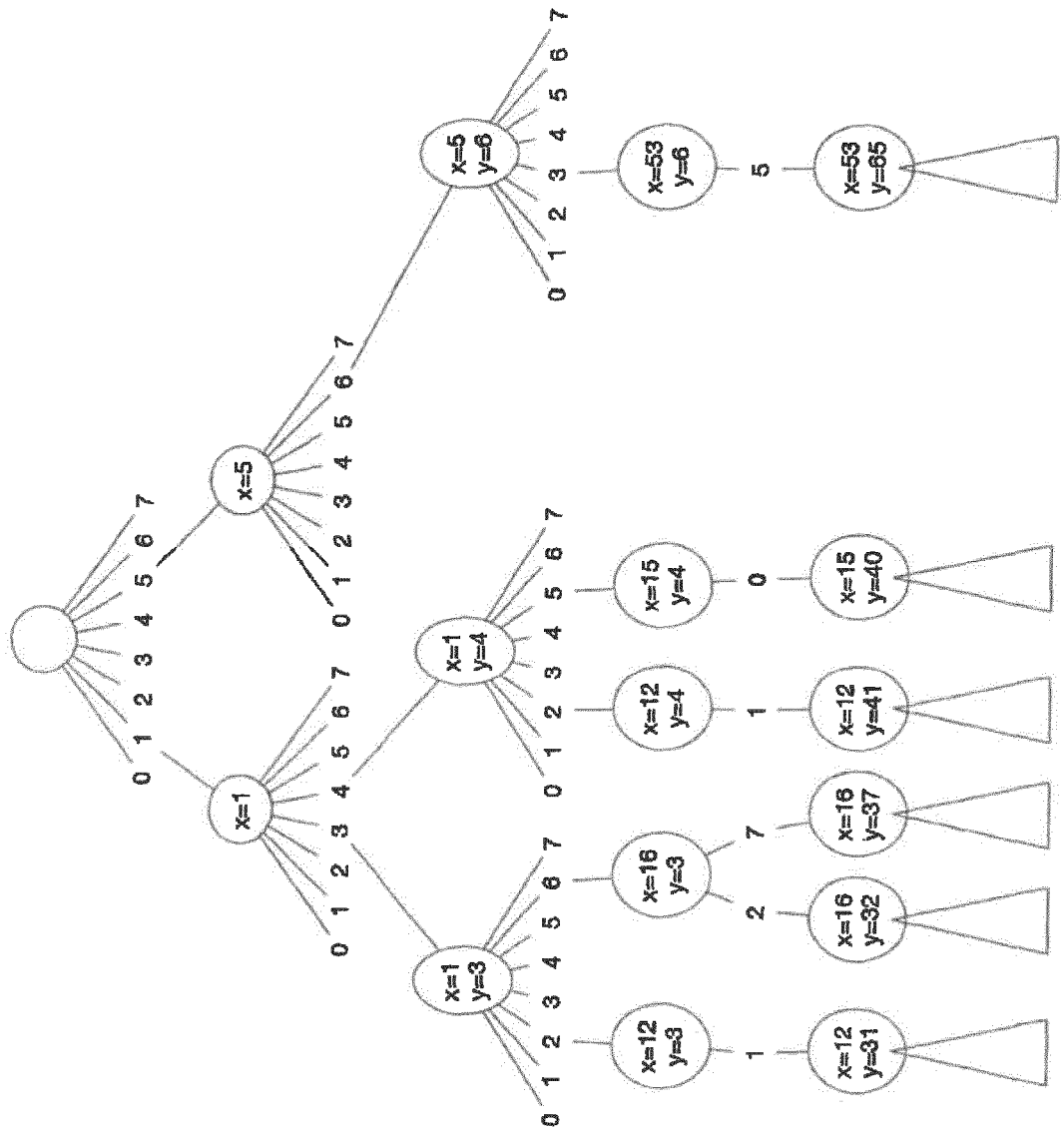
Figure 64:
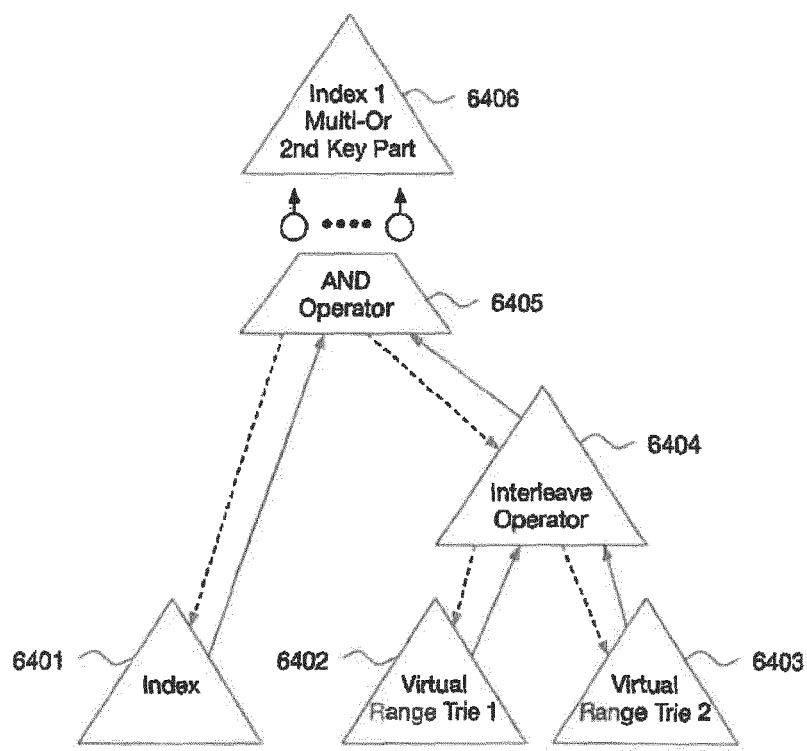
Figure 65:
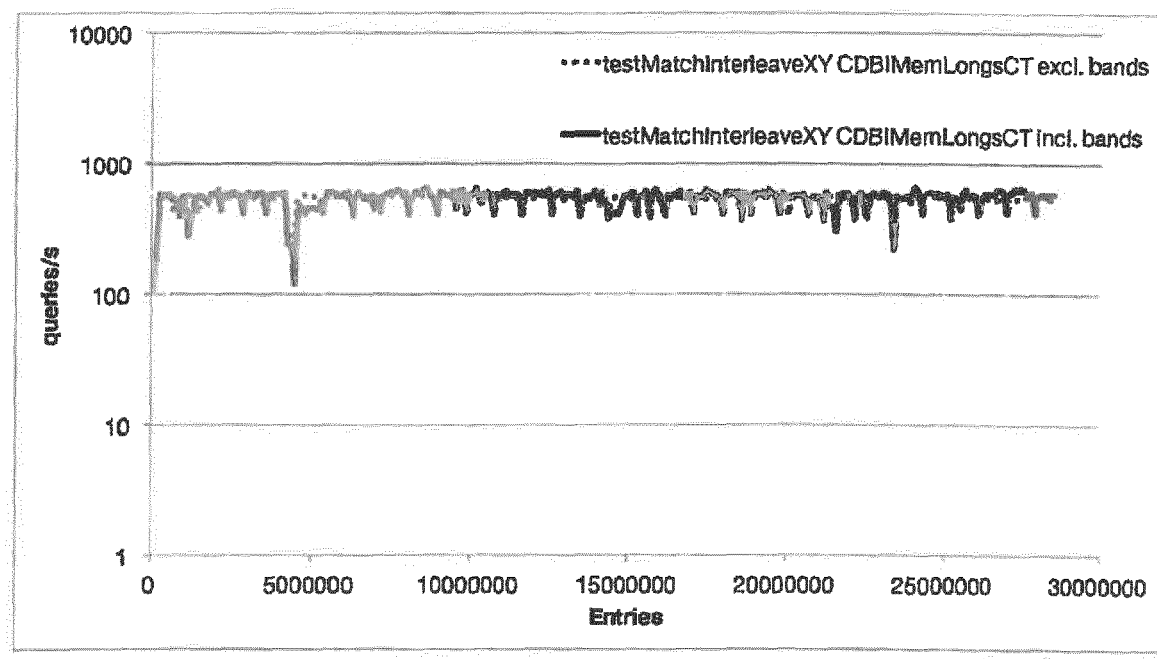
Figure 66:
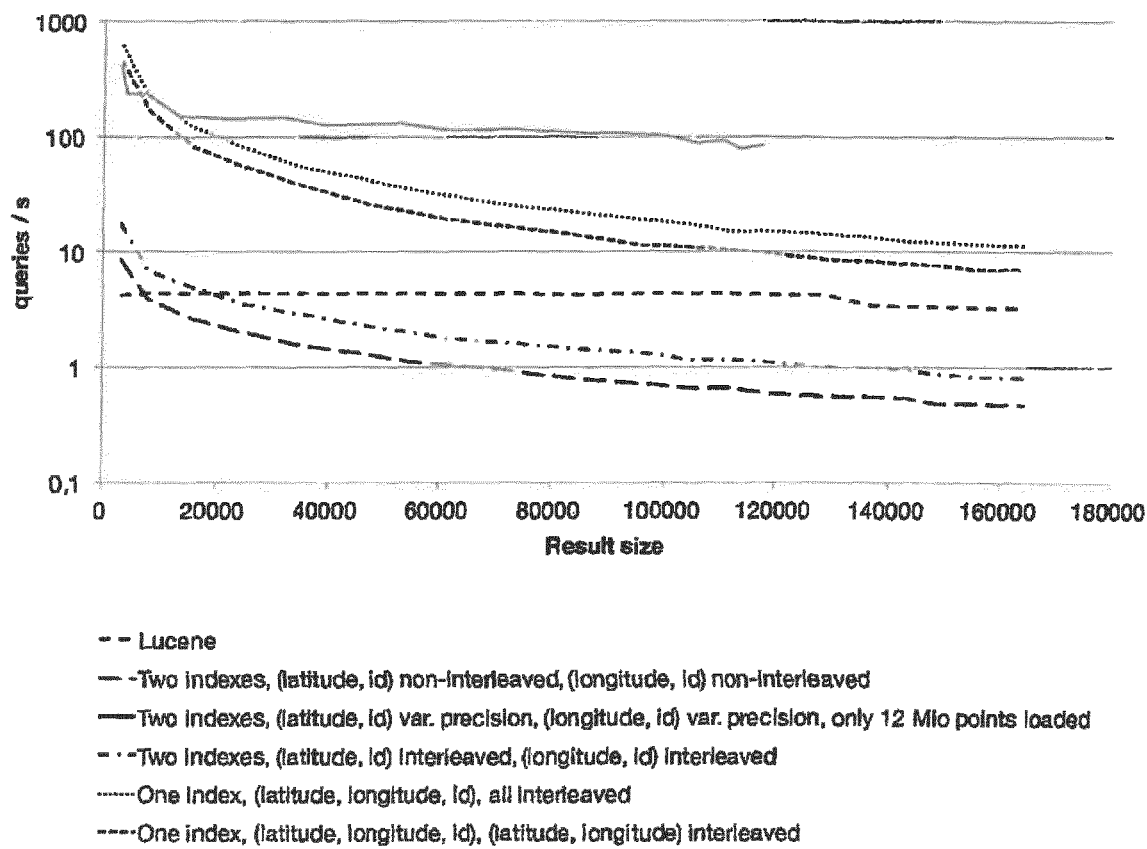
Figure 67:
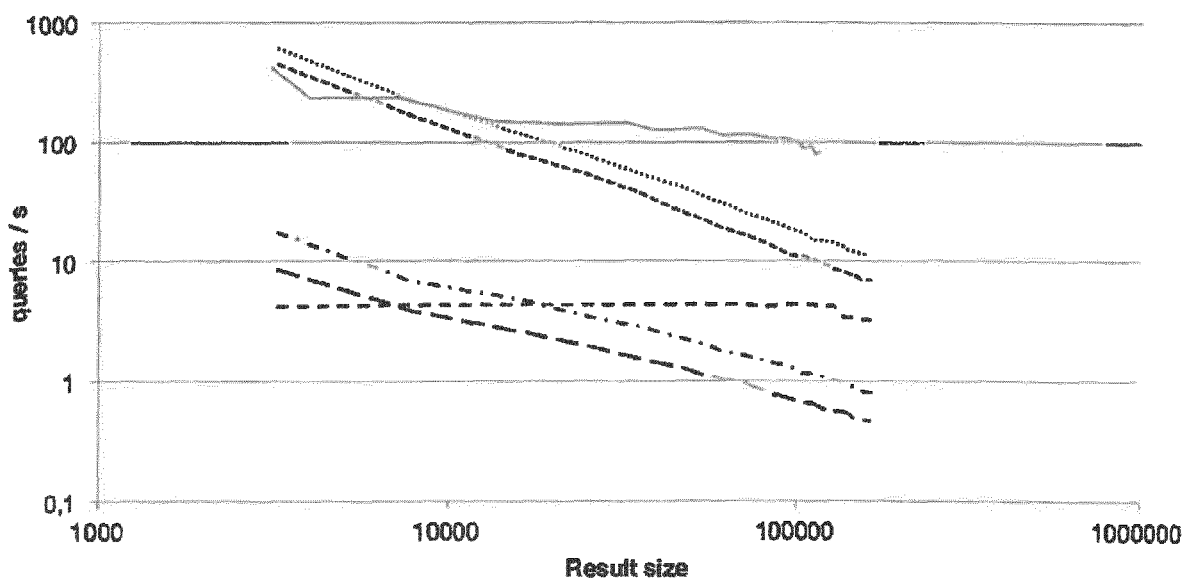
Figure 68:
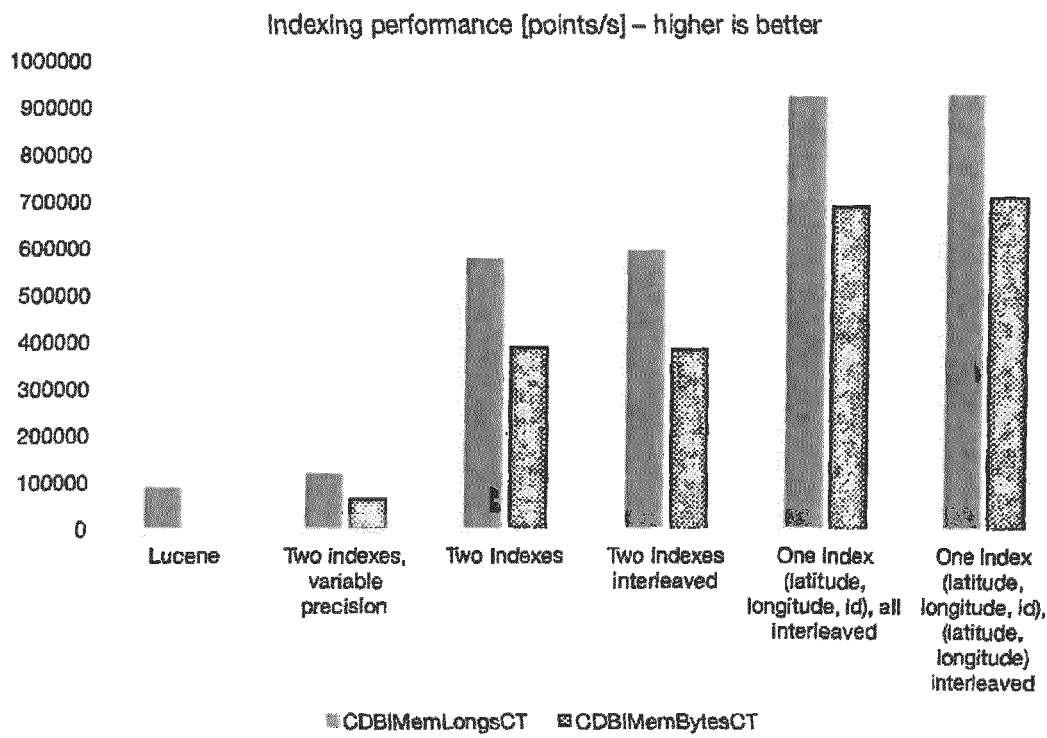
Figure 69:
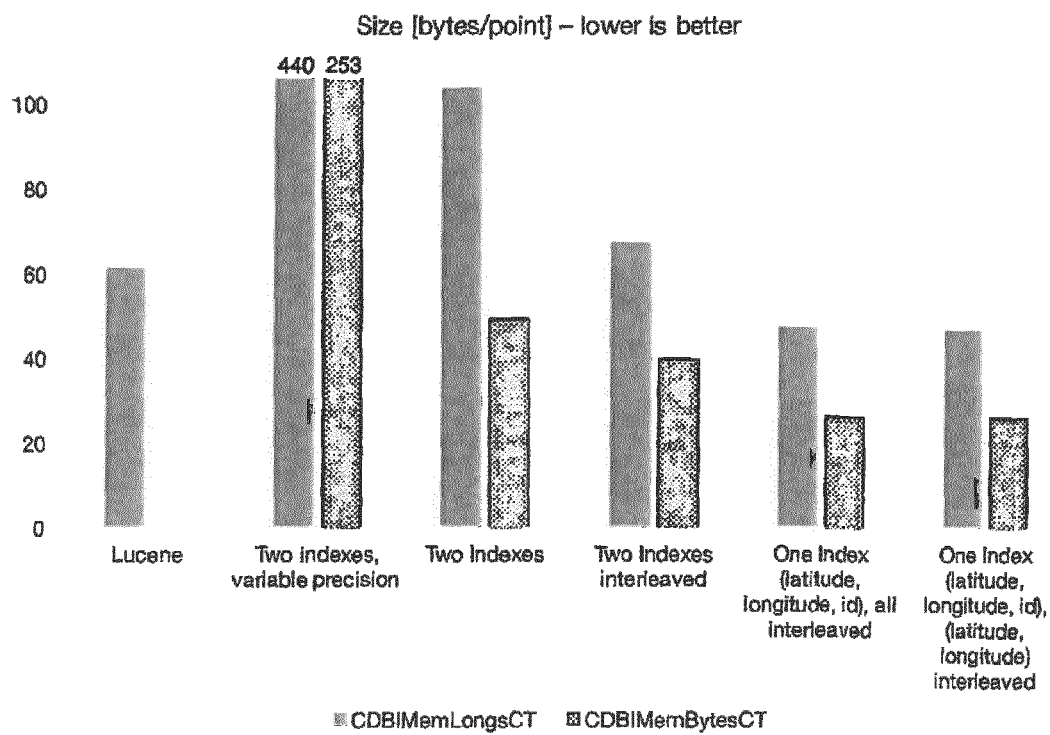

FIG. 8 provides an example of a trie where a first space optimization according to the invention is efficient;

FIG. 9 illustrates the first space optimization according to the invention;

FIG. 10 provides an example of a trie where a second space optimization according to the invention is efficient;

FIG. 11 shows the general storage configuration of the second space optimization according to the invention;

FIG. 12 illustrates the second space optimization according to the invention;

FIG. 13 illustrates how the nodes of tries which have been space optimized in accordance with the invention are accessed in a uniform fashion;

FIG. 14A-14C illustrate the insertion of keys into a trie which has been space optimized in accordance with the invention;

FIG. 15 shows the results of experiments conducted to measure the efficiency of the first and second space optimizations according to the invention;

FIG. 16 illustrates a third space optimization according to the invention;

FIG. 17 shows the results of experiments conducted to measure the efficiency of the third space optimization according to the invention FIG. 18 shows a first way of arranging control and content information in a key to be stored in a trie according to the invention;

FIG. 19 shows a second way of arranging control and content information in a key to be stored in a trie according to the invention;

FIG. 20 shows an example of a key encoding according to the invention;

FIG. 21 shows a trie storing a key encoded according to the invention;

FIG. 22 shows an example of a two-dimensional key with value (X=12, Y=45);

FIG. 23 gives an example of how the key shown in FIG. 21 can be stored in a trie according to the invention;

FIG. 24 shows the phases of database query processing in the prior art;

FIG. 25 shows an exemplary query execution plan used in prior art databases;

FIG. 26 shows an operator control and data flow according to a query execution model in prior art databases;

FIG. 27 shows a tuple-at-a-time processing according to a query execution model of prior art databases;

FIG. 28 shows an operator-at-a-time processing according to a query execution model of prior art databases;

FIG. 29 shows a trie control and data flow according to the query execution model of the present invention;

FIG. 29A shows another trie control and data flow according to the query execution model of the present invention;

FIG. 30 shows an example for applying an intersection operator on two tries according to the invention;

FIG. 31 shows two example tries on which an intersection operation according to the invention will be performed;

FIG. 32 shows a bitwise AND operation performed on bitmaps of the two example tries of FIG. 31, on levels 1 and 2;

FIG. 33 shows branch skipping during the intersection operation on the two tries of FIG. 31;

FIG. 34 shows the resulting trie of the intersection operation on the two tries of FIG. 31;

FIG. 35 shows an example for applying a union operator on two tries according to the invention;

FIG. 36 shows the resulting trie of the union operation on the two tries of FIG. 35;

FIG. 37 shows an example for applying a difference operator on two tries according to the invention;

FIG. 37A shows three tries which are to be combined in accordance with the data flow depicted in FIG. 29A;

FIG. 37B illustrates the result of the combination of the tries shown in FIG. 37A;

FIG. 38 illustrates the interworking of an intersection operator, an input set trie and a range trie in a range query according to the invention;

FIG. 39 illustrates an example of the method of performing a range query according to the invention;

FIG. 40 illustrates an example of the method of performing a two-dimensional range query according to the invention;

FIG. 41 shows how the one-dimensional range tries of FIG. 40 are combined in an interleaved manner;

FIG. 42 shows the interleaved range trie obtained as a result of FIG. 41;

FIG. 43 shows how the one-dimensional range tries of FIG. 40 are combined in a non-interleaved manner;

FIG. 44 shows the non-interleaved range trie obtained as a result of FIG. 43;

FIG. 45 shows which nodes of the input set trie of FIG. 40 are visited during the range query if the input set trie is stored in a non-interleafed manner;

FIG. 46 shows which nodes of the input set trie of FIG. 40 are visited during the range query if the input set trie is stored in an interleafed manner;

FIG. 47 illustrates a two-dimensional range query according to the invention with one-dimensional output;

FIG. 48A shows a nondeterministic finite automaton to match the search character string "abc" with a maximum editing distance of 2;

FIG. 48B shows a deterministic finite automaton for matching "abc", for an editing distance of 1;

FIG. 48C shows an augmentation of the transitions of the automaton of FIG. 48B, where the encoding schemes for Unicode characters and strings of Unicode characters as described with reference to FIG. 21 are used;

FIG. 48D shows the resulting top part of a match trie with each 10-bit Unicode character being represented by two key portions;

FIG. 48E shows a data structure as an array of arrays, which can be used to represent the states of the complete finite automaton from which the match trie of FIG. 48D can be derived;

FIG. 49 illustrates the specification of an experimental geodata search query for all locations within a small rectangle in the area of Munich;

FIG. 50 illustrates the remaining records loaded into the database for performing a first series of experimental geodata search queries;

FIG. 51 illustrates the remaining records loaded into the database for performing a second series of experimental geodata search queries;

FIG. 52 illustrates the interim result sets and the final result set determined by the experimental geodata search queries;

FIG. 53 shows performance measurement results for a prior art approach;

FIG. 54 illustrates an abstract view on non-interleaved 2-dimensional index tries used in a standard indexing approach according to the invention;

FIG. 55 illustrates the use of a multi-OR operator in the standard indexing approach according to the invention;

FIG. 56 provides an overview of the components used in the standard indexing approach according to the invention;

FIG. 57 shows performance measurement results for the standard indexing approach according to the invention;

FIG. 58 shows an example of a first level index for a variable precision indexing approach according to the invention;

FIG. 59 shows an example of a second level index for the variable precision indexing approach according to the invention;

FIG. 60 shows performance measurement results for the variable precision indexing according to the invention;

FIG. 61 illustrates how portions of a two-item keys stored in an interleaved manner are combined with each other or with portions of a range trie in a two-dimensional indexing approach according to the invention;

FIG. 62 shows performance measurement results for the two-dimensional indexing approach according to the invention;

FIG. 63 shows the structure of an index storing three-item keys for a single-index indexing approach according to the invention;

FIG. 64 provides an overview of the components used in the single-index indexing approach according to the invention;

FIG. 65 shows performance measurement results for the single-index indexing approach according to the invention;

FIG. 66 shows the results of an experiment in which query performance was measured over increasing result size;

FIG. 67 shows the results of FIG. 66 in a diagram with a logarithmic x-axis;

FIG. 68 shows the results of an experiment, in which indexing performance was measured over increasing index size;

FIG. 69 shows the space requirements of different indexing approaches;

FIG. 70A-70F compare the indexing performance, index size, and query performance of databases using prior art indexes with databases using indexes according to the invention in information retrieval applications.

DETAILED DESCRIPTION OF PREFERRED EMBODIMENTS OF THE INVENTION

Figure 1:
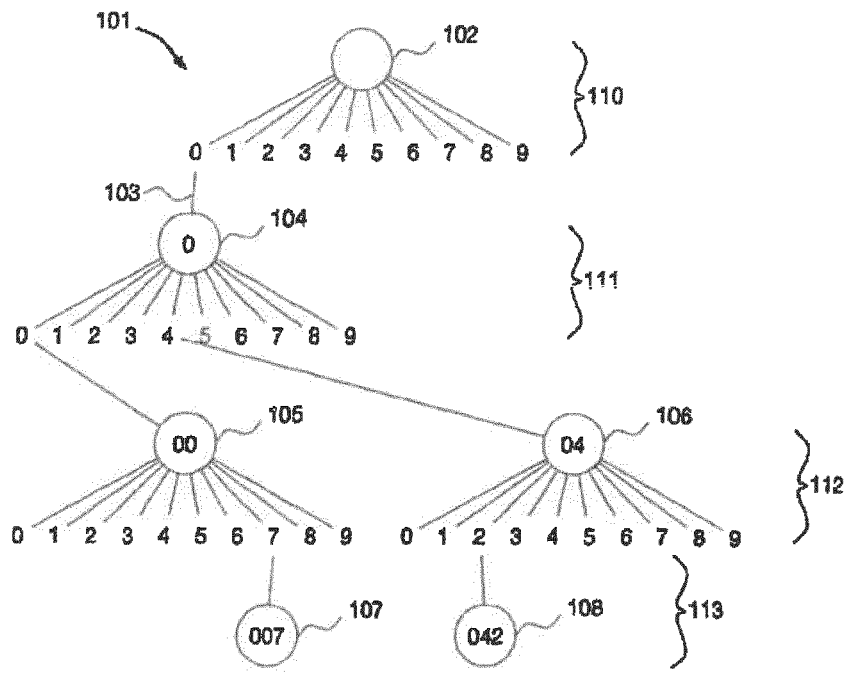

FIG. 1 shows an example of a trie data structure used in databases according to the prior art. It illustrates a trie data structure 101 in which each child node (i.e. all nodes except for the root node) is associated with a key portion, whose value is indicated by a pointer from the parent node and selected from the alphabet {0 . . . 9}, i.e. the nodes on each level except for the root node are associated with one decimal digit. The path from the root node to another node in the trie defines a key with which the node is associated, the key being a concatenation of the key portions associated with the nodes on path. Trie 101 "stores" the keys with values "007" and "042" because leaf node 107 of trie 101 is associated with the key with value "007", and leaf node 108 of the trie 101 is associated with the key with value "042".

Root node 102 located on the first level no has one child node 104 being associated with a key portion of value "0". Therefore, there is a pointer 103 from root node 102 to child node 104 located on the second level in of trie 101, which indicates a value of "0". From child node 104 on the second level, two different pointers point to nodes 105, 106 located on a third level 112, and from each of these nodes 105, 106, one further pointer points to leaf nodes 107, 108, respectively. The concatenation of the key portions of the nodes on the path from the root to the leaf nodes hence results in the keys with values "007" and "042".

Figure 2:
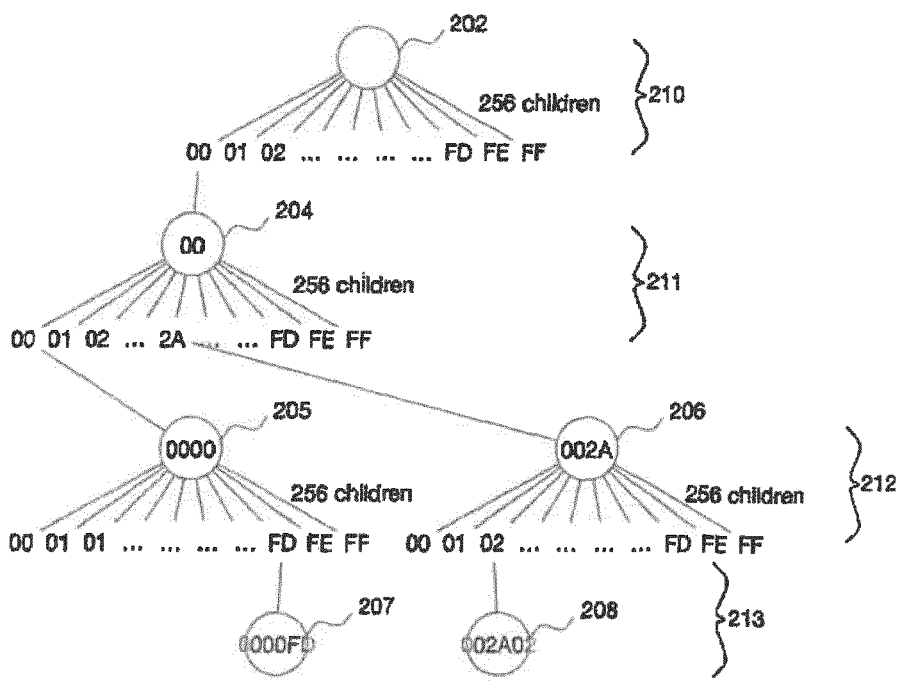
FIG. 2 shows another example of a trie data structure used in the prior art.

FIG. 2 illustrates a further example of a trie data structure used in the prior art. The trie data structure of this example is similar to the one of FIG. 1, but has a larger alphabet of possible values of the key portions associated with a node. In particular, FIG. 2 shows a 256-ary-trie data structure, wherein the representations of the key portion values have a size of eight bits (or one byte).

The trie data structure of FIG. 2 stores two different keys (has two different keys associated with its leave nodes), "0000FD" and "002A02", and has four levels 210 to 214. A root node 202 located on the first level 210 has a pointer to a child node 204 associated with a key portion value "00". Child node 204 comprises two pointers to the child nodes 205, 206, associated with key portion values "00" and "2A", respectively. Each of the child nodes 205, 206, located in the third level 212, comprises one pointer to a leaf node 207, 208, respectively. Leaf nodes 207, 208 are located in the fourth level 213. Leaf node 207 is associated with the key portion value "FD", and leaf node 208 is associated with the key portion value "02".

Figure 3:
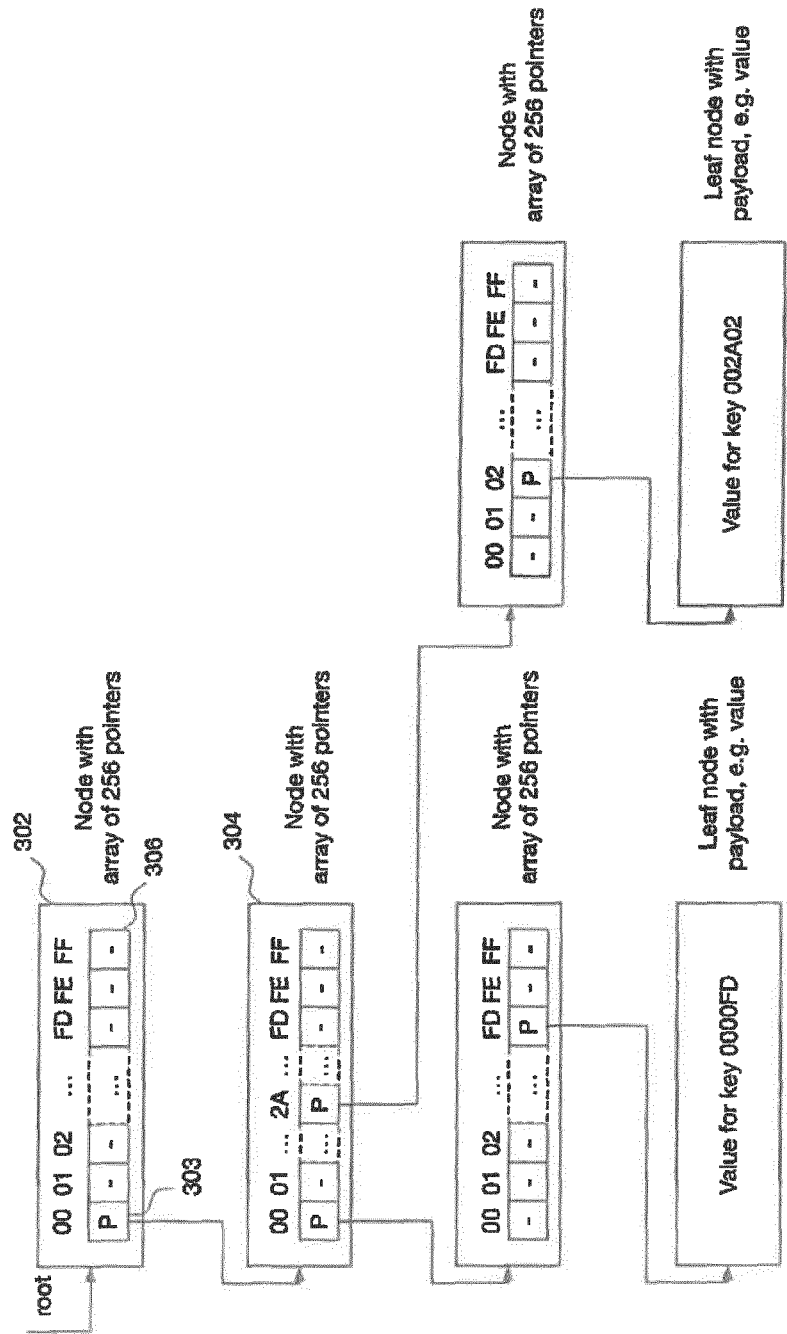
FIG. 3 shows a prior art implementation of the trie data structure of FIG. 2.

FIG. 3 illustrates a prior art implementation of the trie data structure of FIG. 2. The nodes with the associated pointers are entirely allocated in memory. Thus, in this scenario, even empty (nil) pointers occupy memory space. For example, root node 302 has 256 pointers allocated in its array 306, wherein only one pointer 303, associated with the key portion value "00" and pointing to a child node 304, is not empty. The child nodes are implemented in the same fashion.

Figure 4:
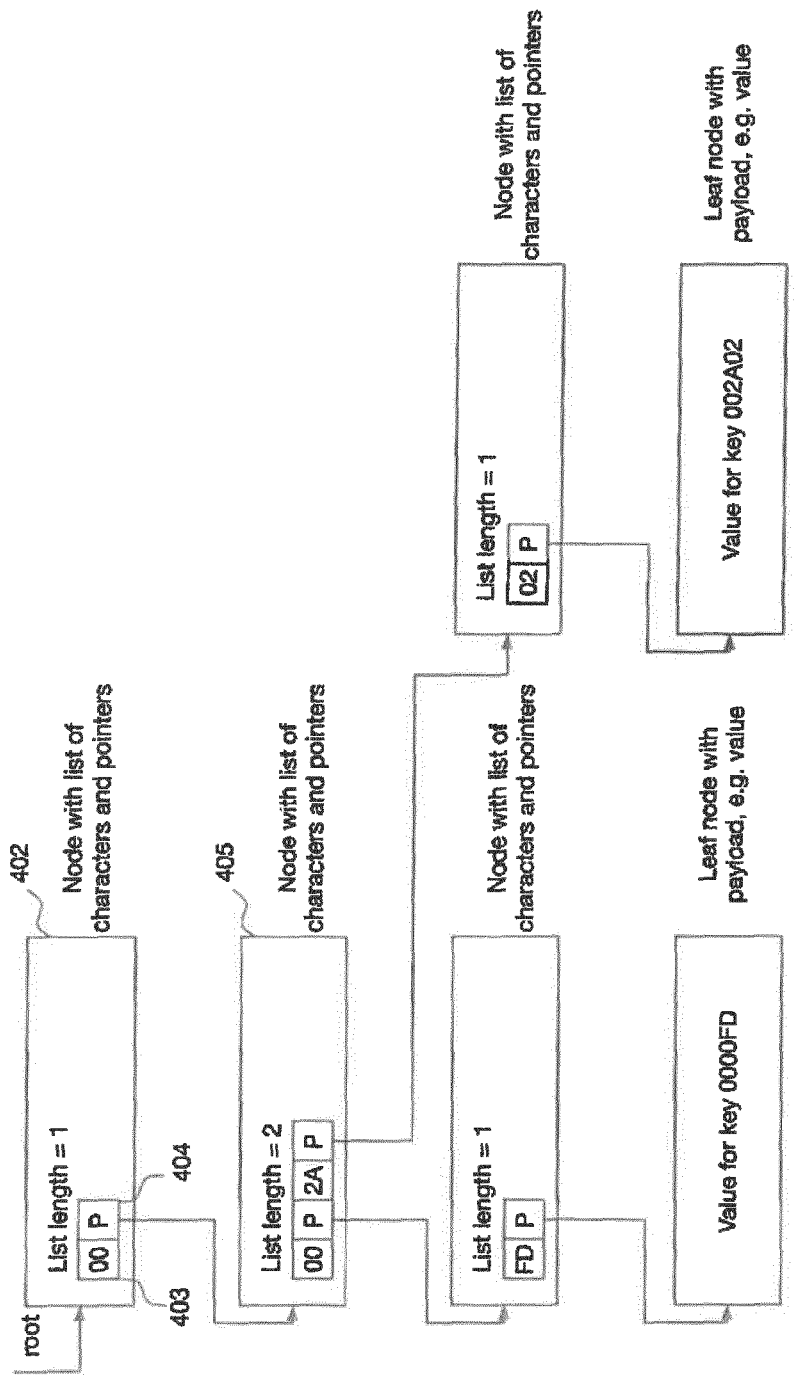
FIG. 4 shows another prior art implementation of the trie data structure of FIG. 2.

FIG. 4 depicts an exemplary implementation of the trie data structure of FIG. 2 providing a known solution for a more efficient use of memory space, avoid storing empty (null) pointers. The solution consists in storing lists of non-empty pointers only, with their respective key portion values, instead of arrays containing all possible pointers. For example, root node 402 having one child node associated with the key portion value "00" comprises a list with one entry. The list entry comprises a key portion value 403 and an associated pointer 404 pointing to the child node 405. The other child nodes are implemented accordingly.

Figure 5:
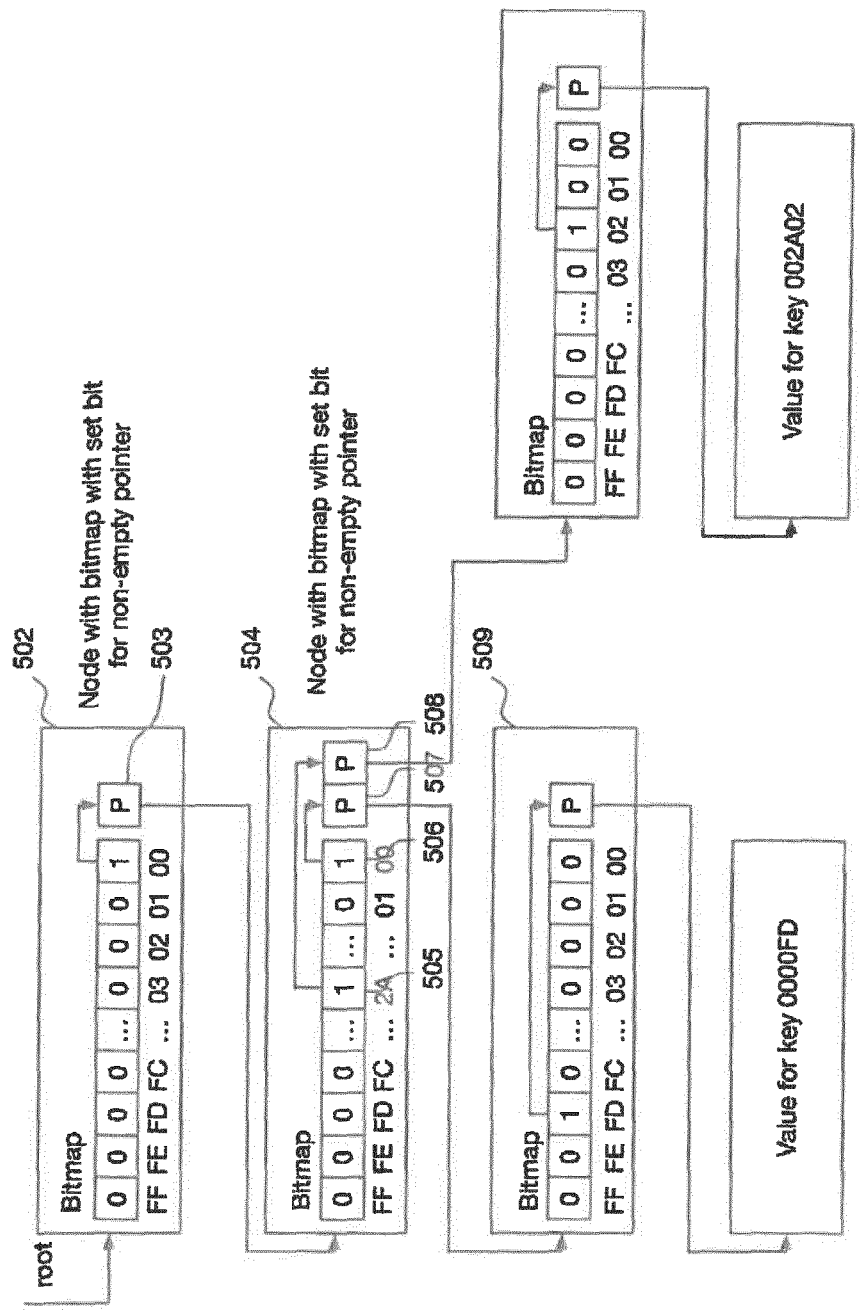
FIG. 5 shows another prior art implementation of the trie data structure of FIG. 2.

FIG. 5 illustrates another exemplary implementation of the trie data structure of FIG. 2 providing a known solution for the allocation problem, based on bitmaps which are used to mark all non-empty pointers of a parent node. In other words, a set bit in a bitmap marks a valid (non-empty) branch. Each parent node also comprises one or more pointers, wherein each pointer is associated with a set bit in the bitmap and points to a child node of the parent node.

Figure 6:
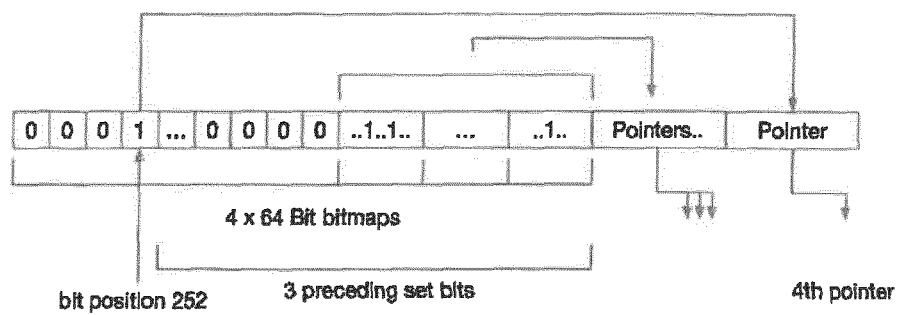
FIG. 6 illustrates how the child pointer of a node is determined in prior art tries.

To determine the pointer of a child node, the amount of preceding child pointers has to be calculated. The offset to find the pointer is the amount of least significant bits set in the bitmap before the target position, as is illustrated in FIG. 6. This compact trie node structure eliminates the need for storing nil pointers, and at the same time allows for very fast access.

The trie data structure of the example of FIG. 5 has an alphabet cardinality of 256, which results in a bitmap size of 256 bits. In other words, each bitmap can identify 256 pointers for 256 different key portion values (or child nodes). With 256 different values, 8 bits ($2^8$) or one byte can be encoded.

Root node 502 has one bit set in its bitmap, representing the key portion value "00". Thus, root node 502 comprises only one pointer 503 to a child node 504, the child node being associated with the key portion with value "00". Child node 504 has two bits 505, 507 set in its bitmap, namely the bits representing the key portion values "2A" and "00". Thus, child node 504 comprises two pointers 507 and 508, which point to the respective child nodes 509, 510.

Pointer 506 associated with the bit in the bitmap having the value "2A" is addressed by calculating how many least significant bits are set starting from the bit 505 representing the key portion value "2A". In this case, there is only one least significant bit set, namely bit 506, so it can be determined that there is an offset of one pointer and that the pointer we are looking for is the second pointer comprised by child node 504.

General Features of the Preferred Embodiments of Tries According to the Present Invention Like all tries, the tries or trie data structures according to the invention comprise one or more nodes. As in the prior art tries described above with reference to FIGS. 1 to 6, a node, preferably each child node of a trie of the preferred embodiments is associated with a key portion, wherein the path from the root node to another node in the trie, in particular to a leaf node, defines a key, the key being a concatenation of the key portions associated with the nodes in the path. The root node is not associated with a key portion, and it will be understood that a trie may comprise further nodes which are not associated with a key portion, e.g. because they serve other purposes. E.g., the number of entries in a subtree could be stored in such a node, for avoiding or accelerating count operations, which normally require traversing the whole tree.

In preferred embodiments of the tries according to the invention, a node, preferably at least each parent node which has more than one child node, comprises a bitmap and a number of pointers. Each pointer is associated with a bit which is set in the bitmap and points to a child node of the node. Typically a bit is "set" in a bitmap if its value is "1". However, in particular embodiments a bit may count as "set" if its value is "0". A bit in a bitmap counts as "set" herein if its value corresponds to the value which is associated with the notion that the bit in the bitmap marks a valid branch, as has been explained above with reference to the prior art tries shown in FIG. 5.

Preferably, the bitmap is stored in memory as an integer of predefined size. Furthermore, the size of the bitmap is preferably 32, 64, 128 or 256 bits. Performance of the operations of the target computer system storing and processing the trie can be increased by choosing the size of the bitmap such that it is equal to the bit width of the registers of the CPU, the system bus, data bus and/or address bus of the target computer system.

For example, as mentioned above, the memory address of a pointer associated with a bit which is set in the bitmap can be calculated based on the number of least significant bits set in the bitmap. This determination can be made very efficiently using simple bit operations and a CTPOP (count population) operation that determines the number of set bits. Many modern CPUs even provide CTPOP as an intrinsic instruction. However, since in modern CPUs long integers are 64 bits wide, CTPOP works only on 64 bits. This means for the prior art tries using a bitmap of 256 bits that the operation is performed up to four times (4×64=256). Alternatively, prior art tries store the total bitcounts of the preceding bitmaps with the first three bitmaps. The number of least significant bits can then be calculated as CTPOP of the last group of bits+bitcount of the preceeding groups of bits.

Since currently in most computer systems the system bit width is 64 bits, a bitmap size of 64 bits is currently the most preferred size and was used by the inventor for his example implementations of the invention. This results in a 64-ary trie, which means that every node can store symbols of an alphabet of 64 symbols, that is it can encode 6 bits ($2^6$=64). As will be explained below, tries according to embodiments of the invention may use several nodes and their associated key portions to store the information comprised by a primitive data type. For example, for storing a key represented by a 64-bit long integer, a 64-ary trie with 11 levels is required (11*6 Bits>=64).

The bitmaps and/or the pointers may be stored, e.g., in an array, in a list, or in consecutive physical or virtual memory locations. Note that whenever the term "memory" is used herein, it may refer to physical or virtual memory, preferably continuous memory. In preferred embodiments, a long integer (64 bits) is used for representing the bitmap, and also for representing each of the child pointers. Instead of allocating nodes separately in memory, the nodes are stored in an array of long integers, and instead of having memory pointers for nodes, the current node is specified by an index into this array. A child pointer may be an index of the node position in the array. When traversing the trie, the offset to find the index of a child node based on the current node index is then the amount of least significant bits set in the bitmap before the target position plus one for the bitmap.

Preferred embodiments work with several such arrays. One part, e.g. the lower part of a pointer is the index within the array, and another part of the pointer, e.g. the higher part is the reference to an array. This is done for memory management reasons, because it is not always possible to allocate an array of arbitrarily large size. In Java for example, the size of an array is limited to 32 bit integers, and this results in an array size of $2^{31}$ (only positive values)=2,147,483,648. However, many real-world applications require arrays comprising 16 MB or more, which corresponds to 2 million entries for a 64-bit long integer array.

Like in the prior art trie of FIGS. 5 and 6, a parent node, preferably at least each parent node having more than one child node, comprises typically an amount of pointers which is equal to the amount of bits set in a bitmap comprised by said parent node. For example, node 504 in FIG. 5 has a bitmap with two bits 505, 506 set and comprises two pointers 507, 508. The rank of a pointer within all pointers of a parent node preferably corresponds to the rank of the pointer's associated set bit within all set bits in the bitmap of the parent node. E.g., in parent node 504 of FIG. 5, the first pointer 507 corresponds to the first set bit 505 of the bitmap, and the second pointer 508 corresponds to the second set bit 506. The pointers are typically stored in the same or inverse order as the bits are set in the bitmap. Each of them preferably points to (an address of) a bitmap comprised by the child node, as is shown e.g. below in FIGS. 9 and 12, for example the starting address of this bitmap.

Like in the prior art trie of FIG. 5 or FIG. 6, the value of the key portion of a child node of a trie of preferred embodiments, preferably of at least each child node whose parent has more than one child nodes, is determined by the value of a bit (set) in a bitmap comprised by the parent node with which bit the child node is associated. The maximum amount of different values available for the key portion is thus typically defined by the size of the bitmap, and/or the size of the bitmap defines the possible alphabet for the key portion.

In the preferred embodiments of the invention, each key portion in the trie is capable of storing a value of a same predefined size, e.g. a 5-bit value (if the size of the bitmap is 32 bits), a 6-bit value (if the size of the bitmap is 64 bits), a 7-bit value (if the size of the bitmap is 128 bits) or 8-bit value (if the size of the bitmap is 256 bits). The alphabet of characters represented by a node or key portion is the set of all possible bit groups having that size. For example, where a key portion is capable of storing a 6-bit value, the alphabet is the set of all bit groups comprising 6 bits.

The trie data structures according to the invention can be used for implementing key-value maps (also referred to as "associative arrays"), where the values are stored in the leaf nodes, as well as key sets (also referred to as "dynamic sets"), where no data is stored in the leaf nodes. Maps are used in cases where every key has only one value, to look up the value for a given key, whereas sets are used for determining if a given set contains a given key. For both, set operations on keys (such as union, intersection, or difference) are frequently required operations as well.

Figure 7A:
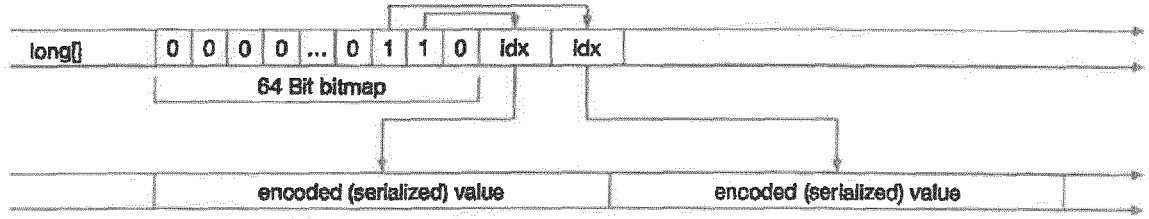
FIG. 7A-7C show how leaf nodes are stored in maps and the "last" bitmaps are stored in sets in tries according to the invention.
Figure 7B:
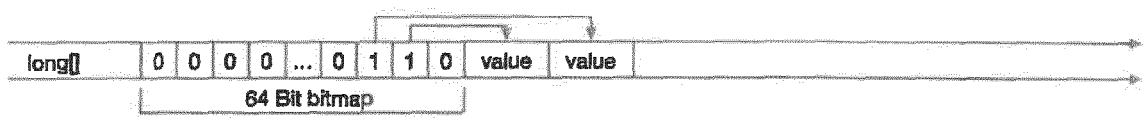
Figure 7C:
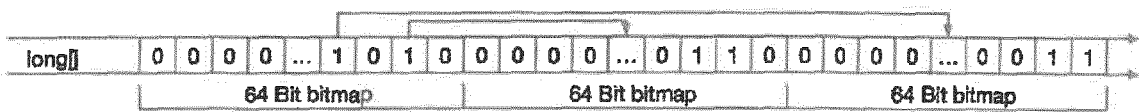

FIG. 7A to 7C show how leaf nodes are stored in maps and the "last" bitmaps are stored in sets in a compact manner and such that all values can be accessed in constant time. FIG. 7A shows how a leaf node is stored for a key-value-map with a larger and/or variable-sized value data type such as a longer string or text. As is shown in FIG. 7A, the value is stored separately. The space which is required for the additional pointers idx to the value is negligible if the size of the value is large in comparison with the size of the pointer.

Where the value data type is of fixed size, such as a date or an integer, it is more efficient to store the value "inline" as is shown in FIG. 7B, e.g. directly behind the bitmap of their parent node. For example, a long-to-long map, i.e. a map in which the keys are of type long integer and the values are also of the type long integer, can efficiently be implemented by the trie data structures according to preferred embodiments of the invention with inlining. Inlining only works with fixed size value data types because in their case, the position can be calculated e.g. as CTPOP(bitmap & (bitpos−1))*size. In contrast, for variable sized value data types, all values entries would have to be gone through to determine the position.

FIG. 7C shows how inline storing of the "last" bitmaps can be used for sets. Since there is no value, the last bitmaps are themselves inlined, without the need for pointers. Note that in the terminology used herein, these "last" bitmaps on a physical level are part of the parent nodes of leaf nodes, but the bits set in these bitmaps indicate the value of the key portions of leaf nodes on the logical level.

The trie data structure stores keys in an ordered manner, and therefore allows traversing keys in order. For example, a 64-bit long integer key may be stored starting with the most significant 6-bits (or 4-bits, because 64=4+10*6) to the least significant 6-bits. This way, integers are treated as unsigned long integers. For signed integers, which are typically encoded using two's complement, to have the correct ordering, they must be converted into an offset binary representation, e.g. by adding $2^{64-1}$ for 64-bit long integers. Floating point numbers are treated in a similar way. Therefore, coding a value of a data item of the key, such as a floating point number or a two's complement signed integer may comprise converting the data type of the data item into an offset binary representation consisting in an unsigned integer, e.g. an unsigned long integer.

Space-Efficient Trie Data Structures

In many application scenarios, use of memory space is inefficient. This is particularly true when the trie is sparsely populated and/or degenerates to a chain of nodes, where each node has only a single child pointer.

Chained Node Optimization

The inventor found in empirical studies that for arbitrary keys, a trie in typical application scenarios has many nodes with only a single child. This is because many keys share a common prefix, infix, or postfix. The prior art trie degenerates in such a situation into chains of nodes with single child pointers, and the space efficiency of the prior art trie data structure is low.

A first space optimization of the present invention eliminates child pointers when a node only has a single child, i.e. in the bitmap comprised by a parent node, only a single bit is set. This approach is referred to herein as "chained node optimization". An example of a trie where the chained node optimization is efficient is shown in FIG. 8. Leaf nodes 841, 842, 843 on level 4 of the trie share a common prefix comprising root node 800 on level 0, node 810 on level 1, which is the only child node of root node 800, node 820 on level 2, which is the only child node of node 810, and node 830 on level 3, which is the only child node of node 280.

The first space optimization of the present invention applies to a trie comprising one or more nodes, wherein a parent node comprised by the trie, preferably each parent node which has more than one child node, comprises a bitmap and one or more pointers, wherein each pointer is associated with a bit set in the bitmap and points to a child node of the parent node. The optimization is achieved by the fact that a parent node comprised by the trie, preferably each parent node which has only one child node, does not comprise a pointer to the child node, and/or the child node is stored in a predefined position in memory relative to the parent node. Preferably, a child node of a parent node having only one child node is stored in a position in memory directly behind the parent node.

The first space optimization according to the invention is illustrated in FIG. 9, which shows parts of a trie 910, before chained node optimization, and parts of a trie 920, which corresponds to trie 910 after chained node optimization has been applied. As in the preferred embodiments described above, the nodes in tries 910, 920 are stored in an array of long integers, which is indicated by the expression "long[ ]" on the left hand side of the illustration of the parts of tries 910, 920.

Trie 910 comprises a first node 911 having only one single child, as indicated by the (64-bit wide) bitmap of node 911, in which only one bit is set (1) and all other bits are unset (0). Like in the prior art tries, node 911 consequently comprises one single pointer 914, a long integer which points to node 911's child node, node 912. Node 912 has two child nodes, not shown in FIG. 9, as is indicated by the two bits which are set in the (64-bit wide) bitmap of node 912, and the two pointers 915, 916 comprised by node 912. As is indicated by the three dots (" . . . ") between node 911 and node 912, node 912 will typically not be stored in a memory location directly behind node 911, but could be stored anywhere in the array of long integers.

Trie 920 also comprises a first node, 921, having only one single child, as indicated by the (64-bit wide) bitmap of node 921, in which only one bit is set (1) and all other bits are unset (0). However, in contrast to node 911 in trie 910, node 921 in trie 920 does not comprise a pointer which points to node 921's child node, node 922. Instead, node 922 is stored in a memory location directly behind node 921, as it is preferred, but alternatively could be stored anywhere in the array of long integers as long as the position in memory relative to parent node 921 is predefined. E.g., child node 922 could be stored directly before parent node 921, or there could be another data object of fixed length between parent node 921 and child node 922. Like node 912 of trie 910, node 912 of trie 920 has two child nodes, not shown in FIG. 9, whose location in memory (in the array of long integers) is indicated by two pointers 925 and 926 comprised by node 922.

In the example embodiment of FIG. 9, where both the bitmap and each of the pointers comprised by a node are represented by long integers, i.e. by the same data type or data types of the same length, the chained node optimization according to the present invention reduces the memory space required for storing a node with one single child node by 50%.

Terminal Optimization

A second space optimization of the present invention provides for a more compact representation of the trie in memory where the "ends" of a trie comprise chains or strings of single nodes, i.e. many keys which do not have a common postfix. An example of a trie where the second space optimization is efficient is shown in FIG. 10. Each of the leaf nodes 1041, 1042, 1043, 1044, 1045 of trie in FIG. 10 is part of an independent (non-common) postfix. Each postfix comprises one node 1021, 1022, 1023, 1024, 1025 on level 3 of the trie, one node 1031, 1032, 1033, 1034, 1035 on level 4 of the trie, and the one leaf node, on level 5. Each of the nodes 1021, 1022, 1023, 1024, 1025 on level 2 and nodes 1031, 1032, 1033, 1034, 1035 on level 4 has only one single child.

According to the second space optimization, a node at the start of the string of single nodes is marked as a "terminal branch node". In FIG. 10, the terminal branch nodes are nodes 1021, 1022, 1023, 1024, 1025 on level 3 of the trie. The values of the key portions of the remaining nodes in the string are just stored consecutively in their "native" or literal coding, rather than being determined by the value of a bit (set) in a bitmap comprised by their parent nodes. This approach is referred to herein as "terminal optimization".

The second space optimization of the present invention therefore applies to a trie comprising one or more nodes, wherein a parent node comprised by the trie, preferably at least each parent node which has more than one child node, comprises a bitmap; a node, preferably each child node is associated with a key portion; and the value of the key portion of a child node, preferably of at least each child node whose parent has more than one child nodes, is determined by the value of a bit (set) in a bitmap comprised by the parent node with which bit the child node is associated.

In Ph. Bagwell, "*Fast And Space Efficient Trie Searches*", Technical Report, EPFL, Switzerland (2000), where nodes are allocated independently in memory, an approach called "tree tail compression" references with pointers to a string node or a stores numeric values of terminal strings directly in the terminal branch node. However, this approach is not space-efficient because offsets and node type (node with bitmap or node with character/pointer list) have to be stored in a node.

The terminal optimization according to the invention overcomes this problem by marking a node, preferably each node in the trie which has only one child node and all whose descendant nodes have at most one child node as a terminal-branch node, by a bitmap with no bits set. The invention uses the special quality of the bitmap comprised by the standard nodes of the preferred embodiments that they always have at least one bit set. This is because a node with an all-zero bitmap would be one without a child node, but a node without child nodes does not need to be represented in memory. Therefore, a special meaning can be attributed to a bitmap where no bit is set, and the bitmap of the terminal-branch node can have the same length or format as a bitmap comprised by a parent node which has more than one child node.

The value of the key portion associated with a descendant node, preferably each descendant node, of a terminal-branch node, preferably of each terminal-branch node, is not determined by the value of a bit (set) in a bitmap comprised by the parent node of the descendant node. Rather, the value of the key portion is encoded such that its representation requires less memory space than a bitmap comprised by a parent node which has more than one child node. Typically, the value of the key portion will be encoded as a binary number (numeral), such as an integer value. For example, where the bitmap comprised by a standard node has 32, 64, 128 or 256 bits, respectively, the key portion associated with a descendant node of a terminal-branch node is encoded by 5, 6, 7, or 8 bits, respectively.

The general storage configuration of a terminal optimization according to the preferred embodiment of the invention is shown in FIG. 11. A 64-bit wide bitmap in which no bit is set is followed by a number of (usually at least two) 6-bit key portions coded as a binary number. However, in the preferred embodiments, each 6-bit key portion is stored in an 8-bit block (one byte). This wastes some space because only 6 of available 8 bits are used, but converting from a 6 in 8 bits to 8 of 8 bits encoding and back increases the complexity of the implementation and decreases performance. Measurements conducted by the inventor showed that the waste of space is acceptable and the space improvement by storing 8 of 8 bits is only marginal.

A terminal branch node and/or its descendent nodes do not need to comprise a pointer to their one child node (if any) because the child node can be stored in a predefined position in memory relative to the parent node, preferably directly behind the parent node, as is shown in FIG. 12. Furthermore, the values of the key portions associated with the descendant nodes, preferably all descendant nodes, of a terminal-branch node, preferably of each terminal-branch node, are stored consecutively after the terminal-branch node. Finally, as can be observed in FIG. 12, in the string of single nodes, only for the terminal-branch node it is necessary that it has a bitmap, for marking the node as a terminal-branch node, whereas none of the descendent nodes of the terminal-branch node need to comprise a bitmap, in particular a bitmap in which a set bit determines the value of the key portion associated with its child node.

As will become apparent from the example illustrated in FIG. 14C and discussed below, terminal optimization according to the most preferred embodiments is more space-efficient than chain node optimization only in cases where the terminal-branch node has more than one descendant node. Furthermore, the greatest space saving can be achieved if already the first node in a string of single nodes is marked as a terminal-branch node, so that the parent of the terminal-branch node has more than one child node.

The second space optimization according to the invention is illustrated in FIG. 12, which shows parts of a trie 1210, before terminal optimization, and parts of a trie 1220, which corresponds to trie 1210 after terminal optimization has been applied. The nodes of tries 1210, 1220 are stored in an array of long integers again.

Trie 1210 comprises a first node 1211 having only one single child, as indicated by the bitmap of node 1111, in which only one bit is set (1) and all other bits are unset (0). The one bit which is set has the value "60", as can be seen from the fact that it is the fourth bit from the left in the 64-bit wide bitmap, in which the rightmost bit has a value of "0" and the leftmost bit has a value of "63". Node 1211 comprises one single pointer 1213, a long integer which points to node 1211's child node, node 1212. As is indicated by the three dots (" . . . ") between node 1211 and node 1212, node 1112 will typically not be stored in a memory location directly behind node 1111, but could be stored anywhere in the array of long integers. Node 1212 also has one child node, as is indicated by the second bit from the right which is set in the 64-bit wide bitmap of node 1212, the bit with value "01". However, since the child node of node 1212 is a leaf node, node 1212 does not comprise a pointer to its child node, but a leaf part 1214, which may be a pointer or value for a map (see FIGS. 7A and 7B), or empty for a set (see FIG. 7C). The leaf node is not represented in memory. Note that a particular "leaf indicator" is not necessary because in the preferred embodiments, the depth of the trie or the length of a key stored in a trie is known.

As can be observed, node 1211 is a terminal-branch node because it has only one child node 1212, and all its descendant nodes (1212 and 1212'S child node) have at most one child node (node 1212 has one child node, and node 1212'S child node has zero child nodes). Trie 1220 is obtained from trie 1210 as a result of the application of terminal optimization. Node 1221 of trie 1220, which corresponds to node 1211 of trie 1210, has been marked as a terminal-branch node by providing it with a 64-bit wide bitmap in which no bit is set. The value of the key portion associated with its child node 1222, which corresponds to child node 1212 of trie 1211, is not determined by the value of a bit (set) in the bitmap of node 1221. Rather, the value of the key portion is encoded as a binary number, such as an integer, which is comprised by node 1221, as is indicated by the number "60" in FIG. 12. Such a representation of the value of the key portion requires only 6 bits ($64=2^6$) and therefore significantly less memory space than the 64-bit wide bitmaps comprised by the parent nodes which have more than one child node. For example, value 60 may be encoded as the binary number "111100".

Terminal branch node 1221 does not comprise a pointer to its child node 1222. Rather, child node 1222 is stored in a predefined position in memory relative to its parent node 1221, namely directly behind the parent node. Node 1222, which is a descendant node of terminal branch node 1221, does not comprise a bitmap, nor a pointer to its child node, but only a binary number encoding the value of the key portion associated with the child node of node 1222, as is indicated by the number "01" in FIG. 12. For example, value 01 may be encoded as the binary number "000001". The representation of node 1222 is followed by a leaf part 1224 in memory. Again, leaf part 1224 may be a pointer or value for a map (see FIGS. 7A and 7B), or empty for a set (see FIG. 7C).

In the example embodiment of FIG. 12, where both the bitmap and each of the pointers comprised by a node are represented by long integers, the terminal optimized trie 1220 needs 64+6+6=76 bits for storing nodes 1221 and 1222. In comparison, non-optimized trie 1210 needs 64+64+64=192 bits for storing the same information (nodes 1211 and 1212, not counting in leaf part 1214, which is present in both tries 1210 and 1220).

Where like in the preferred embodiments an array of long integers is used for storing the trie, terminal optimization according to the invention suffers from alignment losses. In the worst case, one 6-bit key portion is stored in a 64-bit long integer. However, experiments showed that on average, 50% of the space used for storing the descendant nodes of terminal branch nodes is occupied. Furthermore, the terminal optimization still requires much less space than storing several single-child nodes with pointers or with chained node optimization.

A method for accessing standard nodes, nodes optimized by chained node optimization and nodes optimized by terminal optimizations in a uniform fashion will now be sketched with reference to FIG. 13. The main methods for node access as used in a query execution model in the example implementation are getBitSet( ), which returns a bitmap with bits set for all non-empty child pointers of a trie node, and getChildNode(bitNum), which returns the child node for the given node-branch specified by the bit number. Both these methods are provided by an interface CDBINode, wherein CDBI stands for "confluence database index". Another interface CDBINodeMem provides object-oriented access through the CDBINode interface to the data model.

The difficulty which had to be overcome was how to handle the three cases in a unified, central place and not having to deal with them separately in many places in the code. According to the solution found by the inventor, and as shown in FIG. 13, a node is referenced not only via a node pointer (index) but instead via a base node index ("nodeRef") and an index within a node ("idxInNode"), treating chains without pointers as well as terminals as one node with the base node index pointing to the start of the chain or terminal node. In this way, the memory space optimizations do not add significant complexity to the "get" operations, and hence performance is not decreased.

Since nodeRef always points to the first bitmap, it is used to detect the three cases in the implementation of getBitSet( ) and getChildNode(bitNum):

- If the bitmap has more than one bit set, it belongs to a regular node. getBitSet( ) returns that bitmap; getChildNode(bitNum) determines the idx (pointer to child node) and returns a new CDBINodeMem with nodeRef set to it (and idxInNode set to 0).
- If the bitmap is 0 (no bit set), it belongs to a terminal branch node. getBitSet( ) converts the literally stored 6-bit-value at the idxInNode position into a bitmap and returns it; getChildNode(bitNum) returns a new CDBINodeMem with the same nodeRef and idxInNode+1.
- If the bitmap has one bit set, it belongs to a chained node. getBitSet( ) returns the bitmap at the idxInNode position; getChildNode(bitNum) again returns a new CDBINodeMem with the same nodeRef and idxInNode+1. CDBINodeMem can also be used as a flyweight pattern by not creating a new child node, which is time-expensive, but just updating nodeRef and idxInNode (gotoChildNode method), i.e. by modifying an existing object which functions as a proxy.

FIG. 14A to 14C illustrate the trie growth for the insertion of two keys into an empty trie, a first key with key portion values [00, 02, 02] and a second key with key portion values [00, 03, 00, 01]. FIG. 14A shows the empty trie, which is denoted by a root index pointer with value 0. FIG. 14B shows the trie after adding the first key with key portion values [00, 02, 02]. Since there are no previous entries, the first key is stored using terminal optimization. FIG. 14C shows the trie after adding the second key with key portion values [00, 03, 00, 01]. The existing terminal node is split. The matching prefix ("00"), since it has only one child, is stored as a chained node followed by a regular node which has two child nodes ("02" and "03"). The remainder of the first key ("02") is stored as a node with a leaf part (storing it with terminal optimization would require more space). The remainder of the second key ("00" and "01") is again stored using terminal optimization.

To measure the space requirements for the data structures according to various embodiments of the invention, experiments were conducted in which a random set of long integers with full long integer value range was stored. FIG. 15 shows the measurement results, wherein the x-axis indicates in logarithmic scale the number of entries loaded into a trie index, and the y-axis indicates the number of bytes which were required on average for storing one entry.

It could be observed that chained node optimization alone reduced the space requirement by about 40%, and terminal optimization alone by about 60-75%. The combined chained node and terminal optimizations did not provide a visible space improvement compared to terminal optimization alone (the graph overlaps with the terminal optimization case). However, empirical measurements performed by the inventor showed that it is still worth applying both optimizations together. When chained node optimization is applied in addition to terminal optimization, performance increases because less pointers have to be followed, and the data locality is better and honors the memory hierarchy (CPU caches).

Bitmap Compression

A third space optimization of the present invention provides for a more compact representation of the trie in memory where the trie is sparsely populated. It can reduce memory space of bitmaps (e.g. bitmaps indicating key portion values of the child nodes) by grouping and efficiently storing sections of a same value (e.g. sections having the value 0 in the case of sparsely populated nodes or sections having the value 1 in the case of heavily populated nodes). This third space optimization is referred to herein as "bitmap compression".

The third space optimization of the present invention applies to a trie comprising one or more nodes, wherein a node, preferably at least each parent node which has more than one child node, comprises a bitmap in the form of a logical bitmap and a number of pointers, wherein each pointer is associated with a bit set in the logical bitmap and points to a child node of the node. The logical bitmap may correspond to the bitmap comprising key portion values, as mentioned with regard to other aspects of the invention. The optimization is achieved by the fact that the logical bitmap is divided into a plurality of sections and encoded by a header bitmap and a number of content bitmaps, wherein each section is associated with a bit in the header bitmap, and wherein for each section of the logical bitmap in which one or more bits are set, the bit associated with the section in the header bitmap is set and the section is stored as a content bitmap.

Using a header bitmap and a number of content bitmaps to store a logical bitmap can reduce the required memory space significantly by omitting content bitmaps for sections of the logical bitmap in which no bit is set. In other words, only content bitmaps (i.e. sections of the logical bitmap) having at least one set bit are stored in memory. In a worst-case scenario, in which each section of a logical bitmap has at least one set bit, memory usage will slightly increase, as an additional header bitmap needs to be stored. However, nodes are generally sparsely populated, and thus typically less memory is required when using bitmap compression.

An embodiment of bitmap compression according to the invention is illustrated in FIG. 16, which shows in its upper part a section of a trie 1601 with a parent node comprising a logical bitmap 1602 without bitmap compression. In its lower part it shows a section of trie 1611, with the parent node which is obtained after bitmap compression has been applied to the parent node of trie 1601. The parent node of trie 1611 comprises a header bitmap 1612 and two content bitmaps 1613, 1614 resulting from the bitmap compression.

The parent node in both tries 1601, 1611 further comprises pointers 1603 to 1605. In trie 1601, each pointer is associated with a bit 1606 to 1608 set in the logical bitmap 1602. In trie 1611, the pointers 1603 to 1605 are associated with bits 1616 to 1618 set in the content bitmaps.

The logical bitmap in trie 1601 is converted into the header bitmap 1612 and the content bitmaps 1613, 1614 in the lower part 1611 by dividing the logical bitmap 1602 into sections 1621 (e.g. of 8 bits) and storing the sections 1622, 1623 which have at least one bit set as content bitmaps 1613, 1614. Sections having no bit set are not stored as content bitmaps. Each bit in the header bitmap 1612 represents a different section of the logical bitmap. The content bitmaps 1613, 1614 are referenced by respective bits 1619, 1620 set in the header bitmap 1612. The content bitmaps 1613, 1614 may be stored in the same order (not shown) or in the inverse order in which the set bits 1619, 1620 associated with their sections are arranged in the header bitmap 1612. In other words, the rank of a content bitmap within all content bitmaps of the logical bitmap may correspond to the rank of the set bit associated with the section of the content bitmap, within all set bits in the header bitmap. In this way, the content bitmaps can easily be addressed while processing the trie. Also, the sections of the logical bitmap are preferably all coherent in memory. Thus, the entire logical bitmap can be represented coherently in memory by a header bitmap followed by a number of content bitmaps.

In a preferred embodiment, all sections have the same size. Sections of the same size allow an efficient processing of the compression and decompression of a logical bitmap, as no further information on the structure of the sections is necessary. Also, the header bitmap may be of the same size as the sections.

Different structures for storing the header bitmap and content bitmaps can be used. The header bitmap and the content bitmaps of the logical bitmap may be stored in an array, in a list, or in consecutive physical or virtual memory locations. When the header bitmap and the content bitmaps have the size of one byte, as shown in FIG. 16, the bitmaps may be stored in an array of bytes instead of in an array of long integers as it is done in trie 1601 or the tries of FIGS. 9 and 12 to 14, which reduces alignment losses. The content bitmaps are preferably stored in a predefined position in memory relative to the header bitmap. Storing the content bitmaps and the header bitmap close to each other may improve processing efficiency. In FIG. 16, the content bitmaps are stored directly behind the header bitmap in memory.

The afore-described bitmap compression can also be applied to pointers, like the pointers used for referencing child nodes, and can also be applied to inlined leaf bitmaps. This will typically further improve space efficiency but it hurts performance because the variable size encoding makes it necessary to iterate through the pointers when calculating the offset for a certain pointer.

The bitmap compression may be combined with the other aspects of the invention. For example, in combination with the pointer reduction, terminal-branch nodes according to the invention which are marked by a (logical) bitmap with no set bits set may be encoded as just a header bitmap and without any content bitmaps.

FIG. 17 shows the result of the experiment as it was described above with reference to FIG. 15. However, in addition to chained-node and terminal optimizations, bitmap compression was applied. As can be observed in a comparison to FIG. 15, the space savings achieved by bitmap compression are about 40% when no chained-node or terminal optimizations was applied, about 50-70% when only chained-node optimization was applied in addition, and about 30-60% when only terminal optimization or both chained-node and terminal optimization were applied in addition.

Key Encoding

The present invention provides way of storing different primitive data types for the keys, with fixed or variable sized keys (e.g. character string), as well as composite keys comprising two or more items of primitive data types in a trie.

Keys Comprising Control Information

In the preferred embodiments of the invention, keys can be encoded in such a flexible way that they can be iterated through, e.g. by a cursor, even without previous knowledge about the number, the data types, or the length of the components stored in a key.

These embodiments apply to a trie for use in a database application or information retrieval system, e.g. a trie or trie data structure in accordance with one of the embodiments of tries and trie data structures as described above. The trie comprises one or more nodes, wherein a node, preferably each child node, is associated with a key portion, and the path from the root node to another node in the trie, in particular to a leaf node, defines a key with which the node is associated, the key being a concatenation of the key portions associated with the nodes on the path. The above-mentioned flexibility is achieved by the fact that in addition to content information, the key comprises control information.

The key will typically comprise one or more key parts, wherein each key part comprises content information, which is a part of the overall content information comprised by the key. For each of the key parts, the control information preferably comprises a data type information element specifying the data type of the content information comprised by the key part.

There are in principle two ways of arranging the control information and the content information associated with a key part. A first way is shown in FIG. 18, where a key part or preferably each key part 10, 20, 30, comprises a data type information element (shadowed elements in FIG. 18) and a content information element. The data type information element specifies the data type of the content information element. This means that both the control information and the content information are distributed across the different key parts 10, 20, 30. In this case, a data type information element or each data type information element of the key is typically located by the content information element associated with the data type information element in the key, preferably (directly) before that data type information element. Thus, the data type information element is like a prefix or header element of a key part 10, 20, 30.

A second way arranging the control information and the content information associated with a key part is shown in FIG. 19, where the data type information elements (shadowed elements in FIG. 19) are located together, and preferably arranged in the same or inverse order as the content information elements whose data types they specify. The control information like the data type information elements is preferably located before the content information in the key, as a prefix or header element of the key. Studies made by the inventor showed that this second way of storing the data type information elements is preferable because keys with the same data types have the same prefix (starting nodes in the trie) and hence the number of the required nodes in the trie is reduced, which leads to space savings.

The data type of content information associated with a key part may be of fixed size, such as in the case of an integer, long integer, or a double precision floating point or a time/date primitive, or it may be of variable size, such as in the case of a character string, e.g. a Unicode character string, or a variable precision integer. In some embodiments of the invention, the key comprises two or more key parts comprising content information of different (primitive) data types.

As will be explained below with reference to FIGS. 20 and 21, the control information may comprise information identifying the last key part, e.g. by the status of the high bit of a data type information element. Alternatively, a key part count can be stored separately. Furthermore, the control information may comprise information on whether the trie is used for storing a dynamic set or an associative array.

The content information of a key part may be contained by one single key portion, but typically it is contained by two or more key portions. For fixed size key parts, the number of key portions required to contain the content information comprised by a key part is typically known. Where the data type of the content information comprised by a key part is a data type of variable size, the end of the content information element may be marked by a specific symbol, e.g. null-terminated strings having a null character ('\0', called NUL in ASCII) as last the character for strings. Alternatively and preferably, it may be marked by a specific bit in a specific one of the key portions containing the key part, as will be explained below for Unicode character strings with reference to FIG. 21.

Although as mentioned above the content information of a key part will oftentimes be contained by two or more key portions, a key portion preferably does not contain content information of two or more key parts. In other words, the content information of the key parts is aligned with the borders of the key portions. Similarly, a key portion preferably does not contain information of two or more control information elements like data type information elements, key part counts, or information on whether the trie is used for storing a dynamic set or an associative array. This approach makes the implementation easier and more efficient, usually without significant alignment losses. Furthermore, it allows storing the content information of different key parts in an interleaved manner, as will be explained below.

An example of a key encoding according to the invention is shown in FIG. 20. The key to be stored in a trie comprises control information 2010 and content information 2020. The key comprises several key parts comprising content information, and for each of the key parts, the control information 2010 comprises a data type information element 2012, 2013 specifying the data type of the content information comprised by the key part. Furthermore, the control information 2010 comprises information 2011 on whether the trie is used to store a dynamic set or an associative array. If the trie is used for storing an associated array, a leaf node of the trie which is associated with the key will typically comprise a leaf value 2030 or a pointer to such a leaf value.

As mentioned above, in the preferred embodiments of the invention, each parent node in the trie comprises a 64 bits wide bitmap, and therefore each key portion in the trie is capable of storing a 6-bit value. The information 2011 on whether the trie is used for storing a dynamic set or an associative array is stored by a first key portion, and therefore 6 bits are used for this information. In fact, 1 bit would have been sufficient for this yes/no information, but for the alignment reasons mentioned above, an entire key portion capable of storing a 6-bit value is used. The information is coded in node 2041, comprising a 64 bits wide bitmap in which a respective bit is set, and a pointer (idx) to the respective child node of node 2041.

Each of the data type information elements 2012, 2013 is also stored by one key portion, whose values are coded in the bitmaps of nodes 2042, 2043. 5 bits are used for the data type information, which allows for 32 different type identifiers. The $6^{th}$ bit which can be stored by the respective key portion, e.g. the high bit of the key portion, is used for indicating whether or not the key part associated with the data type information element is the last key part in the key. In the example of FIG. 20, the high bit of data type information element 2013 is set to indicate that the key part associated with data type information element 2013 is the last key part in the key.

The content information comprised by each of the key parts is also broken down into values 2021, 2022 of generally 6 bits, and each of the values is stored by one key portion. The nodes whose bitmaps are used to code (6-bit) values 2021, 2022 are not shown in FIG. 20, for space reasons. For example, where a key part comprises a 32-bit integer value, this 32-hit value is stored by six key portions, the first one of which stores a 2-bit value, and the last five of which each store a 6-bit value (32=2+6+6+6+6+6).

FIG. 21 shows a trie storing a key encoded according to the invention. Each parent node of the trie comprises a 64 bits wide bitmap. The key comprises a first key part comprising a 32-bit integer with value "100", and a second key part comprising a string with value "ab". The control information of the key comprises (1) a dynamic set identifier, (2) an integer identifier, and (3) a string type identifier with marker for last type. The content information of the key comprises (1) the 32-bit integer value "100" and (2) the string value "ab", coded in Unicode.

The dynamic set identifier is a 6-bit number of value 0 (0x00). Consequently, the bitmap of root node 2100 of the trie of FIG. 21 has the bit with value "0" set, and the $2^{nd}$ level node associated with this bit is associated with the key portion of value "0". The integer identifier is a 6-bit number of value 5 (0x05). Consequently, the bitmap of the $2^{nd}$ level node has the bit with value "5" set, and the $3^{rd}$ level node associated with this bit is associated with the key portion of value "5". The string type identifier with marker for last key part is a 6-bit number of value 39 (0x27). Consequently, the bitmap of the $3^{rd}$ level has the bit with value "39" set, and the $4^{th}$ level node associated with this bit is associated with the key portion of value "39".

Integer value "100" is coded in 32-bit binary as "00 000000 000000 000000 000001 100100". Therefore, the key portions associated with nodes on levels 5 through 10 which are used for storing integer value "100" are associated with values 0 (0x00), 0 (0x00), 0 (0x00), 0 (0x00), 1 (0x01), and 36 (0x24), respectively.

String value "ab" is coded as Unicode value for character "a" followed by Unicode value for character "b". Each Unicode character is stored using 2-4 key portions, depending on the Unicode value, which may need 10, 15 or 21 bits.

The coding scheme for Unicode characters used in the preferred embodiments of the invention is as follows:
- 10 bit Unicode character: 00xxxx xxxxxx
- 15 bit Unicode character: 010xxx xxxxxx xxxxxx
- 21 bit Unicode character: 011xxx xxxxxx xxxxx xxxxxx The last character in a string is marked by setting the high bit, which results in the following coding scheme for the last character:
- 10 bit Unicode character: 10xxxx xxxxxx
- 15 bit Unicode character: 110xxx xxxxxx xxxxxx
- 21 bit Unicode character: 111xxx xxxxxx xxxxx xxxxxx Unicode character "a" has the value 97 (0x61) and is coded in Unicode with to bits as "0001 100001". According to the coding scheme used in the preferred embodiments, Unicode character "a" is coded as "000001 100001". Unicode character "b" has the value 98 (0x62) and is coded in Unicode with to bits as "0001 100010". According to the coding scheme used in the preferred embodiments, Unicode character "b" is coded as "100001 100010", with high bit set because "b" is the last character in the string with value "ab". Therefore, the key portions associated with nodes on levels 11 through 14 which are used for storing string value "ab" are associated with values 1 (0x01), 33 (0x21), 33 (0x21), and 34 (0x22), respectively.

Interleaved Multi-Item Keys

Embodiments of the present invention provide a way of storing data in trie such that queries involving more than one data item can be performed in a more efficient manner. The inventive approach is particularly useful for storing keys or keys and values in a database or information retrieval system such that they can be queried more efficiently, for storing result keys or keys and values of a database or information retrieval system query, or for storing input keys or keys and values for a database query, such that the query can be performed more efficiently.

The inventive way of storing data uses a trie, such as tries with the data structures described above, the trie comprising nodes, wherein a node, preferably each child node, is associated with a key portion, and wherein the path from the root node to another node in the trie defines a key with which the node is associated, the key being a concatenation of the key portions associated with the nodes on the path. To achieve the performance gains in queries involving multiple data items, two or more data items are coded in a key, and at least one or two, preferably each of the data items consists of two or more components. The key contains two or more consecutive sections, at least one or two, preferably each of the sections comprising components of two or more of the data items coded in the key. An "item" is herein sometimes referred to as a "dimension", and it may correspond to what was referred to as a "key part" or the "content information of a key part" above.

FIG. 22 shows an example of a two-dimensional key with value (X=12, Y=45), i.e. a key coding the two data items X and Y. Both of these data items consists of two components, namely "1" and "2" in the case of item X, and "4" and "5" in the case of item Y. The key comprises two consecutive sections S1 and S2. Both sections comprise one component of each of the data items x and y coded in the key: section S1 comprises the first component "1" of data item X and the first component "4" of data item y; section S2 comprises the second component "2" of data item X and the second component "5" of data item Y. It can be said that in the preferred embodiments, the key codes the multiple data items in an interleaved manner, such as X1Y1X2Y2.

According to preferred embodiments, the coding of the key is such that a section, preferably each of the sections of a key contains at least and/or at most one component from each of the data items coded in the key. For example, both sections S1 and S2 of the key shown in FIG. 22 contain exactly one component of each of the data items X=12 and Y=45 which are coded in the key.

Furthermore, for two or more, preferably for all sections of a key, the components belonging to the different data items are ordered in the same sequence within the section. For example, in both sections of the key shown in FIG. 22, the components are ordered in such a sequence that a component of data item X comes first, and a component of data item Y comes second.

Moreover, the order of the sections comprising the components of a data item preferably corresponds to an order of the components within the data item. For example, in the key shown in FIG. 22, section S1 comes before section S2, which corresponds to the order of the components they comprise, in their respective items: S1 comprises component "1" of item X, which within item X comes before component "2" comprised by section S2. S1 also comprises component "4" of item Y, which within item Y comes before component "5" comprised by section S2.

Two or more, preferably all of the data items of a key have the same number of components. For example, both items X and Y coded in the key shown in FIG. 22 have two components. However, the data items of a key may also have different numbers of components. This may be the case, for example, where one item is a 64-bits integer, and another item is a 32-bit integer. Where the key codes the data items in a strictly regular interleaved manner, such as X1Y1X2Y2, a data item with a smaller number of components may be filled up, resulting e.g. in X1Y1X2Y2X3*X4*. Alternatively, the interleaving approach may have to be modified, resulting e.g. in X1Y1X2Y2X3X4.

FIG. 23 gives an example of how the key shown in FIG. 22 can be stored in a trie. In the preferred embodiments, the key portion associated with a child node, preferably with each of the child nodes corresponds to one component of a data item. In other words, a component, preferably each component, of a data item, preferably each data item, corresponds to the key portion associated with one child node of the trie. In the example of FIG. 23, second level node 2302 is associated with key portion 1, which corresponds to the first component of item X, third level node 2303 is associated with key portion 4, which corresponds to the first component of item Y, fourth level node 2304 is associated with key portion 2, which corresponds to the second component of item X, and fifth level node 2305 is associated with key portion 5, which corresponds to the second component of item Y. Although this is not preferred, a key portion associated with a child node may also correspond to only a part of a component of a data item, or to more than one component of a data item.

In the example of FIGS. 22 and 23, the data items X and Y are 2-digit decimal numbers, and the components are decimal digits. Other examples for data items coded in a key stored by a trie according to the invention are geolocation data such as longitude or latitude, indexes, number of any kind or data type, such as integer, long integer, or double long integer, 32-bit integers or 64-bit integers, strings of characters, arrays of bytes, or a combination of two or more of these.

Where a data item is a number, a component of a data item may be a digit (like in the example of FIGS. 22 and 23). Where a data item is a string of characters, a component of a data item may be a single character. Where a data item is an array of bytes, a component of a data item may be a single byte.

However, in the preferred embodiments, the components of a data item are bit groups of the binary encoding of the data item, the bit group preferably comprising 6 bits. This is because as explained above, in the preferred embodiments, the value of the key portion of a child node is determined by the value of a bit (set) in a bitmap comprised by the parent node with which bit the child node is associated. As a consequence, the size of the bitmap defines the possible alphabet for the key portion. For example, where each bitmap has a size of 64 bits, the amount of different values available for the key portion of a node is $2^6$. This means that bit groups comprising 6 bits of the binary encoding of the data item can be represented by the key portion associated with a node. Where 32-bit bitmaps are used, groups comprising 5 bits could be represented, etc.

For example, where a data item is a 64-bit long integer, and each component is a 6-bit group of the binary encoding of the integer, the data item has 64/6=11 components. Where the data item is a character coded in Unicode, it may have 2 to 4 6-bit components as explained above. Where a data item is a string comprised of several characters, the components in the preferred embodiments are still 6-bit groups, i.e. a string, like any other data item, has the same type of components (6-bit groups). The number components of a string of characters corresponds to the number of components of a single character multiplied by the number of characters in the string.

Instead of regarding the components of the preferred embodiments as bit groups, e.g. 6-bit groups, they could also be regarded as digits having a predefined radix or base, e.g. 64.

The interleaved way of storing keys with multiple data items can greatly enhance the performance of range queries involving the multiple data items, as will become readily apparent from the below description of range queries with reference to FIGS. 45 and 46, as well as FIG. 61 through 65. Furthermore, the skilled person will appreciate that the interleaved storing can improve performance in bi-directional searches and for searches involving a "NOT" operator involving multiple data items.

Set Operations

Embodiments of the present invention provide a time-efficient way to perform a query in a database or information retrieval system comprising operations such as intersection (Boolean AND), union (Boolean OR), difference (Boolean AND NOT) and exclusive disjunction (Boolean XOR) on two or more sets of keys stored in a database or information retrieval system, or sets of result keys of a database or information retrieval system query. These operations are here referred to as "set operations" or "logical operations".

Still most databases use the Volcano processing model which means "one tuple at a time". However, this is not efficient for modern CPU architectures with multiple levels of caching and in-memory databases in mind. As all operators in the physical execution plan run tightly interleaved, the combined instruction footprint of the operators may be too large to fit into the instruction cache, and the combined state of the operators may be too large to fit into the data cache. Therefore, some databases apply an operator-at-a-time model or a combination of both, a vectorized execution model. The index data structure according to the present invention and unified level-by-level processing model results in a very lean instruction footprint regarding the access to the index trie and operator implementation.

FIG. 24 shows an illustrative flow diagram of the various phases of a database query processing according to the prior art. The query is parsed 2401, rewritten 2402, and optimized 2403, and a query execution plan QEP is prepared and refined 2404 so that a query execution engine (QEE 2405) can execute the QEP generated by the preceding steps on the database 2406.

FIG. 25 shows an exemplary QEP used in prior art databases. The QEP is represented by a tree, wherein the parent nodes 2501, 2502 are operators and the leaves 2503, 2504 are the data sources. In a first operation, the results from a table scan 2504 are sorted by sort operator 2502. In a second operation, the result of the sort is merge-joined with the result of an index scan 2503.

FIG. 26 shows an operator control and data flow in an iterator-based execution model of prior art databases, in which the operators implement the following methods: Open (prepare the operator to produce data), Next (produces a new unit of data under the demand of the operator's consumer), and Close (finalizes the execution and frees resources). Each call to the Next method produces a new tuple.

The iterator-based execution model provides a unified model for operators, which is independent from the data model of the data sources (database tables or database indexes) and unifies interim results of the operator nodes. However, only one unit of data, e.g. a record is delivered per operator invocation. This approach is inefficient for operators combining large sub result sets which themselves return a small result set.

The tuple may be passed to other operators, as is shown in FIG. 27, which illustrates a tuple-at-a-time processing according to a query execution model of prior art databases. Starting at the root operator 2701, a call to next( ) will be propagated to its operator children 2702, 2703 and so on, until reaching the data sources (and leaves of the tree representation). In this way, the control flows down from consumer to producer, and data flows up from producer to consumer within the query execution plan operator tree.

The tuple-at-a-time processing model has small intermediate results and hence low memory requirements. The operators in the execution plan run tightly interleaved and may be quite complex. However, the huge amount of function calls and the combined state of all operators causes a large function call overhead and instruction and data cache misses because their footprint is frequently too large to fit into the CPU caches.

Both the iterator-based execution model and the tuple-at-a-time processing model require a sophisticated query optimizer to be efficient.

FIG. 28 shows an operator-at-a-time processing according to a query execution model of prior art databases, which returns immediately all tupels as a result of the operator, in a suitable data structure like a list. The operator-at-a-time approach is cache-efficient with tight loops with low function call overhead but creates large intermediate results per operator that may not fit into the data cache or may even not fit into main memory, which may render this approach useless.

The present invention solves the problems of the prior art by a novel execution model in which all data sources and preferably all operators are tries. Two or more input tries are combined in accordance with the respective logical operation (set operation), to obtain the set of keys associated with the nodes of a respective resulting trie.

A database query then provides as an output a representation of the resulting trie, the set of keys associated with the nodes of the resulting trie, or a subset of the keys associated with the nodes of the resulting trie, in particular the keys associated with the leaves of the resulting trie, or a set of keys or values derived from the keys associated with the nodes of the resulting trie. Alternatively, it may provide other data items associated with the nodes of the resulting trie, like document identifiers. The set of keys provided as an output may be provided in a trie, e.g. in a physical the data structure. It should be noted that the concept of a "resulting trie" is used herein to define the set of keys which needs to be obtained when combining the input tries using the logical operation. However, the resulting trie does not necessarily have to be formed in a physical trie data structure during the combination of the input tries, and the output set of keys may also be provided, e.g., by a cursor or iterator.

Generally speaking, a combination, using a logical operation, of two or more input tries results in a (resulting) trie which stores the set of keys obtained when the respective sets of keys stored by the respective input tries are combined, using the logical operation. In particular, if the logical operation is a difference (AND NOT), the parent nodes in the resulting trie are the parent nodes in the first input trie, and the leaves of a parent node of the resulting trie are the AND NOT combination of the set of child nodes of the corresponding parent node in the first input trie and the sets of child nodes of the corresponding parent nodes in the other input tries, if any. If the logical operation is not a difference, e.g. if the logical operation is an intersection (AND), union (OR), or exclusive disjunction (XOR), the set of child nodes of each node in the resulting trie is the combination, using the logical operation (e.g. AND, OR, or XOR), of the sets of child nodes of the corresponding nodes in the input tries. In this context, since each child node is associated with a key portion, and the path from the root node to another node in the trie defines a key with which the node is associated, the key being a concatenation of the key portions associated with the nodes on the path, two or more nodes of different tries "correspond" to each other if the keys associated with the nodes of the different tries are identical.

In preferred implementations, every operator itself appears again as a the to its consumer, including cases where the consumer is another operator using a logical operation, up to the root operator node in the query execution plan tree, e.g. by implementing a respective trie (node) interface. Such a trie node interface represents a trie node and provides methods or functions for querying of and/or traversing to the child nodes of the trie node it represents, and a representation of a trie represents the root node of the trie. Thus, instead of using an iterator-interface, a node interface can be used. This allows for functional composition and a simpler and cleaner software architecture, and it further improves the performance of the database engine because the lower implementation complexity directly results in less function call overhead and less data and instruction cache misses.

Preferably, the data structures for implementing the tries are as described above. In particular, it is advantageous if a node in an input trie, preferably at least all parent nodes in an input trie comprise a bitmap, and the value of the key portion of a child node in a trie is determined by the value of a bit (set) in the bitmap comprised by the parent node with which bit the child node is associated. Typically, the set of child nodes of a node of the resulting trie is determined by combining the sets of child nodes of the nodes of the input tries which correspond to the node of the resulting trie, using the logical operation. In such an implementation, the combination of the sets of child nodes of the corresponding nodes of the input tries can easily be performed by bitwise combining the bitmaps of each of the corresponding nodes of the input tries, using logical operations, such as bitwise AND, bitwise OR, bitwise AND NOT, or bitwise XOR. A combined bitmap is obtained, and the result of the combination is performed on the basis of the combined bitmap. In other words, the child nodes of the node of the resulting trie are determined (evaluated) on the basis of the combined bitmap, preferably only on the basis of the combined bitmap. As a consequence, the step of combining the bitmaps is performed before the child nodes of the node of the resulting trie are determined, and before the evaluation of the resulting trie traverses to the child nodes of the node of the resulting trie.

Thus, the physical algebra in the implementation of the tries corresponds directly to the logical algebra for the set operations. Whereas in the prior art, bitmaps are used in tries only for reducing the memory space required for pointers, the present invention takes advantage of the bitmaps for performing set operations on tries.

As mentioned above, an exemplary implementation of a trie node interface called "CDBINode" has the following main methods: getBitSet( )—returns a bitmap with bits set for all non-empty child pointers of a trie node; and getChildNode(bitNum)—returns the child node for the given node-branch as specified by the bit number.

FIG. 29 shows a trie control and data flow according to the query execution model of the present invention. An operator 2903 performs a set operation, e.g. an intersection, union, difference, or exclusive disjunction, on two sets of input base data 2901, 2902. The two sets of base data are each provided in an input trie, stored e.g. in a physical trie data structure, and the two input tries are combined by operator 2901 in accordance with the respective set operation. Operator 2903 itself appears as a trie to its consumer, by implementing the same trie (node) interface as the input tries. An executor 2904 invokes the above-mentioned trie node methods getBitSet and getChildNode, for traversing the result provided by operator 2903, as indicated by the dashed arrow between the executor and the operator. The same methods getBitSet and getChildNode are invoked by operator 2903 for traversing input tries 2901, 2902, when performing the set operation, as indicated by the dashed arrows between the operator and the input tries. In the data flow direction, indicated by the solid arrows, bitmaps and child trie nodes are passed from the input tries 2901, 2902 to operator 2903, and from operator 2903 to executor 2904.

As will be understood, one or more of the input tries for a higher-order set operation may be the output of another (a lower-order) set operation on tries, using the same or different logical operator. As mentioned above, such an output of a lower-order set operation on tries may be provided as a physical trie data structure. However, in preferred embodiments, an input trie for a higher-order set operation, which is an output of lower-order set operation is provided as a virtual trie. A virtual trie can be understood as a lower-order operator capable of evaluating the trie to be used in a higher-order operation. In this case, at the moment when a higher-order operator receives a representation of its input tries and at least one of the input tries is provided as an output of a lower-order operator, the physical data structure of that input trie as a whole does not exist, and may in fact never be realized at all.

Such a situation is shown in FIG. 29A, where a higher-order operator 2906 performs a higher-order set operation on a set of input base data 2905, provided e.g. in a physical trie data structure, and the output of lower-order operator 2903. Higher-order operator 2905 evaluates at least parts of a higher-order resulting trie, which is a combination, using the higher-order set operation, of input base data 2905 and the output of lower-order operator 2903. Lower-order operator 2903 evaluates at least partially a lower-order resulting trie, the lower-order resulting trie being a combination, using a lower-order set operation, of the two sets of input base data 2901, 2902, provided e.g. in a physical trie data structure. The lower-order set operation may be the same set operation as the higher-order set operation, or a different one. As used herein, the expression "parts of a trie" may refer to nodes and/or branches of the trie.

At least parts of the lower-order resulting trie are only calculated during the step of evaluating at least parts of the higher-order resulting trie. The parts of the lower-order resulting trie are evaluated on demand of the higher-order operator, and thus parts of the higher-order resulting trie and parts of the lower-order input resulting trie are evaluated in an interleaved manner. Consequently, at least parts of the lower-order resulting trie are calculated only after at least parts of the higher-order resulting trie have been calculated.

As will be understood, not all parts of the lower-order resulting trie may need to be accessed when higher-order operator 2905 evaluates the higher-order resulting trie. Therefore, at least some—preferably all—of the parts of the lower-order resulting trie which are not required for the evaluating the higher-order resulting trie are not evaluated. However, obviously at least those parts of the lower-order resulting trie need to be evaluated which are required for evaluating the higher-order resulting trie. FIG. 30 shows an example for applying an intersection (Boolean AND) operator 3003 on two input tries 3001, 3002. The input tries are 8-ary for readability, but in the preferred implementations trie data structures as described above are used. Input trie 3001 comprises three leaf nodes, associated with keys "13", "14", and "55". Input trie 3002 also comprises three leaf nodes, associated with keys "13", "15", and "64". Trie 3005 depicts the resulting trie obtained by the AND combination of input tries 3001, 3002.

As can be observed, the set of child nodes of each node in the resulting trie is the AND combination of the sets of child nodes of the corresponding nodes in the input tries. For example, the root node of resulting trie 3005 has one child node, associated with key "1". This one child node is obtained when forming the intersection of the set of child nodes ("1", "5") of the root node of input trie 3001 and the set of child nodes ("1", "6") of the root node of input trie 3002. Furthermore, the node associated with key "1" also has one child node, which is associated with key "13". In fact, node "13" is obtained when forming the intersection of the set of child nodes ("13", "14") of node "1" of input trie 3001 and the set of child nodes ("13", "15") of the corresponding node "1" of input trie 3002.

Thus, a resulting trie of an intersection operation, here resulting trie 3005, comprises all nodes and only the nodes which are comprised by each of the input tries, here input tries 3001, 3002. In particular, the set of leaf nodes of the resulting trie, here the node associated with key "13", comprises all leaf nodes and only the leaf nodes which are comprised by each and all of the input tries.

The algorithm performed by a preferred embodiment of the intersection operator 3003 can be described in pseudo code as follows:

```
1. nodeA = root node of trie A
2. nodeB = root node of trie B
3. getBitSet of nodeA -> 00100010
```

```
4. getBitSet of nodeB -> 01000010
5. bitwise and -> 00100010
6. for all set bits
      nodeA = getChildNode of nodeA
      nodeB = getChildNode of nodeB
      if leaf node
         perform bitwise and
      else
         recursion (step 3)
```

In this preferred embodiment, all trie nodes comprise bitmaps as described above. Furthermore, the tries are formed by nodes implementing an interface comprising the getBitSet and getChildNode methods as described above. A bitwise AND operation is performed between the bitmaps of corresponding nodes of the two input tries to determine the set of child nodes which the two corresponding nodes have in common.

As will be shown in the following with reference to FIG. 31 through 34, the solution of the present invention takes advantage of the hierarchical trie structures. It allows for lazy evaluation, as the tries are processed level by level. Performance of the set operations can therefore be improved significantly.

FIG. 31 shows two example input tries 3110, 3120, on which an intersection operation will be performed. Like all tries, input tries 3110 and 3120 have one (root) node on level 1. Input trie 3110 has two nodes on level 2, as indicated by the fact that the fourth and the seventh bits are set in bitmap 3111 comprised by the root node of input trie 3110. Input trie 3120 has one node on level 2, indicated by the seventh bit being set in bitmap 3121 comprised by the root node of input trie 3120. Both input tries have further sub-tries on level 3 or deeper, as indicated by the triangles depending from the bits which are set in the respective bitmaps of the nodes of level 2.

FIG. 32 shows the bitwise AND operations performed on the bitmaps of the corresponding nodes of input tries 3110 and 3120, on levels 1 and 2. The root nodes on level 1 of the input tries always correspond to each other, and therefore their bitmaps are combined with a first bitwise AND operation. Since the fourth and the seventh bits are set in bitmap 3111 of the root node of input node 3110, and (only) the seventh bit is set in bitmap 3121 of the root node of input node 3120, (only) the seventh bit is set in the combined bitmap 3201. On level 2, the node depending from the seventh bit of the bitmap 3111 of the root of input trie 3110 corresponds to the node depending from the seventh hit of the bitmap 3121 of the root of input trie 3120, whereas the node depending from the second bit of the bitmap 3111 of the root of input trie 3110 does not have a corresponding node in input trie 3120. Therefore, (only) bitmaps 3113 and 3122 are combined with a bitwise AND operation on level 2, and the third and sixth bits are set in the combined bitmap 3202.

FIG. 33 illustrates branch skipping during the intersection operation on input tries 3110 and 3120. Since the bitwise AND operation on the bitmaps 3111 and 3121 of the root nodes of the two input tries yielded a combined bitmap 3201 in which only the seventh bit was set, the intersection operation does not need to traverse the branch of input trie 3110 which depends from the fourth bit of the bitmap 3111 of the root node of input trie 3110. This is indicated in FIG. 33 by an "X" in the fourth position of bitmap 3111, and the dashed lines used for drawing the skipped branch. Likewise, on level 2, the seventh bit is only set in bitmap 3113 of a node in input trie 3110, but not in the bitmap 3122 of the corresponding node in input trie 3120. Therefore, the intersection operation does not need to traverse the branch depending from the seventh bit of bitmap 3113.

Finally, FIG. 34 shows the resulting trie of the intersection operation on tries 3110 and 3120. The bitmaps 3201 and 3202 associated with the nodes of the resulting trie on level 1 and level 2, respectively, correspond to the combined bitmaps which were calculated by the bitwise AND operations illustrated in FIG. 32.

The example of FIG. 31 through 34 showed that in general, some of the branches of the input tries do not need to be traversed in the course of a set operation combining the input tries, which can increase performance dramatically. The combined bitmaps may be used to determine which of the branches need to be further traversed and which ones can be skipped. This approach can be referred to as "result prediction" or "tree pruning".

FIG. 35 shows an example for applying a union (Boolean OR) operator 3503 on the two input tries 3001, 3002 of FIG. 30. An illustration of the resulting trie 3605 obtained by the OR combination of input tries 3001, 3002 is shown in FIG. 36.

As can be observed, the set of child nodes of each node in the resulting trie is the OR combination of the sets of child nodes of the corresponding nodes in the input tries. For example, the root node of resulting trie 3605 has three child nodes, associated with keys "1", "5", and "6". These three child nodes are obtained when forming the union of the set of child nodes ("1", "5") of the root node of input trie 3001 and the set of child nodes ("1", "6") of the root node of input trie 3002. The node associated with key "1" also has three child nodes, which are associated with keys "13", "14", and "15". In fact, these nodes are obtained when forming the union of the set of child nodes ("13", "14") of node "1" of input trie 3001 and the set of child nodes ("13", "15") of the corresponding node "1" of input trie 3002. Finally, the nodes in the resulting trie associated with keys "5" and "6", respectively, each have one child node, associated with keys "55" and "64", respectively, which are the child nodes of the corresponding nodes of the input tries 3001 and 3002, respectively.

Thus, the resulting trie of a union operation, here resulting trie 3605, comprises all nodes which are comprised by any of the input tries, here input tries 3001, 3002. In particular, the set of leaf nodes of the resulting trie, here the nodes associated with "13", "14", "15", "55", and "64", comprises all the leaf nodes which are comprised by any of the input tries.

The algorithm performed by a preferred embodiment of the union operator 3503 can be described in pseudo code as follows:

```
1. nodeA = root node of trie A
2. nodeB = root node of trie B
3. getBitSet of nodeA -> 00100010
4. getBitSet of nodeB -> 01000010
5. bitwise or -> 01100010
6. for all set bits
     if bit set in nodeA and nodeB
       nodeA = getChildNode of nodeA
       nodeB = getChildNode of nodeB
       if leaf node
         perform bitwise or
       else
         recursion (step 3)
     if bit set in nodeA only
       nodeA = getChildNode of nodeA
       recurse only TrieA (skipping bitwise or)
     if bit set in nodeB only
       nodeB = getChildNode of nodeB
       recurse only TrieB (skipping bitwise or)
```

Again, all trie nodes comprise bitmaps as described above, and the tries are formed by nodes implementing an interface comprising the getBitSet and getChildNode methods as described above. A bitwise OR operation is performed between the bitmaps of corresponding nodes of the two input tries to determine the set of child nodes comprised by any of two corresponding nodes. If a bit is set in the bitmap of only one of two corresponding nodes, the sub-trie depending from that one node is added to the resulting trie, which in the above pseudo code is indicated by "recurse only TrieA"/"recurse only TrieB".

FIG. 37 shows an example for applying a difference (Boolean AND NOT) operator 3703 on the two input tries 3001, 3002 of FIG. 30. Trie 3705 is an illustration of the resulting trie obtained by the AND NOT combination of input tries 3001, 3002.

As can be observed, all parent nodes of the resulting trie 3705 correspond to the parent nodes of the first input trie 3001. The leaf nodes depending from a parent node of the resulting trie 3705 are the AND NOT combination of the set of child nodes of the corresponding parent node in the first input trie 3001 and the sets of child nodes of any corresponding parent node in input trie 3002.

For example, the root node of resulting trie 3705 has two child nodes, associated with keys "1" and "5", which themselves are parent nodes. These two nodes correspond to the two child nodes of the root node of input trie 3002, which themselves are parent nodes. The node associated with key "1" has one child node, which is a leaf node and associated with key "14". This leaf node is obtained when forming the difference of the set of child nodes ("13", "14") of node "1" of the first input trie 3001 and the set of child nodes ("13", "15") of the corresponding node "1" of input trie 3002. Finally, the node in the resulting trie associated with key "5" has one child node, which is associated with key "55" and corresponds to the child of the node with key "5" of the first input trie 3001. This node with key "5" has no corresponding node in input trie 3002.

Thus, the resulting trie of a difference operation, here resulting trie 3605, comprises all parent nodes which are comprised by the first input trie, here input trie 3001. The set of leaf nodes of the resulting trie, here the nodes associated with keys "14" and "55", comprises all the leaf nodes of the first input trie, here trie 3001, minus the leaf nodes of the second input trie, here trie 3002.

The algorithm performed by a preferred embodiment of the difference operator 3703 can be described in pseudo code as follows:

```
1. nodeA = root node of trie A
2. nodeB = root node of trie B
3. getBitSet of nodeA -> 00100010
4. getBitSet of nodeB -> 01000010
5. bitset of nodeA -> 00100010
6. for all set bits
     if bit set in nodeA and nodeB
       nodeA = getChildNode of nodeA
       nodeB = getChildNode of nodeB
```

```
        if leaf node
            perform bitwise and-not
        else
            recursion (step 3)
    if bit set in nodeA only
        nodeA = getChildNode of nodeA
        recurse only TrieA (skipping bitwise and-not)
```

Again, all trie nodes are formed and implement the interface as described above. If a bit is set in the bitmap of corresponding nodes of both input trie 3001 and 3002, there is recursion on both tries. If a bit is set only in the bitmap of the node of the first input trie 3001, the sub-trie depending from that node is added to the resulting trie, which in the above pseudo code is indicated by "recurse only TrieA". Bits set only in the bitmap of the node of trie 3002 are ignored. A bitwise AND NOT operation is only performed between the bitmaps of corresponding nodes of the two input tries if their child nodes are leaf nodes.

The execution of the operators comprises is a recursive descent over the trie levels (in the preferred implementation, each level is one digit of radix/base 64). At each level, the bitmap of each node is used as result prediction followed by an iteration through the predicted bits. Thus, evaluating a resulting trie comprises performing a combination function for the root node of the resulting trie. Performing the combination function for an input node of the resulting trie comprises determining the set of child nodes for the input node of the resulting trie (which may also be empty), by combining the sets of child nodes of the nodes of the input tries which correspond to the input node of the resulting trie, using the logical operation, and performing the combination function for each of the child nodes determined for the input node of the resulting trie. As already mentioned above, the root node and/or an input node of the resulting trie do not have to be generated physically.

The step of evaluating a resulting trie may be performed using a depth first traversal, a breadth first traversal, or a combination thereof. Evaluating the resulting trie in depth first traversal comprises performing the combination function for one of the child nodes of the input node and traversing the sub-trie formed by that child node before the combination function is performed for the next sibling node of that child node. Evaluating the resulting trie in breadth first traversal comprises performing the combination function for each of the child nodes determined for the input node of the resulting trie and determining a set of child nodes for each of the child nodes determined for the input node of the resulting trie before performing the combination function for any of the grandchild nodes of the input node of the resulting trie.

One or more of the input tries for a set operation may be a virtual trie, i.e. a trie which is dynamically generated on demand during the operation of combining the input tries. Typically, only those parts of the virtual trie are dynamically generated which are required for combining the input tries using the logical operation. There are several scenarios for the application of a virtual input trie, one of them being the implementation of a database range query, which will be described later. Another scenario is that one or more of the input tries for a higher-order set operation is the output of lower-order set operation on tries, which was described above with reference to FIG. 29A.

A virtual trie is a trie whose physical data structure as a whole does not exist when the virtual trie is received, for example as an input trie for a set operator. A virtual trie can be understood as an operator capable of evaluating the trie. Preferably, the operator represents the root node of a trie and implements a trie node interface, wherein a trie node interface represents a trie node and provides methods or functions for querying of and/or traversing to the child nodes of the trie node it represents.

"Evaluating" a trie or parts of a trie could also be referred to as "rendering" or "synthesizing" the trie or parts of the trie and typically comprises traversing the trie or the parts of the trie, and providing the information that the traversed nodes are present in the trie. It may comprise realizing the physical data structure of the trie or of the parts of the trie as a whole. However, in the preferred embodiments, at any given moment, less than the entire physical data structure of the trie or of the parts of the trie are realized, and preferably only those parts of the physical data structure of the trie or of the parts of the trie are realized which need to be realized in that moment for the traversing the trie or the parts of the trie. Obviously, at any given moment during the evaluation of a trie or parts of a trie, at least those parts of the physical data structure of the trie or of the parts of the trie are realized which need to be realized in that moment for the traversing the trie or the parts of the trie.

In the preferred embodiments, where the a virtual trie implements the trie (node) interface, the trie or parts of it is evaluated using methods getBitSet and getChildNode as described above. For example, during a higher-order intersection operation where one of the input tries is a virtual trie, the higher-order intersection operator accesses and the virtual range trie delivers "on the fly" the components of the virtual trie required for evaluating the higher-order resulting trie, through the application programming interface (API). E.g., the bitmap of the current node of the virtual trie may be accessed through the getBitSet( ) method and a child node through the getChildNode( ) method introduced above. The API returns the respective bitmap on the one hand and—instead of the child node of a real trie—an object on the other hand which will provide the respective bitmap for the next recursion. For the higher-order operator, the virtual trie looks just like a trie implemented in a physical trie data structure.

Typically, a representation of a virtual trie is given to an operator which uses the virtual trie as an input for some operation. At least parts of the virtual trie are evaluated (on demand) during the step of performing the operation. Where not all of the parts of the virtual trie need to be accessed for performing the operation, at least some of the parts which are not required for performing the operation are not evaluated, and preferably only those parts of the virtual trie are evaluated which are required for performing the operation. This is illustrated in FIG. 37A and FIG. 37B for a case as illustrated in FIG. 29A, where a virtual trie is a lower-order set operator 2903, and a representation of this virtual trie is provided as an input trie to higher-order set operator 2906, which uses the virtual trie for evaluating at least parts of a higher-order resulting trie. The higher-order resulting trie is a combination, using a logical operation, of the input tries of set operator 2906, i.e. of the virtual trie and base data 2905. In the case of FIG. 37A and FIG. 37B, the higher-order set operation is an AND operation, and the lower-order set operation is an OR operation.

FIG. 37A shows three tries A, B and C. In the preferred embodiments, tries are 32-ary, 64-ary as described above. Thus, the bitmap referencing the pointers to the child nodes may comprise 32 or 64 bits. For simplicity reasons, the example shows a 4-ary trie. The tries are denoted by the trie roots 3701 for trie A, 3702 for trie B and 3703 for trie C. Each trie node comprises a bitmap 3704, 3705, 3706 as described above.

FIG. 37B shows how a ((A or B) and C) evaluation takes place without realizing or materializing (A or B) as an interim result, that is creating a physical trie data structure. The figure shows the expression tree for two levels and its evaluation. For the first level, the bitmaps of the root node of trie A (3704) and trie B (3705) are combined by a bitwise OR operation, resulting in bitmap 3709. Bitmap 3709 is combined by a bitwise AND operation with bitmap 3706 of the root node of trie C. The resulting bitmap 3710 prunes trie B from further consideration as there is no match with trie C. The resulting physical trie data structure is denoted with root node 3712. For the second level, bitmaps 3707 and 3708 of trie A and trie C are combined—trie B has no match here—resulting in bitmap 3711.

As can be seen from the example of FIGS. 37A and 37B, the fact that the result of the lower-order OR operation is provided as virtual input trie to the higher-order AND operator rather than as a fully evaluated physical trie data structure allows for "lazy evaluation". The lower-order resulting trie of the lower-order OR operation is evaluated during the evaluation of the higher-order resulting trie of the higher-order ANS operation. Therefore, at least parts of the lower-order resulting trie are evaluated after at least parts of the higher-order resulting trie have been evaluated. In fact, parts of the higher-order resulting trie and parts of the lower-order resulting trie are evaluated in an interleaved manner, wherein the parts of the lower-order resulting trie are evaluated on demand of the higher-order operator. This allows to only evaluate those parts of the lower-order resulting trie which are necessary for evaluating the higher-order resulting trie.

Note that for some operations, it is not required to actually realize a physical resulting trie data structure, e.g. if only the count (cardinality) of the result is required. As the skilled person will also understand, a higher-order operator may evaluate only parts of the higher-order resulting trie, e.g. if the higher-order resulting trie is used as an input for an even higher-order operator. Similarly, an input trie for a lower-order operator does not have to be a physical trie data structure but may again be a virtual trie, which e.g. is the output of an even lower-order operator. Finally, note that an operator typically obtains a representation of an input trie, wherein a representation of a trie may be a handle to a physical trie data structure, like a pointer. In the case of a virtual trie, the representation may be a handle to a trie operator capable of evaluating the trie.

Range Queries

The combination of two or more input tries by an intersection operation (Boolean AND) can advantageously be used for performing range queries in an efficient manner. A "range" can be described as a set of discrete ordered values comprising all the values between a first value and a second value of a certain data type, wherein the first and/or second values may or may not be included in the range. A range query returns the keys within a set of keys whose values correspond to (match) one or more specified ranges of values.

A range query according to the present invention is performed by an intersection operation of a trie which stores a set of keys to be searched for the one or more ranges (hereinafter "input set trie"), with a trie which stores all the values included in the one or more ranges (hereinafter "range trie"). The tries are preferably implemented as has been described above. The set of keys to be searched are typically associated with the nodes of the input set trie, and the values (keys) indicating the range of values to match are typically associated with the nodes of the range tries, in particular with the leaf nodes of the range tries. The set of keys to be searched is typically a set of keys stored in a database or a set of result or input keys of a database query, or a set of keys stored in an information retrieval systems or a set of result or input keys of an information retrieval system query.

A definition of one or more ranges for performing the query is obtained by user input or otherwise. The definition is used to generate the range trie, wherein the values associated with nodes (typically the leaf nodes) of the range trie correspond to the values comprised by the one or more ranges. In a next step, the input set trie is combined with the range trie using by an intersection operation as described above, to obtain the set of keys associated with the nodes of a resulting trie. Finally, the set of keys associated with the nodes of the resulting trie, or a subset of the keys associated with the nodes of the resulting trie, in particular the keys associated with the leaf nodes of the resulting trie, or a set of keys or values derived from the keys associated with the nodes of the resulting trie, are obtained as an output.

FIG. 38 shows an input set trie 3801 which stores a set of keys to be searched for one or more ranges and a range trie 3802 which was generated to store all the values included in the one or more ranges. Both tries 3801 and 3802 are combined by an intersection operator 3803 to obtain the set of keys in the input set trie 3801 whose values lie within the one more ranges stored by the range trie 3802. As described above, not only the input set trie and the range trie but also the intersection operator itself may implement a respective trie (node) interface, as is indicated by three triangles in FIG. 38. Where a trie node interface has the getBitSet( ) and getChildNode(bitNum) methods as presented above, the intersection operator 3803 may invoke these operations for traversing input set trie 3801 and range trie 3802, as indicated by the dashed arrows in FIG. 38. In the data flow direction, indicated by the solid arrows, bitmaps and child trie nodes are passed from set trie 3801 and range trie 3802 to intersection operator 3803.

FIG. 39 illustrates an example of the method of performing a range query according to the present invention. The leaf nodes of input set trie 3901 are associated with the three keys with values "13", "14", and "55". Range trie 3902 is generated to comprise all leaf nodes associated with keys whose values are in the range or [14 . . . 56]. At each level of range trie, the nodes at the ends of the range (in the example of range trie 3902 nodes and 5) contribute partially to the result. Nodes between the ends of the range (in the example of range trie 3902 nodes 2, 3, and 4) and the sub-tries depending from them contribute fully to the result. The AND combination of input trie 3901 and range trie 3902 by intersection operator 3903 obtains the set of keys associated with the nodes of resulting trie 3905. Executor 3904 may output, e.g., the values of the keys associated with the leaf nodes of resulting trie 3905, i.e. "14" and "55". This output corresponds to the values of all keys associated with the leaf nodes of input set trie 3901 which lie within the range of [14 . . . 56].

The algorithm performed by intersection operator 3903 can be described in pseudo code as follows:

1. nodeA = root node of trie A (the input set trie)
2. nodeB = root node of trie B (the range trie)

-continued

```
3. getBitSet of nodeA -> 00100010
4. getBitSet of nodeB -> 01111110
5. bitwise and      -> 00100010
6. for all set bits
      nodeA = getChildNode of nodeA
      nodeB = getChildNode of nodeB
      if leaf node
          perform bitwise and
      else
          recursion (step 3)
```

Range trie 3902 is an example which shows that the range trie may comprise very many nodes. Materializing range trie 3902 with all its nodes would thus be costly in terms of time and memory space. For this reason, the range trie may be implemented as a virtual trie as already described above, i.e. a trie which is dynamically generated on demand during the intersection operation. This is indicated in FIG. 39 by the content of the triangle of range trie 3902 being drawn with dashed lines.

During the intersection operation, the intersection operator accesses and the virtual range trie delivers "on the fly" the components of the virtual trie required for evaluating the resulting trie of intersection operation, through the application programming interface (API). E.g., the bitmap of the current node of the virtual trie may be accessed through the getBitSet( ) method and a child node through the getChildNode( ) method introduced above. The API returns the respective bitmap on the one hand and—instead of the child node of a real trie—an object on the other hand which will provide the respective bitmap for the next recursion. For the intersection operator, the virtual trie looks just like a real trie implemented in a physical trie data structure.

Typically, at least some of the parts of the virtual trie which are not required for the evaluating the resulting trie of the intersection operation are not evaluated, and preferably only those parts of a virtual range trie are dynamically generated which are required for combining the input set trie and the range trie by the intersection operation. In the example of FIG. 39, due to branch skipping as explained above, the virtual sub-tries associated with bits 2, 3, 4, and 5 set in the bitmap of the root node of the range trie are not accessed during the intersection operation, and for this reason none of their nodes is ever physically generated (rendered or synthesized).

In some embodiments of the range query according to the invention, like the embodiment illustrated in FIG. 39, the keys associated with the leaves of the input set trie code one data item of a specific data type. These embodiments can also be referred to as "one-dimensional" range queries. In one-dimensional range queries, the definitions of the one or more ranges comprise definitions of one or more ranges for the one data item.

Multidimensional Range Query Processing

In other embodiments of the range query according to the invention, the keys associated with the leaf nodes of the input set trie code two or more data items of a specific data type. In this case, the definitions of one or more ranges comprise definitions of one or more ranges for one or more of the data items. Such embodiments can also be referred to as "multi-dimensional" range queries. While in principle it is possible to execute a range query for each dimension and perform an intersection of the results, this will not be efficient as too many tries and too many operators would be involved.

An example for an efficient multi-item or multi-dimensional range query processing according to the invention is illustrated in FIG. 40. Input set trie 4001 is a two-dimensional or two-item trie, wherein each of its leaf nodes is associated with a key which specifies a value pair (x, y). Such a value pair can be used, e.g., to specify the longitude and latitude of geolocation data, or a composite key like (longitude, ID) or (latitude, ID), as will be explained below with reference to FIG. 54 to 57. Each of the dimensions x and y in this example comprises two digits in an 8-ary system for readability, but in the preferred implementations trie data structures as described above are used. As will become apparent from the explanation below, the x- and y-dimensions are stored in an interleaved manner in input set trie 4001, in accordance with the above described interleaved coding of multiple data items in one key.

Input set trie 4001 has a root node on level 1. The bitmap associated with the root node indicates the value of the first digit of the x-dimension. Bits "1" and "5" are set in the bitmap associated with the root node, which indicates that the first digit of the x-dimensions of the keys stored in the input set trie is either "1" or "5". The bitmaps associated with the nodes on level 2 indicate the value of the first digit of the y-dimension. Bits "3" and "4" are set in the bitmap associated with the node on level 2 which depends from bit "1" of the root node, and bit "6" is set in the bitmap associated with the node on level 2 which depends from bit "5" of the root node. This indicates that the first digit of the y-dimension of the keys whose x-dimension starts with a "1" is either "3" or "4", and the first digit of the y-dimension of the keys whose x-dimension starts with a "5" is "6". The bitmaps associated with the nodes on level 3 indicate the value of the second digit of the x-dimension. The bits set in these bitmaps indicate that there are keys with x-dimensions "12" and "16" whose y-dimension starts with "3", keys with x-dimensions "12" and "15" whose y-dimension starts with "4", and keys with x-dimensions "56" whose y-dimension starts with "6". The bitmaps of the nodes on level 4, and the nodes on level 5 are not shown in FIG. 40 but only indicated by small triangles depending from the nodes on level 4.

The range trie for a multi-item or multi-dimensional range query may be a multi-item range trie obtained by combining a single-item or one-dimensional range trie for each of the data items coded by the keys associated with the leaves of the input set trie, which single-item range trie for a data item stores all the values included in one or more ranges of the data item. A single-item range trie may be a virtual range trie as described above. This means that only those parts of a virtual single-item trie are dynamically generated which are required for combining the single-item range tries to obtain the multi-item range trie, or for combining the input set trie and the single-item tries by the intersection operation.

In the example of FIG. 40, two one-dimensional input ranges are obtained for the two-dimensional range query: the range of [15 . . . 55] for the x-dimension, and the range of [30, 31] for the y-dimension. A (virtual) range trie 4002 is created which stores the range of [15 . . . 15] for the x-dimension, and a (virtual) range trie 4003 is created which stores the range of [30 . . . 31] for the y-dimension.

In some multi-dimensional range queries, for some of the data items (dimensions) no definition of a range may be obtained. E.g., a user may specify only a range [15 . . . 55] for the x-dimension for performing a range query processing on the two-dimensional input set trie 4001 of FIG. 40, but no definition of a range for the y-dimension. This means that the user is interested in all keys stored in input set trie 4001 whose values for the x-dimension lie between 15 and 55, independent of their values for the y-dimension. The dimension for which no range is specified is to be skipped or ignored. This can be achieved by creating a (virtual) single-item range trie even for a data item for which no definition of a range is obtained, which stores the entire range of possible values of the data item. Such a trie can also be referred to as a "wildcard trie". For example, in one implementation, a MatchAll trie is a trio which implements the above-mentioned trie (node) interface ("CDBINode"). Calling the getBitSet( ) method on any of its nodes will always return a bitmap with all bits set.

The multi-item or multi-dimensional range trie which is obtained from the combination of the single-item or one-dimensional range tries typically stores all combinations of the values of the data items stored in the single-item (one-dimensional) range tries. E.g., if the range for an x-dimension is [11 . . . 13], and the range for a y-dimension is [7 . . . 8], the combined two-dimensional range trie stores the keys for the (x, y) value pairs (11, 7), (11, 8), (12, 7), (12, 8), (13, 7), and (13, 8).

FIG. 41 shows how the different portions of the one-dimensional range tries 4002 and 4003 of FIG. 40 are combined to obtain the interleaved two-dimensional range trie which is shown in FIG. 42. As can be observed in FIG. 42, the x- and y-dimensions in the combined two-dimensional range trie are stored in the same interleaved manner as input set trie 4001 of FIG. 40. In comparison, FIG. 43 shows how the one-dimensional range tries 4002 and 4003 of FIG. 40 are combined to obtain a non-interleaved two-dimensional range trie, which is shown in FIG. 44. From an abstract point of view, this results in a trie comprising all X-value keys, wherein each leaf node is the root of a trie comprising all Y-value keys.

In the preferred embodiments of the invention, and this is true for both for one-dimensional and multi-dimensional range queries, the range trie has the same structure or format as the input set trie. Thus, where a multi-dimensional input set trie stores the data items in an interleaved manner, the multi-dimensional range trie preferably uses interleaved storing, and where the input set trie stores the data items in a non-interleaved manner, the multi-dimensional range trie preferably also does not use interleaved storing. Furthermore, the keys associated with the leaves of a range trie preferably code the data items of the same data type as the keys associated with the leaves of the input set trie. Finally, in a range trie, a data item of a certain data type or a component of such a data item is preferably coded in nodes of the same level as the corresponding data item or component of the data item in the input set trie.

In some embodiments of the multi-item or multi-dimensional range query processing, the combining of the single-item or one-dimensional range tries to obtain a multi-item or multi-dimensional range is performed by a function which provides the multi-item range trie as an input to the function (e.g. an intersection operator) which implements the combining of the input set trie with the multi-item range trie. This is shown in the example of FIG. 64, where the combining is performed by interleave operator 6404.

In other embodiments, the combining of the single-item or one-dimensional range tries to obtain a multi-item or multi-dimensional range trie is performed within the function or operator which implements the intersection of the input set trie with the range trie. In this case, the multi-dimensional range trie will exist only conceptually. In fact, the function or operator which implements the combining of the input set trie with the range trie accesses the (virtual) one-dimensional range tries such as if they together formed a (virtual) multi-dimensional range trie. If there are dimensions for which no range is specified, these dimensions are skipped or ignored by the function or operator which implements the intersection of the input set trie with the range trie, e.g. by creating a wildcard trie as described above.

In the example of FIG. 40, the combining is performed by two-dimensional intersection (AND) operator 4004. The algorithm performed by intersection operator 4004 can be described in pseudo code as follows:

```
1. nodeA = root node of trie A (the input set trie)
2. nodeB = root node of trie B (range for x-dimension)
3. nodeC = root node of trie C (range for y-dimension)
4. getBitSet of nodeA –> 00100010
5. getBitSet of nodeB –> 00111110
6. bitwise and –> 00100010
7. for all set bits
       nodeA = getChildNode of nodeA,
   8. getBitSet of nodeA –> 00011000
   9. getBitSet of nodeC –> 00001000
   10. bitwise and –> 00001000
   11. for all set bits
       Get child node of child nodeA,
       nodeB = getChildNode of nodeB
       nodeC = getChildNode of nodeC
       if leaf node
           perform bitwise and
       else
           recursion (step 4)
```

The (virtual) multi-dimensional range trie is created conceptually in that the set of child nodes of each node in the resulting trie would be the result of the AND combination of the sets of child nodes of the corresponding nodes in the input set trie and the multi-dimensional range trie, if the one-dimensional range tries were actually combined to obtain a (virtual) multi-dimensional range trie, at least if the multi-dimensional range trie has the same structure or format as the input set trie.

E.g., FIG. 40 shows resulting trie 4006, which like input set trie 4001 stores the x- and y-dimensions in an interleaving manner. Resulting trie 4006 has a node 4007 which is associated with the key having the value (x=1, y=3). This node represents the entire set of child nodes of the node 4108 which is associated with the key having the value x=1. The node of input set trie 4001 which corresponds to node 4007 of resulting trie 4006 is node 4009, which is the node associated with the key having the value x=1. A multi-dimensional range trie 4100 which is obtained if the one-dimensional range tries 4002 and 4003 of FIG. 40 are actually combined, and which has the same structure and format as input set trie 4001, is shown in FIG. 41. The node of multi-dimensional range trie 4100 which corresponds to node 4007 of resulting trie 4006 is node 4101, which is the node which is associated with the key having the value x=1. The AND combination of the set of child nodes of node 4009 of input set trie 4001 (nodes 4010 and 4011) and the set of child nodes of node 4101 of multi-dimensional range trie 4100 (node 4102) results in node 4007 of resulting trie 4006.

Storing the different dimensions or items of a multi-dimensional or multi-item input set trie in an interleaved manner will in many cases lead to more efficient range queries, as will now be explained with reference to FIGS. 45 and 46.

FIG. 45 shows an input set trie 4501 storing the same values as input set trie 4001 of FIG. 40, but in a non-interleaved manner. Just like input set trie 4001, input set trie 4501 has a root node on level 1, and the bitmap associated with the root node indicates the value of the first digit of the x-dimension. However, the bitmaps associated with the nodes on level 2 of input set trie 4501 indicate the value of the second digit of the x-dimension, rather than the first digit of the y-dimension in interleaved input set trie 4001. The bitmaps associated with the nodes on level 3 indicate the value of the first digit of the y-dimension, and the bitmaps of the nodes on level 4 (not shown in FIG. 45) indicate the value of the second digit of the y-dimension.

The nodes which are traversed for a two-dimensional range query with ranges X=[15 . . . 55] and Y=[30 . . . 31] when performing the AND combination of the input set trie 4501 with a respective (likewise non-interleaved) two-dimensional range trie in accordance with the present invention are shaded in FIG. 45 (nodes on level 5 are not shown). Although only one node (x=16, y=3) in level 4 is a shaded node, on the three higher levels, in total six nodes need to be traversed (visited): the root node, x=1, x=5, x=15, x=16, and x=53.

In comparison, FIG. 46 shows interleaved input set trie 4001 of FIG. 40, wherein again the nodes which are traversed for a two-dimensional range query with ranges X=[15 . . . 55] and Y=[30 . . . 31] in accordance with the present invention are shaded (nodes on level 5 are not shown). The same one node (x=16, y=3) in level 4 as in FIG. 45 is a shaded node, but on the three higher levels, in total only four nodes need to be traversed: the root node, x=1, x=5, and (x=1, y=3).

The reason for this is that while in non-interleaved input set trie 4501 all x-values that fall within the range of [15 . . . 55] are determined up to the last (the second) digit, in the interleaved input set trie 4001, nodes not worth traversing can be eliminated more quickly by having a look at the first digit of the y-dimension. The chances of eliminating nodes by looking at the first digit of another dimension are higher than the chances of eliminating nodes by looking at a further digit of the same dimension. As will be understood, the more digits the different dimensions have, the higher will be the performance gains of interleaved storing.

As mentioned above, a range query processing may provide as an output a set of keys associated with the leaves of the input set trie, e.g. in case of a one-dimensional range query, or if the user is interested in all dimensions of multi-dimensional keys stored in an input set trie. Alternatively, the range query processing may provide as an output a set of reduced-item keys coding a subset of the data items coded by the keys associated with the leaves of the input set trie. An example for this is shown in FIGS. 47 and 48.

In FIG. 47, two-dimensional or two-item trie input set trie 4701 is the same as input set trie 4001 of FIG. 40, wherein each of its leaf nodes is associated with a key which specifies a value pair (x, y). The user in example is interested in all x-values stored in the input set trie. Thus, although not shown in detail, one-dimensional range trie 4702 is a wildcard-trie which stores the entire range of possible values of the x-dimension, and one-dimensional range trie 4703 is wildcard-trie which stores the entire range of possible values of the y-dimension.

Like one-dimensional range tries 4002 and 4003 of FIG. 40, one-dimensional range tries 4702 and 4703 are combined at least conceptually, to obtain a two-item or two-dimensional range trie. Since both one-dimensional range tries are wildcard-tries, the two-dimensional range trie contains all possible value pairs (x, y). The two-dimensional range trie is then combined with two-dimensional input set trie 4701 by two-dimensional intersection (AND) operator 4704. Like two-dimensional intersection (AND) operator 4004 of FIG. 40, intersection operator 4704 combines the two-dimensional input set trie with the two-dimensional range trie in accordance with the intersection operation, to obtain the set of keys associated with the nodes of a respective resulting trie. Furthermore, as explained above, the set of child nodes of each node in the resulting trie is the D combination of the set of child nodes of the corresponding node in the two-dimensional input set trie and the set of child nodes of the corresponding node in the two-dimensional range trie. Since the two-dimensional range trie stores all possible value pairs (x, y), the resulting trie is identical to the input set trie.

In contrast to intersection operator 4004 of FIG. 40, since the user is only interested in the x-values stored in the input set trie, intersection operator 4704 of FIG. 47 does not provide as an output a set of (x, y) keys associated with the leaves of the input set trie. Rather, intersection operator 4704 provides as an output a set of values for the x-dimension only, in this example the set of all x-values stored in the input set trie.

Where a range query processing provides as an output a set of reduced-item keys, like in FIG. 47, the sets of reduced-item keys which are obtained from different branches of the input set trie which are related to data items not coded in the reduced-item keys may contain duplicates. For example, as can be seen in FIG. 47, there are at least two leaf nodes in the input set trie 4701 whose x-value is 12, namely at least one where the first digit of the y-value is 3 (12, 3 . . . ) and at least one where the first digit of the y-value is 4 (12, 4 . . . ). In order to eliminate duplicate keys prior to providing the output, in particular if the output set is used in upstream operators, the sets of reduced-item keys which are obtained from different branches of the input set trie which are related to data items not coded in the reduced-item keys are merged prior to providing the output. For two dimensions, the merging can be performed per level of the input set trie in an acceptably efficient manner. However, it will oftentimes be more efficient (e.g. where the input set trio has more than two dimensions) to write the set of reduced-item keys into a newly created trie, whereby duplicates are automatically eliminated.

In the example of FIG. 47, in order to eliminate duplicate x-values in the output set, the set of x-value keys obtained as a result of combining input set trie 4701 with the two-dimensional range trie by the intersection operation is written into a newly created one-dimensional trie whose nodes are associated with keys having only x-values. This newly created one-dimensional trie is shown in FIG. 48. The values of the keys associated with its leaf nodes corresponds to the set of all x-values stored in input set trie 4701.

An algorithm performed by two-dimensional intersection operator 4004 outputting only x-values can be described in pseudo code as follows:

1. nodeA = root node of trie A (the input set trie)
2. nodeB = root node of trie B (wildcard trie for x-dimension)
3. nodeC = root node of trie C (wildcard trie for y-dimension)
4. getBitSet of nodeA –> 00100010
5. getBitSet of nodeB –> 11111111
6. bitwise and –> 00100010
7. for all set bits
    nodeA = getChildNode of nodeA,
8. getBitSet of nodeA –> 00011000
9. getBitSet of nodeC –> 11111111
10. bitwise and –> 00011000
11. for all set bits
    Get child node of child nodeA,
    nodeB = getChildNode of nodeB
    nodeC = getChildNode of nodeC

```
        if leaf node
            perform bitwise and
            write result key (x only) to output trie
        else
            recursion (step 4)
```

In the example of FIG. 47, only the values of the x-dimension are provided as an output. As will be understood, the same principles apply when only the values of the y-dimension are provided as an output. Furthermore, since both one-dimensional range tries 4702 and 4703 are wildcard-tries, all x-values stored in input set trie 4701 are provided as an output. As will be understood, where one-dimensional range tries 4702 and/or 4703 store only a subset of all possible x- and/or y-values, only a subset of all x-values stored in input set trie 4701 may be provided as an output. For example, if one-dimensional range trie 4702 was the same as range trie 4002 of FIG. 40, storing the x-values within the range of [15 . . . 55] only, the output provided by intersection operator 4004 would not comprise the value of x=12. As another example, if both one-dimensional range tries 4702 and 4703 were the same as the respective range tries 4002 and 4003 of FIG. 40, storing the x-values within the range of [15 . . . 55] only, and, respectively, storing the y-values within the range of [30 . . . 31] only, the output provided by intersection operator 4004 would only comprise the value of x=16.

Fuzzy Search

A frequent requirement for text retrieval applications is to provide an approximate string matching—also called fuzzy search capability. That is finding strings that match a pattern approximately rather than exactly.

The typical measurement for this "fuzziness" (difference between two character sequences) is the Levenshtein distance. The Levenshtein distance between two strings is the minimum number of single-character edits (character insertions, deletions or substitutions) required to change one string into the other.

Similar to the virtual range tries discussed above, one aspect of the present invention is directed to a preferably virtual fuzzy-match trie which is intersected using the Boolean D with a storage trie like an index trie to return matching key strings or documents comprising matching key strings. An index trie may store each occurring term and the document ID as two key parts (character string, long) as described above.

According to this aspect of the invention, data is retrieved from an electronic database or information retrieval system by performing approximate string matching. First, a search string of characters is obtained. Next, a match trie which stores a set of approximate character strings comprising the search string and/or variations of the search string is built. The match trie is combined, using an intersection operation, with a storage trie storing a set of character strings stored in the electronic database or information retrieval system or of result character strings of an electronic database or information retrieval system query. In other words, at least parts of a resulting trie are evaluated, the resulting trie being a combination, using an intersection operation, of the match trie with a storage trie storing a set of character strings which are stored in the electronic database or information retrieval system. The resulting trie is a trie which stores the set of keys obtained when the set of keys stored by the storage trie is intersected with the set of keys stored by the match trie.

The storage trie may be an index trie, for example storing character strings comprised by documents and the respective document identifier as two key parts, such as (character string, long). The character strings comprised by the set of character strings stored in the match trie are typically permanently stored in the electronic database or information retrieval system and/or represent entries in the electronic database or information retrieval system.

Like in the intersection of tries described above, a resulting trie, is obtained. The set of child nodes of each node in the resulting trie is the intersection of the sets of child nodes of the corresponding nodes in the match trie and in the storage trie, wherein nodes of different tries correspond to each other if a same key is associated with the nodes of the different tries. Typically, the match trie, the storage trie and the resulting trie have the same structure or format. Unless otherwise stated in this section, all aspects of intersection operations on tries discussed above also apply to intersection of tries in the context of fuzzy search.

As described above, a trie comprises one or more nodes, each child node is associated with a key portion, and a path from the root node to another node in the trie defines a key with which the node is associated, the key being a concatenation of the key portions associated with the nodes on the path. A trie can be implemented using the trie data structures described above. However, unlike in the examples described above, the match trie is typically a undirected cycle. This means that a child node in the match trie may have more than one parent node. Examples for undirected cycles are provided in FIG. 48B to 48E, which will be described in detail below. In contrast, each child node in the storage trie and the resulting trie has typically only one parent node.

The fuzzy search according to the invention is particularly efficient it the match trie is a virtual trie which is dynamically generated during the intersection of the match trie with the storage trie. Only those parts of the virtual trie are (dynamically) generated which are required for intersection of the match trie with the storage trie, which is sometimes referred to as "lazy evaluation". Unless otherwise stated in this section, all aspects of virtual tries discussed above also hold true for the use of a virtual match trie in the context of fuzzy search.

As an output of the fuzzy search, character strings and/or other data items such as document identifiers associated with a result set of nodes of the resulting trie are provided. Typically, the match trie comprises a set of matching nodes, each matching node being associated with one or more keys corresponding to one of the character strings from the set of approximate character strings. In this case, the result set of nodes may be the set of nodes of the resulting trie which correspond to the set of matching nodes in the match trie (a node of the resulting trie corresponds to a node of the match trie if a key associated with the node of the resulting trie is identical to a key associated with the node of the match trie). This means that only those character strings data items like document identifiers are provided as an output which are associated with the nodes of the resulting trie that correspond to matching nodes of the match trie.

With reference to FIG. 48A to 48E, it will now be described how a (virtual) match trie which stores the set of approximate character strings comprising the search string and/or variations of the search string can be generated. The match trie is derived from a finite automaton representing the set of approximate character strings. First, a non-deterministic finite automaton representing the set of approximate character strings is built. In the non-deterministic automaton, every transition between two states is typically associated with a specific character comprised by the search string, or a wildcard character, or an empty character string. From the non-deterministic finite automaton, a deterministic finite automaton also representing the set of approximate character strings can be derived, in which a transition between two states of the deterministic finite automaton is typically associated with a specific character comprised by the search string, or a wildcard character. The match trie is then derived from the deterministic finite automaton.

FIG. 48A shows a nondeterministic finite automaton (NFA) to match the search character string "abc" with a maximum editing distance of 2, also referred to as Levenshtein automaton. As is known to the skilled person, a finite automaton comprises states and transitions between the states. The state labelled with reference numeral 0001 is the start state, state 0006 the matching end state for 0 edits, state 0007 the one for 1 edit and state 0008 the one for 2 edits. For larger editing distances, an additional row of states would have to be added on the top; larger strings result in additional states at the right.

State 0002 is the state transition for a matching first character ("a"). For "abc" as input, the final state 0006 is reached. State 0003 is the state transition for an inserted character at the start, for example if "xabc" is provided to the automaton. The state transition 0004 reflects character substitution, e.g. providing "ybc" to the automaton. Finally, transition 0005 reflects character deletion, e.g. providing "bc" to the automation.

As can be seen, the automaton of FIG. 48A is nondeterministic. For example, providing "a" as first input character will result in states 01, 11, 10, 12, 21, 22 and 32. This set of states contains a matching state (32, reference numeral 0008), as "abc" needs two character removals to result in "a".

The NFA can be converted into a deterministic finite automaton (DFA) using e.g. the so-called Powerset construction method. Other methods to efficiently create a Levenshtein automaton DFA include the one proposed by Klaus Schulz and Stoyan Mihov. FIG. 48B shows such a DFA for matching "abc", for an editing distance of 1, to reduce the number of states for the example. The state labelled by reference numeral 1001 is the starting state. Reference numeral 1002 refers to the transition for a specific character ("b"). Reference numeral 1003 refers to the transition for any other character (wildcard). The grey states like the one labelled 1005 are the matching states.

In the preferred embodiments, the parent nodes in the match trie and the storage trie comprise a bitmap, and a value of the key portion of a child node in a trie is determined by the value of a bit (set) in the bitmap comprised by a parent node of the child node with which bit the child node is associated. Such trie data structures have been described in the examples above. They allow for a particularly efficient intersection operation because the intersection of a child node of the match trie and of a child node of the storage trie can be achieved by combining the bitmaps of each of the child nodes, using the intersection operation.

A match trie with such a data structure can be derived from the (deterministic) finite automaton by obtaining an augmented finite automaton by associating the transitions between the states of the finite automaton by an encoding of a specific character or of a wildcard character associated with the transition, which encoding consists of or is representative of one or more bitmaps whose length and/or format is equal to the bitmaps comprised by the parent nodes of the match trie. For an encoding of a specific character, exactly one bit is set in each of the bitmaps comprised or represented by the encoding. For an encoding of a wildcard character, the bits of all valid character encodings are set in the bitmaps comprised or represented by the encoding, thereby "masking" all valid character encodings (or the bits of all valid character encodings except for the encodings of the specific characters associated with the state from which the transition departs). In other words, the encoding of a wildcard is an OR combination of the bitmaps of all valid character encodings (or of all valid character encodings except for the encodings of the specific characters associated with the state from which the transition departs).

FIG. 48C shows such an augmentation of the transitions of the DFA of FIG. 48B, where the encoding schemes for Unicode characters and strings of Unicode characters as described above with reference to FIG. 21 are used. For readability, 10-bit Unicode character encoding are used only. These encodings use two bitmaps of 64 bits each. As described above, since exactly one bit is set in each of these bitmaps, they are capable of encoding 6 bits ($2^6$=64) each.

Encoding 2001 represents an "a" encoded as the two 6-bit values 1 ("000001") and 33 ("10001"), which encoded per bit position is 0000 0000 0000 0000 0000 0000 0000 0000 0000 0000 0000 0000 0000 0000 0000 0010 and 0000 0000 0000 0000 0000 0000 0000 0010 0000 0000 0000 0000 0000 0000 0000 0000

In hexadecimal representation, where 0000=0, 0001=1, 0010=2, 0011=3, . . . , 1111=F, this corresponds to 0x0000000000000002 and 0x0000000200000000.

Encoding 2003 represents a "b" encoded as the two 6-bit values 1 ("000001") and 34 ("10010"), which encoded per bit position is 0000 0000 0000 0000 0000 0000 0000 0000 0000 0000 0000 0000 0000 0000 0000 0010 and

```
0000 0000 0000 0000 0000 0000 0000 0100 0000 0000 0000 0000 0000 0000 0000 0000
```

In hexadecimal representation, this corresponds to 0x0000000000000002 and 0x0000000400000000.

In the wildcard case, the bits of the encodings of all allowed characters—the complete Unicode alphabet in this case—are set. For example, encoding 2002 has bits set to represent all 10-bit encoded Unicode characters, i.e. 6-bit values "000000" . . . "001111" and "000000" . . . "111111", which encoded per bit position is

```
0000 0000 0000 0000 0000 0000 0000 0000 0000 0000 0000 0000 1111 1111 1111 1111
``` and

```
1111 1111 1111 1111 1111 1111 1111 1111 1111 1111 1111 1111 1111 1111 1111 1111
```

In hexadecimal representation, this corresponds to 0x000000000000FFFF and 0xFFFFFFFFFFFFFFFF.

Encodings 2004 and 2005 denote the same character "b", one for the non-final case and one for the matching state, i.e. for the case that the "b" is the last letter in the input string. Encodings 2006 and 2007 show the analog case for a wildcard character. 2008 and 2009 show the cases for final matching states for character "c" and for a wildcard.

The complete wildcard masks for all Unicode characters (10-bit, 15-bit and 21-bit encodings as explained above with reference to FIG. 21) that lead to non-matching states are:

```
0x000000000000FFFF, 0xFFFFFFFFFFFFFFFF
0x0000000000FF0000, 0xFFFFFFFFFFFFFFFF, 0xFFFFFFFFFFFFFFFF
0x00000000FF000000, 0xFFFFFFFFFFFFFFFF, 0xFFFFFFFFFFFFFFFF, 0xFFFFFFFFFFFFFFFFL
```

The complete wildcard masks for all Unicode characters that lead to matching states are:

```
0x0000FFFF00000000, 0xFFFFFFFFFFFFFFFF
0x00FF000000000000, 0xFFFFFFFFFFFFFFFF, 0xFFFFFFFFFFFFFFFF
0xFF00000000000000, 0xFFFFFFFFFFFFFFFF, 0xFFFFFFFFFFFFFFFF, 0xFFFFFFFFFFFFFFFF
```

FIG. 48D shows the resulting top part of the match trie with each 10-bit Unicode character being represented by two key portions. As the Boolean AND operator on tries first needs a bitmap and later descends to the matching children, a specific character is encoded as a single bit and a wildcard as bitmap with bits set for all valid character encodings.

Such a match trie can be derived directly from any of the finite automatons described above, in particular the augmented finite automaton. However, where a character stored in the match trie, the storage trie, or the resulting trie is encoded by a number of M>1 key portions of the respective trie, i.e. by more than one levels of nodes, the match trie is preferably derived from a complete finite automaton representing the set of approximate character strings. Preferably, M is between 2 and 4.

The complete finite automaton from a preferably deterministic finite automaton as described above, more preferably from the augmented finite automaton, by replacing a transition, preferably every transition, between two states of the finite automaton by, or associating a transition, preferably every transition, between two states of the finite automaton with M−1 levels of intermediate states and one or more sequences of M transitions which link the two states via M 1 of the intermediate states. Thus, states not associated with a full character string are added to the finite automaton.

For example, in the finite automaton of FIGS. 48B and 48C, there is a transition departing from state 0 and ending in state 1. In the complete finite automaton, as becomes obvious from FIG. 48D, this transition is replaced by intermediate state no and the sequence of transitions comprising a transition between state 1 and state 110 and another transition between state 110 and state 1. As another example, in the finite automaton of FIGS. 48B and 48C, there is a transition departing from state 0 and ending in state 10. In the complete finite automaton, this transition is replaced by intermediate state 110 and the sequence of transitions comprising a transition between state 1 and state 110 and another transition between state 110 and state 10. As a third example, in the finite automaton of FIGS. 48B and 48C, there is a transition departing from state 0 and ending in state 14. In the complete finite automaton, this transition is replaced by intermediate states 110 and 111 and two sequences of transitions. The first sequence of transitions comprises a transition between state 1 and state 110 and another transition between state 110 and state 14. The second sequence of transitions comprises a transition between state 1 and state 111 and another transition between state 111 and state 14.

Each of the M transitions in a sequence is associated with an intermediate encoding which consists of or is representative of a bitmap whose length and/or format is equal to the bitmaps comprised by the parent nodes of the match trie, and wherein the match trie is derived from the complete finite automaton. The encoding is called "intermediate" here because it represents only a part of the encoding of an entire character, in the example of the complete finite automaton from which the match trie of FIG. 48D can be derived one half of the encoding of an entire character.

For example, in the complete finite automaton from which the match trie of FIG. 48D can be derived, the transition between state 0 and state 110 is associated with the encoding which consists of or is representative of the following bitmap:

0000 0000 0000 0000 0000 0000 0000 0000 0000 0000 0000 0000 0000 0000 0000 0010

In hexadecimal representation, this corresponds to 0x0000000000000002. The association of this encoding with the transition between states 0 and 110 is indicated by the upper dotted arrow between encoding 2001 that transition. The "1" to which this arrow points stands for bit no. 1 (the second bit) in the bitmap comprised by parent node 0 of the match trie of FIG. 48D.

As another example, in the complete finite automaton from which the match trie of FIG. 48D can be derived, the transition between state 0 and state 111 is associated with the encoding which consists of or is representative of the following bitmap:

0000 0000 0000 0000 0000 0000 0000 0000 0000 0000 0000 0000 1111 1111 1111 1111

In hexadecimal representation, this corresponds to 0x000000000000FFFF. The association of this encoding with the transition between states 0 and 111 is indicated by the upper dotted arrow between encoding 2002 that transition. The "0, 2 . . . 63" to which this arrow points stand for bits no. 0, 2 . . . 63 (the first, third . . . $64^{th}$ bit) in the bitmap comprised by parent node 0 of the match trie of FIG. 48D.

Where transition between the two states of the finite automaton is associated with a specific character, the concatenation of the bitmaps comprised by or represented by the intermediate encodings associated with the M transitions of a sequence is an encoding of the specific character, and exactly one bit is set in each of the bitmaps.

In the example of the finite automaton of FIGS. 48B and 48C, the transition between states 0 and 1 is associated with character "a". Thus, in the complete finite automaton from which the match trie of FIG. 48D can be derived, the concatenation of the bitmaps comprised by or represented by the intermediate encodings associated with the two transitions between states 0 and 1 (via state 110) is an encoding of character "a", in which exactly one bit is set in each of the bitmaps. This encoding is as follows:

0000 0000 0000 0000 0000 0000 0000 0000 0000 0000 0000 0000 0000 0000 0000 0010 and 0000 0000 0000 0000 0000 0000 0000 0010 0000 0000 0000 0000 0000 0000 0000 0000

In hexadecimal representation, this corresponds to 0x0000000000000002 and 0x0000000200000000.

If the transition between the two states of the finite automaton is associated with a wildcard character, the concatenation of the bitmaps comprised by or represented by the intermediate encodings associated with the M transitions of a sequence comprises an encoding where the bits of all valid character encodings are set in the bitmaps comprised or represented by the encoding, or the bits of all valid character encodings except for the encodings of the specific characters associated with the state from which the transition departs.

In the example of the finite automaton of FIGS. 48B and 48C, the transition between states 0 and 14 is associated with a wildcard character. Thus, in the complete finite automaton from which the match trie of FIG. 48D can be derived, the concatenation of the bitmaps comprised by or represented by one of the sequences of intermediate encodings associated with the two transitions between states 0 and 14 (via state in) is an encoding of a wildcard character. This encoding is as follows:

```
0000 0000 0000 0000 0000 0000 0000 0000 0000 0000 0000 0000 1111 1111 1111 1111
``` and

```
1111 1111 1111 1111 1111 1111 1111 1111 1111 1111 1111 1111 1111 1111 1111 1111
```

In hexadecimal representation, this corresponds to 0x000000000000FFFF and 0xFFFFFFFFFFFFFFFF.

Furthermore, in the case where the transition between the two states of the finite automaton is associated with a wildcard character, the concatenation of the bitmaps comprised by or represented by the intermediate encodings associated with the M transitions of a sequence will typically comprise one or more encodings comprising one or more portions of an encoding of the specific character and one or more portions of an encoding where the bits of all valid character encodings are set in the bitmaps comprised or represented by the encoding, or the bits of all valid character encodings except for the encodings of the specific characters associated with the state from which the transition departs.

For example, in the complete finite automaton from which the match trie of FIG. 48D can be derived, the concatenation of the bitmaps comprised by or represented by one of the sequences of intermediate encodings associated with the two transitions between states 0 and 14 (via state no) is an encoding comprising the first portion of the encoding of character "a" (which is also the first portion of the encoding of character "b") and the second part of the encoding of a wildcard character. This encoding is as follows:

```
0000 0000 0000 0000 0000 0000 0000 0000 0000 0000 0000 0000 0000 0000 0000 0010
``` and

```
1111 1111 1111 1111 1111 1111 1111 1111 1111 1111 1111 1111 1111 1111 1111 1111
```

In hexadecimal representation, this corresponds to 0x0000000000000002 and 0xFFFFFFFFFFFFFFFF.

The augmented finite automaton or the complete finite automaton, respectively, can be represented by or stored in a data structure comprising a number of rows, each row representing one state of the augmented finite automaton or the complete finite automaton and comprising a tuple for each of the transitions departing from the state, each tuple comprising the encoding associated with the transition and a reference to the state in which the transition ends. FIG. 48E shows such a data structure as an array of arrays, which can be used to represent the states of the complete finite automaton from which the match trie of FIG. 48D can be derived in a particular efficient manner. Such a data structure can comprise, for each state in which a transition ends, information about whether this state is a matching state, preferably encoded as a bit in each reference to the state. The data structure typically comprises a row for each of the states of the augmented finite automaton or the complete finite automaton, respectively, from which a transition departs.

The benefit with this (virtual) match trie approach is a good performance due to the simplicity of the implementation that leads to an efficient execution, as no complex state machine or alike has to be used, and also due to the way the AND operator works on bitmaps in the preferred embodiments.

Index Approaches and Perform Measurements

To measure the performance of the range queries according to various embodiments of the invention, experiments were conducted whose results will discussed in the following with reference to FIG. 53 to 70. A geo-location application with spatial queries was used as an example. The sample data was derived from the OpenStreetMap data for region Europe, which can be obtained from http://download.geofabrik.de/europe.html. Each entry in the example database contained an 10-digit ID, a value with seven positions after decimal point for each latitude and longitude, and a string representing the street name and the house number.

| ID | latitude | longitude | street/house-number |
|---|---|---|---|
| ... | | | |
| 2893790155 | 48.1567392 | 11.4790834 | Paul-Gerhardt-Allee 70a |
| 2893790156 | 48.1603032 | 11.4787549 | Frauendorferstraße 71 |
| 2893790157 | 48.1734518 | 11.4717007 | Thaddäus-Eck-Straße 72 |

-continued

| ID | latitude | longitude | street/house-number |
|---|---|---|---|
| 2893790158 | 48.1625381 | 11.4697256 | Paganinistraße 72 |
| 2893790159 | 48.1569137 | 11.4791783 | Paul-Gerhardt-Allee 72 |
| 2893790160 | 48.1601922 | 11.4788085 | Frauendorferstraße 73 |
| ... | | | |

A first experiment was made to see how the index size (the amount of indexed records) affects query processing performance for a constant result size. The database was queried to return the IDs of all locations within a small rectangle in the area of Munich (longitude 11.581981+/−0.01 and latitude 48.135125+/−0.01, as shown in FIG. 49). The database contained in total about 28.5 million records, and 3,143 out of them were matches.

For a first series of measurements, the matching records were loaded first and then the about 28.5 million other records were added to the database. These other records are illustrated as the shaded area in FIG. 50. After every 100,000 added records, the query was made and its execution time was measured. Obviously, every query returned the 3,143 matches.

For a second series of measurements, the matching records within the rectangle were also loaded first, but the remaining records were loaded without the records within the "bands" of matching longitude or latitude. The remaining records loaded in the second series of measurements are illustrated in FIG. 51.

The first experiment was performed on five different approaches to indexing and querying geo-locations.

In a prior art approach, herein referred to as "prior art indexing" a SpatialPrefixTree of an Apache Lucene 6.0.1 database engine which supports spatial indexing combining longitude and latitude was used (https://lucene.apache.org, package org.apache.lucene.spatial.prefix.tree). The SpatialPrefixTree is not a trie, but it was used for creating an inverted index optimized for spatial queries. Hence it provided a good benchmark for the approach taken here.

To query all locations within the specified rectangle, a range query was performed on both dimensions. The queries each returned a set of IDs representing the records located with the specified longitude or latitude band, which was collected by a cursor-based iterator to create interim result sets. The interim result sets were intersected to obtain the final result set. This is illustrated in FIG. 52, where the shaded areas mark the specified longitude and latitude bands (the interim result sets), and the black area marks the specified rectangle (the final result set). The SpatialPrefixTree is not a trie but used for creating an inverted index optimized for spatial queries. Query performance is enhanced by creating several indexes for several levels of resolution, similar to the variable precision indexing for tries which will be explained below with reference to FIG. 58 to 60.

FIG. 53 shows the measurement results for the prior art approach. The x-axis indicates the number of records loaded into the database, and the y-axis indicates the number of queries performed per second in logarithmic scale. It could be observed that with and without matching bands loaded into the database, the query performance decreased with an increasing number of records in the database. This performance behavior is typical for prior art databases, where the access time depends on the filling level of an index.

A first approach to indexing and querying geo-locations using preferred embodiments of the tries described above was made, which is herein referred to as "standard indexing". One index for latitude was created by means of a first 2-dimensional trie of the preferred embodiments, and another index for longitude was created by means of a second 2-dimensional trie of the preferred embodiments. In other words, each of the 2-dimensional index tries stored two items, namely (latitude, ID) or (longitude, ID), respectively. The 2-dimensional index tries were stored in a non-interleaved manner, as shown above in the trie of FIG. 44, wherein latitude/longitude formed a first key part and the ID formed a second key part. From an abstract point of view, this resulted in a trie comprising all latitudes/longitudes, wherein each leaf node is the root of a trie comprising the IDs of all locations having the respective latitude/longitude, as is illustrated in FIG. 54.

A range query over the first key parts (latitude/longitude) returned the trie roots of the IDs of the locations having the matching latitudes/longitudes. In order to deliver these results with a trie interface, the lists of trie roots were combined using a multi-OR operator which provides the trie interface, as is illustrated in FIG. 55. Thus, as is illustrated in FIG. 56, the standard indexing according to the invention used two index-tries 5601, 5603, each of them having two key parts: (latitude, ID) or (longitude, ID). For the first key part of the trie, a range query was performed using a virtual latitude/longitude trie 5602, 5604. The result of each of the range queries was combined using a multi-OR operator 5605, 5606. The result of the two multi-OR operators was combined using an AND-operator 5607, which delivered the final result.

FIG. 57 shows the measurement results for standard indexing. It could be observed that without matching records loaded into the database, the query processing time was constant, which is owed to the fact that tries have constant access times, i.e. independent of their filling level. The query processing time was also about 10 times shorter than when using the prior art approach, which is remarkable, given that the SpatialPrefixTree of the Lucene database engine is optimized for spatial queries.

With matching records loaded into the database, the query performance of standard indexing decreased because more and more results of the independent latitude and longitude queries had to be combined. The performance of standard indexing with matching records is not very good because long lists of nodes (IDs) occur. To improve performance, the amount of nodes that have to be combined by an OR operation needs to be reduced.

In an approach herein referred to as "variable precision indexing", the amount of nodes that need to be OR-ed could be reduced dramatically by maintaining multiple indexes with variable precision, creating a hierarchy. This is comparable to the concept of creating several indexes for several levels of resolution in the prior art database engine mentioned above. Using for example ranges in tries which store 2-digit decimal numbers, one can have indexes for each level representing the prefixes:

0, 1, 2, . . . 9

00, 01, 02, . . . , 09, 10, . . . 99

By way of example, an index for a first level of X-values ($1^{st}$ key part) is shown in FIG. 58, and an index for the second level of X-values is shown in FIG. 59, wherein the $2^{nd}$ key part (the Y-item) could be an ID. An entry in the first level index shown in FIG. 58 (the leaf of the $1^{st}$ key part or X-item) contains all IDs (tries of $2^{nd}$ key parts) of the X-values in the respective prefix range. A query for the X-range from 10 to 53 would combine the results of a query for the range of 1 . . . 4 on the index of FIG. 58 (two hits, marked by the dashed rectangle) with the results of a query for the range of 50 . . . 53 on the index of FIG. 59 (one hit, marked by the dashed rectangle). This results in only three nodes which have to be combined in a subsequent multi-OR operation, instead of five nodes when using only the index trie of FIG. 59.

The actual experiments conducted by the inventor used 6 bits for each precision step. The precision length was stored in the first byte of a key. A trie had 11 levels, and a node in the trie had up to 16 child nodes at the root level and up to 64 child nodes at the 10 subsequent levels (including leaf nodes). This means that at maximum 16−2 nodes at the root level and 2*(64−1) nodes at the next level for the left and right parts of the trie had to be OR-ed. This resulted in an upper bound of 16−2+2*(64−1)*10=1274 tries that had to be OR-ed. Every key value subject to a range query was stored with 11 precision levels. A range query based on a virtual range trie as described above was used to perform the query. A list of all keys which are required to select the required nodes was created.

FIG. 60 shows the measurement results for variable precision indexing. When the matching bands are not loaded, query execution is very fast (about 10 times faster than when using standard indexing) and with constant time.

Even with matching records loaded into the database, the query performance is almost constant. However, as will be shown below, variable precision indexing is expensive in terms of memory demand and indexing performance.

Another approach to indexing and querying geo-locations, herein referred to as "two-dimensional indexing", showed that there a solution which is faster than standard indexing but without the drawbacks of variable precision indexing. In this approach, illustrated in FIG. 61, the longitude/latitude and the ID of the database entries were stored in interleaved tries, which had the structure as discussed above, e.g., with reference to FIGS. 32 and 46. As with standard indexing, the latitude and longitude were indexed separately in two different tries, trie 6110 (longitude, ID) and trie 6120 (latitude, ID).

To query for a rectangle, a virtual range trie 6130 specifying the longitude range and a virtual range trie 6140 specifying the latitude range were created. When the longitude index was intersected with the longitude range trie and at the same time the latitude index was intersected with the latitude range trie, the intermediate results of the intersections were combined as will be explained in the following.

In a first step, a bitwise AND operation is performed between the bitmap of root node 6111 of longitude index trie 6110 and the root node of longitude range trie 6130, as is indicated by arrow 6151 in FIG. 61. Likewise, a bitwise AND operation is performed between the bitmap of root node 6121 of latitude index trie 6120 and the root node of latitude range trie 6130, as is indicated by arrow 6152 in FIG. 61.

Nodes 6112 and 6122 in FIG. 61 represent the nodes on level 2 of index tries 6110 and 6120. Each of these nodes on level 2 is the root node of an ID key part in the index. Thus, the bitwise D operation between the bitmap of root node 6111 of longitude index trie 6110 and the root node of longitude range trie 6130 yields the first key portions of the IDs which belong to locations having the specified longitude range, and bitwise AND operation between the bitmap of root node 6121 of latitude index trie 6120 and the root node of latitude range trie 6140 yields the first key portions of the IDs which belong to locations having the specified latitude range.

In a second step, keys in the index tries which do not belong to locations falling into both the specified longitude and latitude ranges are filtered out as follows: the bitmaps of the nodes of the longitude/latitude index trie 6110/6120 yielded by the first step are combined by a bitwise OR operation, and a bitwise D operation is performed between the results of the bitwise OR operations, as is indicated by arrow 6153 in FIG. 61.

Nodes 6113 and 6123 in FIG. 61 represent the nodes on level 3 of index tries 6110 and 6120. Each of these nodes on level 3 stores a second key portion of the longitude/latitude key part stored in the index trie. The operation in the third step continue with the nodes on level 3 which belong to keys that have not been filtered out in the second step. A bitwise 1D operation is performed between the bitmaps of these nodes and the corresponding nodes (on level 2) of the respective range tries 6130, 6140, as is indicated by arrows 6154, 6155 in FIG. 61.

Nodes 6114 and 6124 in FIG. 61 represent the nodes on level 4 of index tries 6110 and 6120. Each of these nodes on level 4 stores a second key portion of the ID key parts stored in the index trie. The operation in a fourth step continues with the nodes on level 4 which were yielded as the result of the bitwise AND operations in the third step. Similar to the second step, the bitmaps of the nodes of the longitude/ latitude index trie 6110/6120 yielded by the first step which have the same parent node are combined by a bitwise OR operation, and a bitwise AND operation is performed between the corresponding results of the bitwise OR operations, as is indicated by arrow 6156 in FIG. 61.

The operation was continued in the same fashion until the leaf nodes of the index tries was reached. In summary, the two indexes were combined using a matcher that returned a "view" of the alternating index with the first dimension (x) only. The second dimension was suppressed in the output of the matcher.

FIG. 62 shows the measurement results for two-dimensional indexing. Again, when no matching bands were loaded into the database, the query time was constant. With matching bands loaded into the database, the query performance improved significantly compared to standard indexing.

The strategy of matching and suppressing a dimension could in principle be applied to more than two dimensions. However, this causes large chains of nodes: Each node of the x-dimension may have 64 children of the y-dimension which again may have 64 children, already 4096 in total.

In a last approach to indexing and querying geo-locations, herein referred to as "single-index indexing", only one, multi-dimensional index was created which stored both longitude and latitude in one interleaved trie as discussed above, e.g., with reference to FIGS. 32 and 46. The schematics of this index trie is shown in FIG. 63, where the first and second key parts X and Y, representing longitude and latitude, are stored in an interleaved manner, and a third key part, representing the IDs of a location, is stored in subtries which depend from the leaves of the X/Y trie. The IDs stored in each of the subtries belong to the set of locations having the same longitude and latitude.

To query for the rectangle, a two-dimensional range query was performed as described above, e.g. with reference to FIG. 40. As is shown in FIG. 64, the range for longitude was specified by a first one-dimensional virtual range trie 6402, and the range for latitude was specified by a second one-dimensional virtual range trie 6403. Both one-dimensional range tries were combined by interleave operator 6404 to form an interleaved two-dimensional range trie. To obtain the set of ID subtries which belong to matching longitudes and latitudes, AND operator 6405 performs an intersection between the two-dimensional range trie and the X/Y part of the index trie 6401.

FIG. 65 shows the measurement results for single-index indexing. It could be observed that single-index indexing offers perfect scalability, and the query performance did not noticeably depend on the number of records in the database, even when the matching bands were loaded. Note that the spikes in the performance were caused by the Java Virtual Machine garbage collections.

FIG. 66 shows the results of a second experiment, in which query performance (queries per second) was measured over increasing result size. The query rectangle was increased from +/−0.01 to +/−0.20 degrees for latitude and longitude. 28.5 million records were loaded into the database first. It could be observed that variable precision indexing scales best for larger results (note that due to memory constraints, only partial data could be loaded for variable precision indexing). Single-index indexing also offers a good performance. This is particularly true when in addition to latitude and longitude, the ID was also stored in an interleaved manner. It is believed that the performance gain of the triple-interleaved index results from an increased number of common prefix paths, which is evidenced also by a smaller memory footprint (46.01 vs. 44.76 bytes/point). Performance may be better because there are less branches in the tree, which may result in less recursion steps for traversing the tree.

Prior art indexing using the Lucene database delivered nearly constant results for all result sizes, but at a lower performance level than single-index indexing. Standard indexing (two indexes non-interleaved) and two-dimensional indexing (two indexes interleaved) performed better than the prior art indexing using the Lucene database for small results sizes, but was less performant for large result sizes. FIG. 67 shows the same results as FIG. 66, but with a logarithmic scale on the x-axis. In this representation, it can be seen the query performance for indexes according to the invention decreases on a straight line for growing result size. This means that in particular the two single-index approaches have a linear scalability, i.e. a doubled result size doubles the query time.

In a third experiment, indexing performance (indexed entries per second) was measured. 28.5 million records were loaded, and the time was measured every 100,000 added records. It could be observed that the prior art index and all trie-based approaches offer a practically constant performance over index growth. The results are summarized in FIG. 68. As mentioned above, variable precision indexing did not perform well because 2×11 index entries had to be created per record. The prior art index (Lucene), whose approach is similar to variable precision indexing, performed even worse. The trie-based standard indexing and two-dimensional indexing both create 2 index entries per record and hence have similar indexing performance. Single-index indexing creates only one index entry per record and performs best. Note that in the trie-based approaches, the black column represents the results of uncompressed tries and the light column the results for tries using bitmap compression.

FIG. 69 compares the memory space required by the different indexes per indexed location. The prior art Lucene index used more space than the trie-based standard indexing and two-dimensional indexing with bitmap compression (light columns) and the single-index indexing, even without bitmap compression. Trie-based variable precision indexing required much more space than any other approach.

It can be concluded that standard indexing works sufficiently well for attributes with low or medium cardinality. For example, product prices typically do not have a continuous value space but discrete values like 3.99, 4.49, 40.89, etc. Instead of storing something like an order-date as a timestamp with millisecond precision, it may be sufficient to store it with day or hour precision to satisfy the requirement of making the value space "more" discrete. To index columns with continuous value space, variable precision indexing offers better performance, especially if used in multidimensional queries. However, due to slow indexing and high memory demand, use of variable precision indexing can be recommended only for static applications and where sufficient memory is available. For closely tied dimensions, single-index indexing is the best solution for moderate expected result sizes.

Even though the multi-dimensional indexes have been presented here in the context of spatial queries, the trie-based range queries can be applied to many other situations, e.g. for graph databases. A property graph database is based on nodes that are connected by edges, with both nodes and edges having properties. If nodes and edges are each represented by a unique ID, a node-edge-node triplet can be represented and queried using these three IDs as dimensions. Note that the same applies to the context of the Resource Description Framework (RDF) with its subject-predicate-object expressions—called triplets in RDF-terminology.

As mentioned above, the invention can easily be used also for full text search applications by storing each occurring term and the document ID as two key parts (character string, long). Since the invention is based on a prefix-tree, it inherits the string search capabilities of prefix trees. For example, it can be used to efficiently implement fuzzy (similarity) searches.

Figure 70A:
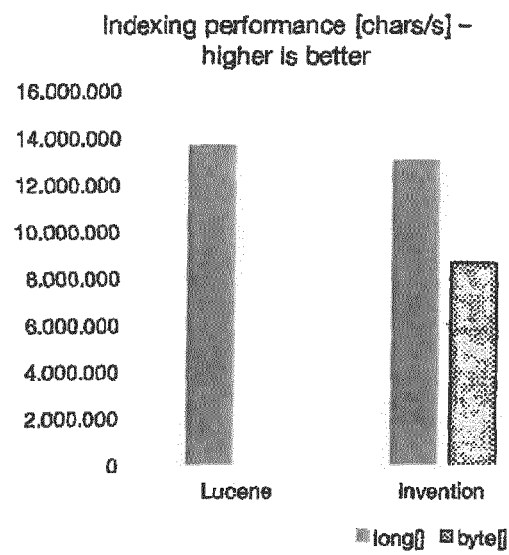

In fact, measurements performed by the inventor show the competitive performance in information retrieval applications. In an experiment performed shortly before the priority date of this application, 500,000 English Wikipedia articles were indexed. FIG. 70A shows the average indexing performance of embodiments of the invention compared to the Lucene information retrieval software library in characters/sec. It can be seen that the inventive system delivered only slightly lower indexing performance when arrays of long integers were used (black column) As expected, indexing performance was somewhat lower when bitmap compression with arrays of bytes were used (light column).

Figure 70B:
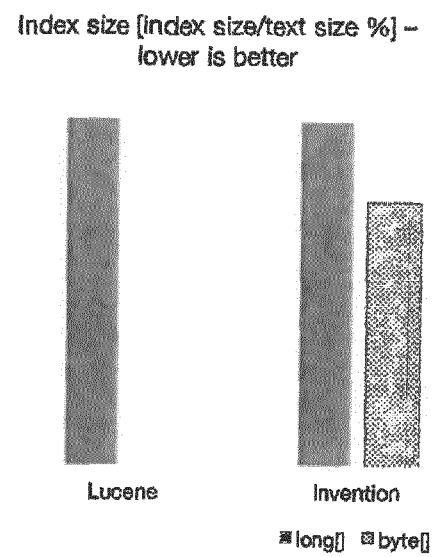

FIG. 70B compares the index sizes (index size/text size in %). Surprisingly, even the memory model based on arrays of long integers (black column) was on par with Lucene—although there are alignment losses. The memory model based on bitmap compression with arrays of bytes (light column) required less space than Lucene.

Figure 70C:
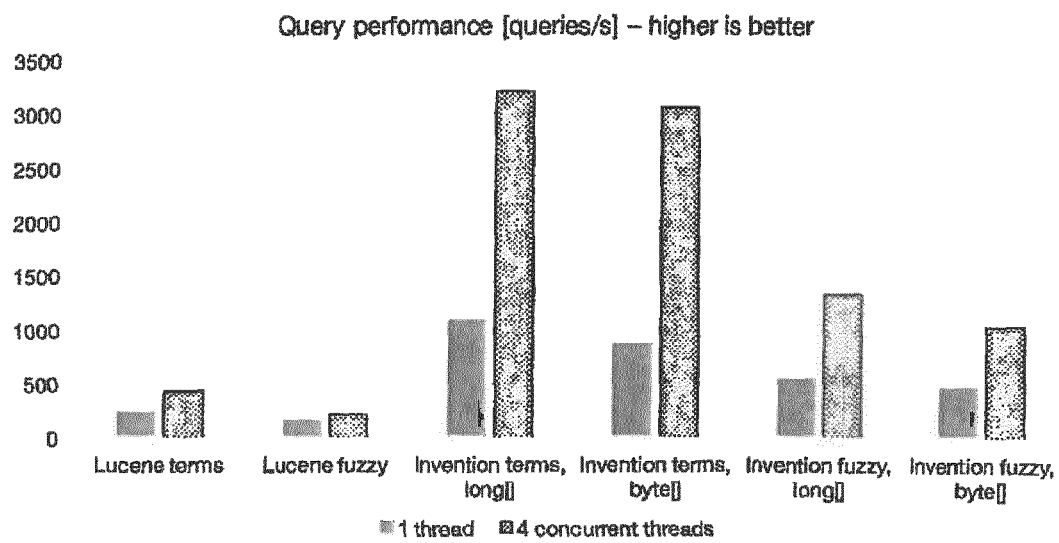

FIG. 70C shows the query performance (queries/sec). A terms query in this experiment searched for all documents that contain the words "which" or "his" in combination with "from", to provide some complexity and quantity. With multiple concurrent threads, the performance of the inventive system is up to seven times higher than that of Lucene.

The fuzzy query in this experiment searched for documents that contain words similar to "chica". Similarity is defined by an editing distance (Levenshtein distance) of one, that is with a maximum of one character deletion, insertion and substitution. In this discipline, the inventive system proved to be four to six times faster than Lucene. It is worth noting that both Lucene and the inventive system delivered exactly the same amount of result documents: 319,809 for the term query and 30,994 for the fuzzy query.

The experiment as described above was repeated shortly before the filing date of this application, i.e. about one year later. The results of the repeated experiment can be seen in FIG. 70D to 70F.

Figure 70D:
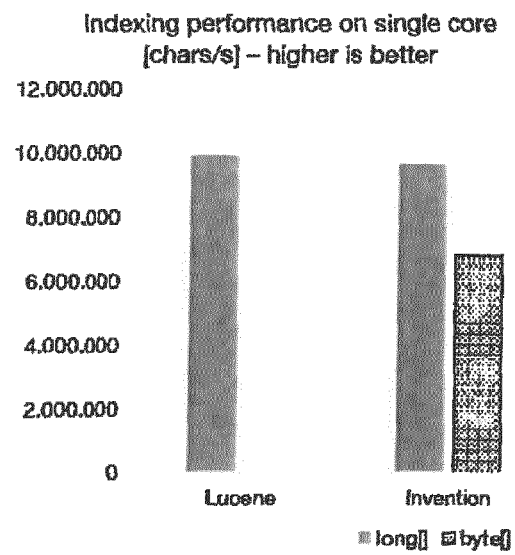

As can be seen in FIG. 70D, the indexing performance was now lower than in the earlier experiment. In the inventive system it was lower because the memory management had now been fully implemented, at the expense of some performance. In the Lucene system it was lower because the Lucene indexing was run with one thread/CPU core only. This was done to obtain better comparability because also the system according to the invention was implemented with one thread/CPU core only. Note that the indexing by the inventive system could also be parallelized, but this has not yet been implemented by the inventor.

Figure 70E:
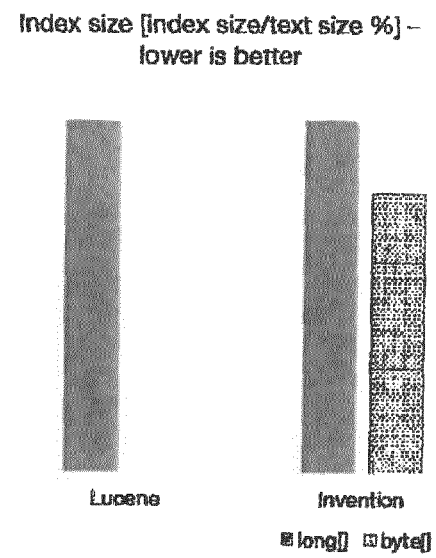

FIG. 70E shows that the index size has practically remained the same in comparison to the earlier experiment.

Figure 70F:
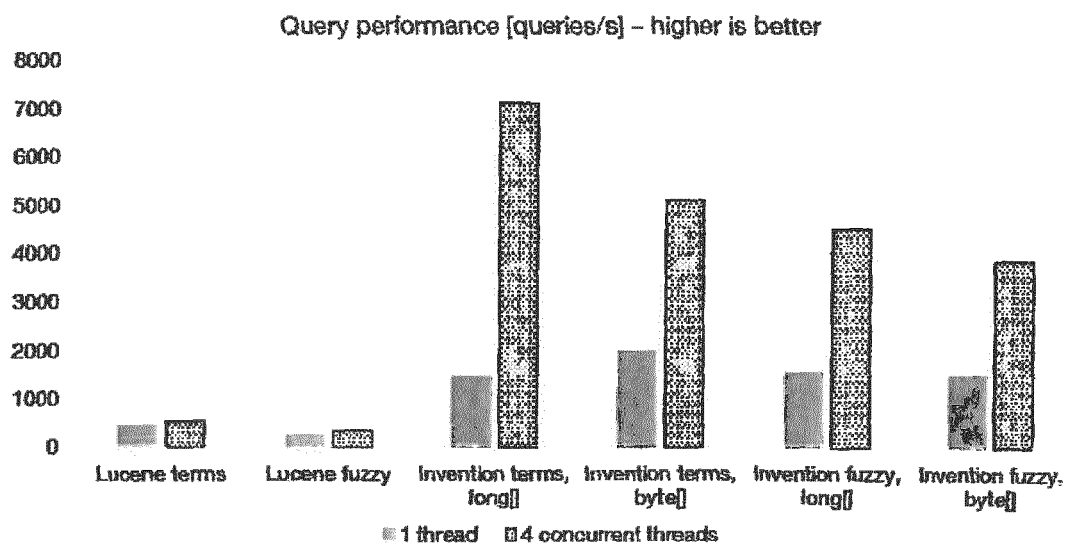

FIG. 70F shows that the query performance of the inventive system has improved in comparison to the earlier experiment, in particular in the fuzzy search. In the earlier experiment, only a DFA as shown in FIG. 48C was generated upfront, which comprises only nodes corresponding to states which are associated with full characters strings. The in-between-states shown in FIG. 48D (the states of the finite automaton not associated with a full character string), which exist due to the fact that the encoding of a character requires two or more key portions, were determined dynamically on-the-fly during the intersection operation. In contrast, in the later experiment, the finite automaton with the complete set of states and transitions was generated upfront and stored as an array of arrays (matrix) as shown in FIG. 48E. This approach led two an improvement of the query performance by about factor two. The Lucene system has improved by a similar factor in comparison to the earlier experiment, which is due to certain optimizations made in the Lucene system between the priority date and the filing date of this application.

The invention claimed is:

1. A method of retrieving data from an electronic database or information retrieval system, comprising the steps of:
   obtaining representations of two or more first-order input tries, wherein the two or more first-order input tries are higher in a sequence than second-order tries and wherein at least all parent nodes in an input trie comprise a bitmap;
   evaluating at least parts of a first-order resulting trie, the first-order resulting trie being a first combination, using a logical operation, of the first-order input tries, the first combination resulting in a first combined bitmap; and
   providing as an output a representation of a resulting trie, a set or a subset of keys and/or other data items associated with nodes of the resulting trie, or a set of keys or values derived from keys associated with nodes of the resulting trie;
   wherein a representation of at least one of the first-order input tries is provided as an output of a second-order combination operator performing the steps of:
   obtaining representations of two or more second-order input tries;
   at least partially evaluating a second-order resulting trie, the second-order resulting trie being a second combination, using a second-order logical operation, of the second-order input tries, the second combination resulting in a second combined bitmap; and
   providing as an output a representation of the second-order resulting trie;
   wherein at least parts of the second-order resulting trie are evaluated during the step of evaluating at least parts of the first-order resulting trie, wherein at any given moment during evaluation of a trie or parts of a trie, only those parts of a physical data structure of the trie or of the parts of the trie that need to be realized in that moment for traversing the trie or the parts of the trie are realized;
   wherein parts of the first-order resulting trie and parts of the second-order resulting trie are evaluated in an interleaved manner; and
   wherein using a logical operation comprises using a bitwise AND Boolean operation, a bitwise OR Boolean operation, a bitwise AND NOT Boolean operation, or a bitwise XOR Boolean operation.

2. The method of claim 1, wherein evaluating a trie or parts of a trie comprises providing information that traversed nodes are present in the trie.

3. The method of claim 1, wherein at least at the moment of obtaining the representation of the second-order resulting trie, a physical data structure of the second-order resulting trie or of the parts of the second-order resulting trie as a whole does not exist.

4. The method of claim 1, wherein a physical data structure of the second-order resulting trie or of the parts of the second-order resulting trie as a whole is not realized.

5. The method of claim 1, wherein at least those parts of the second-order resulting trie are evaluated that are required for the evaluating at least parts of the first-order resulting trie.

6. The method of claim 1, wherein at least some of the parts of the second-order resulting trie that are not required for the evaluating at least parts of the resulting trie are not evaluated, and only those parts of the second-order resulting trie are evaluated that are required for the evaluating at least parts of the first-order resulting trie.

7. The method of claim 1, wherein at least parts of the second-order resulting trie are evaluated after at least parts of the first-order resulting trie have been evaluated.

8. The method of claim 1, wherein the step of providing as an output the representation of the second-order resulting trie is performed before the step of at least partially evaluating the second-order resulting trie has been completed.

9. The method of claim 1, wherein the value of the key portion of a child node in a trie is determined by the value of a bit (set) in the bitmap comprised by a parent node of the child node with which the bit of the child node is associated.

10. The method of claim 1, the method further comprising combining the sets of child nodes of nodes of the first-order and second-order input tries which correspond to a node of the resulting trie, using the logical operation, wherein combining comprises bitwise combining the bitmaps of each of the nodes of the input tries which correspond to the node of the resulting trie, using the logical operation, thereby obtaining the combined bitmaps.

11. The method of claim 10, wherein child nodes of the node of the resulting trie are determined and evaluated only on the basis of the combined bitmaps.

12. The method of claim 10, wherein the step of combining the bitmaps is performed before child nodes of the node of the resulting trie are determined and evaluated.

13. A data-processing device or system comprising one or more processors and memory, the data-processing device or system being configured to perform the method of claim 1.

14. A non-transitory computer readable medium having stored thereon a computer program comprising instructions for performing the method of claim 1.

* * * * *